US008826375B2

(12) United States Patent
Smith et al.

(10) Patent No.: US 8,826,375 B2
(45) Date of Patent: Sep. 2, 2014

(54) RICH MEDIA COLLABORATION SYSTEM

(75) Inventors: Mark Smith, Tarzana, CA (US); Kevin Anderson, Calabasas, CA (US); Michael Harvey, Erskineville (AU)

(73) Assignee: Lookwithus.com Inc., Woodland Hills, CA (US)

( * ) Notice: Subject to any disclaimer, the term of this patent is extended or adjusted under 35 U.S.C. 154(b) by 943 days.

(21) Appl. No.: 12/102,670

(22) Filed: Apr. 14, 2008

(65) Prior Publication Data
US 2009/0260060 A1 Oct. 15, 2009

(51) Int. Cl.
G06F 7/04 (2006.01)
H04L 29/06 (2006.01)
G06Q 10/10 (2012.01)

(52) U.S. Cl.
CPC .............. H04L 63/105 (2013.01); *G06Q 10/10* (2013.01)
USPC ........ 726/3; 726/2; 726/4; 709/201; 709/206; 709/222; 709/226

(58) Field of Classification Search
CPC ...... H04L 63/105; H04L 12/58; G06Q 10/10; G06Q 10/101; G06Q 10/107
USPC ........... 726/2, 3; 713/156, 168, 201; 709/200, 709/201, 203, 206, 222, 226
See application file for complete search history.

(56) References Cited

U.S. PATENT DOCUMENTS

| | | | |
|---|---|---|---|
| 6,243,722 B1 | 6/2001 | Day et al. | |
| 6,820,111 B1 * | 11/2004 | Rubin et al. | 709/203 |
| 6,978,276 B2 * | 12/2005 | Demsky et al. | 1/1 |
| 7,103,772 B2 * | 9/2006 | Jorgensen et al. | 713/168 |
| 7,130,885 B2 * | 10/2006 | Chandra et al. | 709/206 |
| 7,340,528 B2 * | 3/2008 | Noblecourt et al. | 709/231 |
| 7,403,955 B2 * | 7/2008 | Demsky et al. | 1/1 |
| 7,458,014 B1 * | 11/2008 | Rubin et al. | 715/229 |
| 7,503,007 B2 * | 3/2009 | Goodman et al. | 715/758 |
| 7,689,719 B2 * | 3/2010 | Lee | 709/246 |
| 7,870,144 B2 * | 1/2011 | Demsky et al. | 707/756 |
| 7,899,879 B2 * | 3/2011 | Broda | 709/217 |
| 7,941,542 B2 * | 5/2011 | Broda et al. | 709/227 |
| 8,069,435 B1 * | 11/2011 | Lai | 717/106 |

(Continued)

OTHER PUBLICATIONS

PCT/US09/37841; International Search Report; May 5, 2009.

*Primary Examiner* — Thu Ha Nguyen
(74) *Attorney, Agent, or Firm* — Beyer Law Group LLP

(57) ABSTRACT

A user annotates a shared document with text, sound, images, video, an e-mail message, graphics, screen snapshots, web site snapshots to share with others. The document and its annotations are stored in a digital object repository to which other users have access. Within the closed collaboration system, only users who are authenticated may upload digital objects, annotate digital objects and view objects and their annotations. The user sends a message to other users to invite them to view the object and its annotations and to add their own annotations. An annotated object generates an alert for all of the invited users. A remote authentication gateway authenticates users and has a repository for user metadata. Digital object repositories are separate from the authentication gateway, thus providing for disintermediation of the user metadata from the digital object data. The collaboration system may be hosted by a third party on a server computer available over the Internet that displays a web site. A user is not required to have collaboration system software on his or her computer and may annotate any image on the web site for later viewing by other users of the web site.

12 Claims, 59 Drawing Sheets

(56) References Cited

U.S. PATENT DOCUMENTS

| | | |
|---|---|---|
| 8,346,929 B1 * | 1/2013 | Lai ................................ 709/226 |
| 2002/0002586 A1 * | 1/2002 | Rafal et al. .................... 709/205 |
| 2002/0138582 A1 * | 9/2002 | Chandra et al. ............... 709/206 |
| 2003/0005289 A1 * | 1/2003 | Gougeon et al. .............. 713/156 |
| 2003/0023685 A1 * | 1/2003 | Cousins et al. ............... 709/205 |
| 2003/0037261 A1 * | 2/2003 | Meffert et al. ................ 713/201 |
| 2003/0163686 A1 * | 8/2003 | Ward et al. .................... 713/156 |
| 2004/0049530 A1 * | 3/2004 | Lok et al. ...................... 709/201 |
| 2005/0125484 A1 * | 6/2005 | Bucher et al. ................. 709/200 |
| 2006/0031497 A1 | 2/2006 | Beartusk et al. |
| 2006/0200761 A1 | 9/2006 | Judd et al. |
| 2007/0100829 A1 | 5/2007 | Allen et al. |
| 2007/0121819 A1 * | 5/2007 | Kirn et al. ................... 379/88.13 |
| 2007/0136423 A1 | 6/2007 | Gilmore et al. |
| 2007/0180135 A1 | 8/2007 | Kenrick et al. |
| 2007/0271340 A1 * | 11/2007 | Goodman et al. ............ 709/206 |
| 2008/0005233 A1 | 1/2008 | Cai et al. |
| 2008/0028017 A1 * | 1/2008 | Garbow et al. ............... 709/201 |
| 2008/0028300 A1 | 1/2008 | Krieger et al. |
| 2008/0034406 A1 * | 2/2008 | Ginter et al. ....................... 726/2 |
| 2009/0077630 A1 * | 3/2009 | Kaihoko et al. .................. 726/2 |
| 2009/0100263 A1 * | 4/2009 | Leonard ........................ 713/156 |
| 2009/0260060 A1 * | 10/2009 | Smith et al. ........................ 726/3 |
| 2010/0333174 A1 * | 12/2010 | Broerman et al. ................. 726/3 |
| 2013/0117400 A1 * | 5/2013 | An et al. ....................... 709/206 |

\* cited by examiner

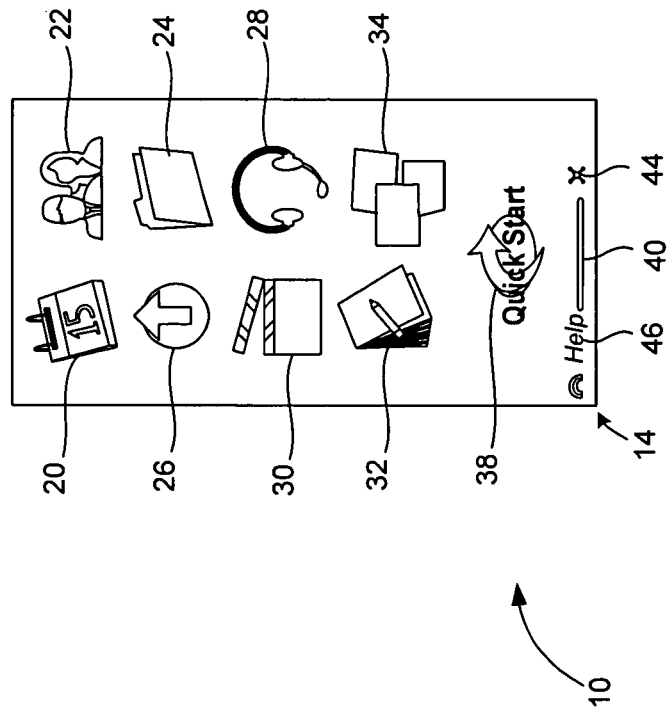
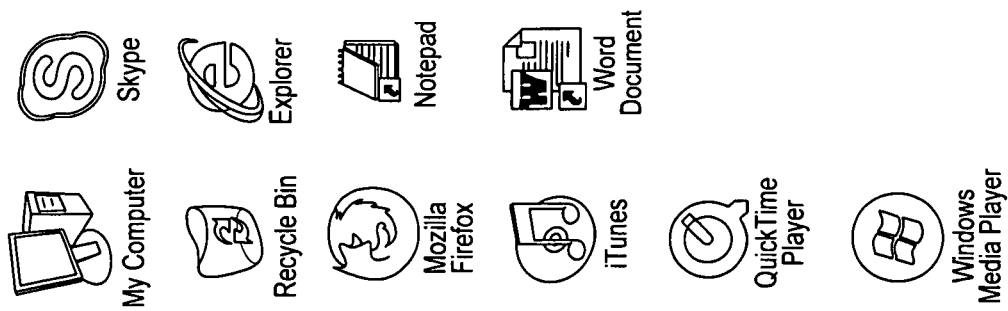
FIG. 1A

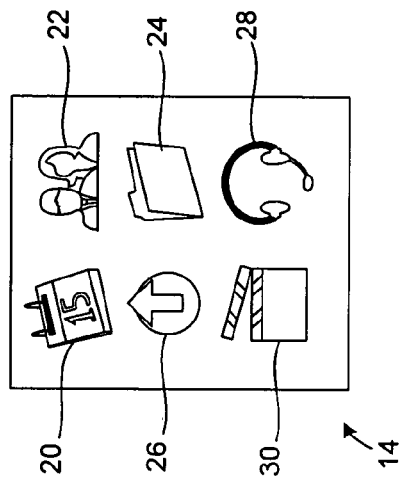
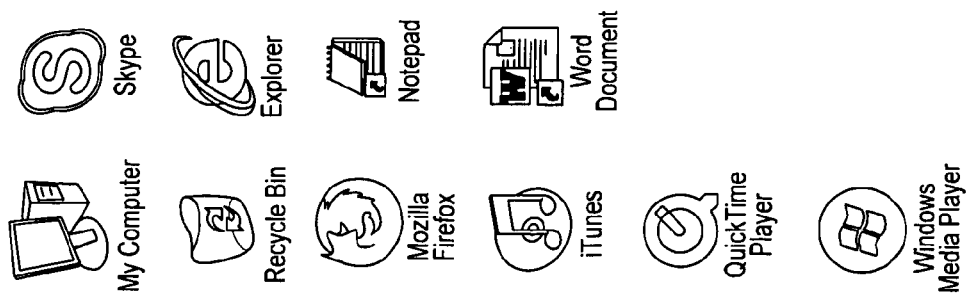
FIG. 1B

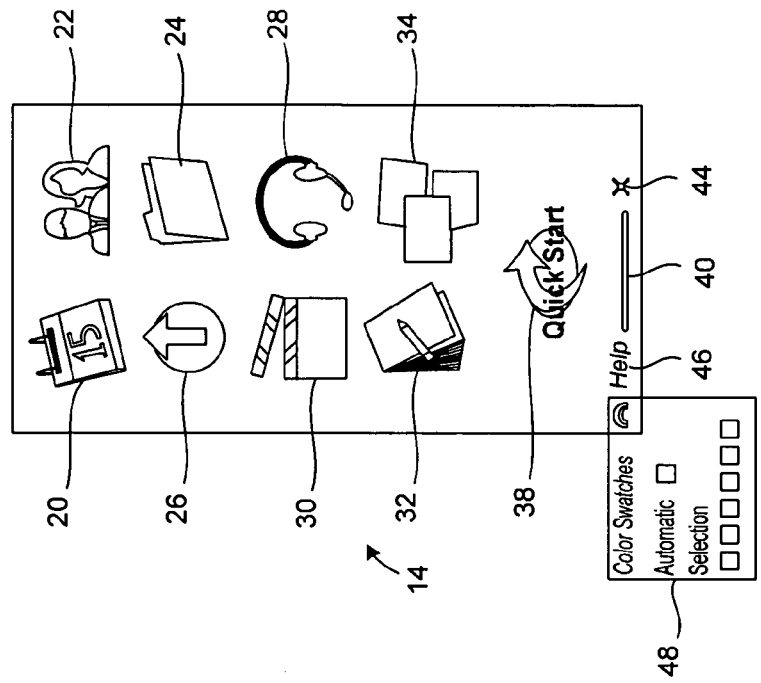
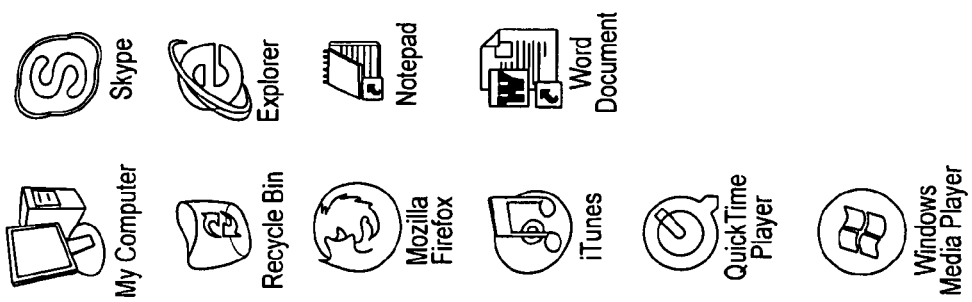
FIG. 1C

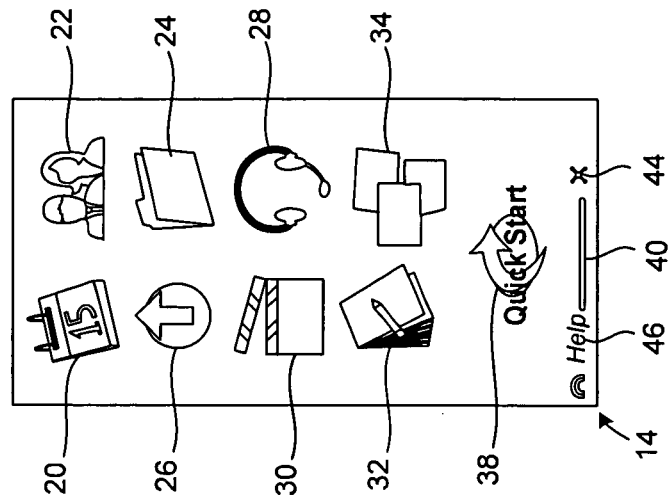
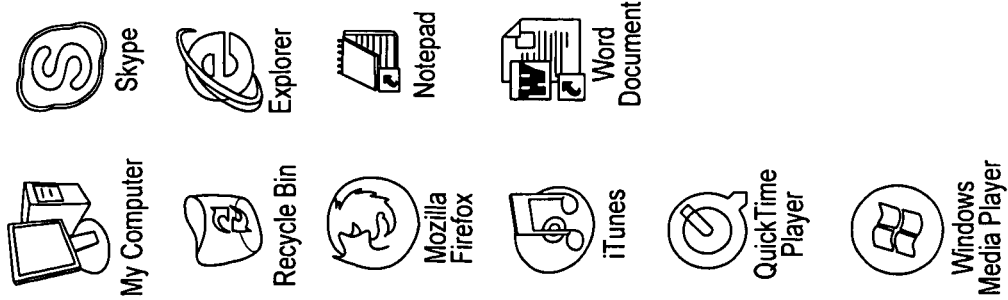
FIG. 1D

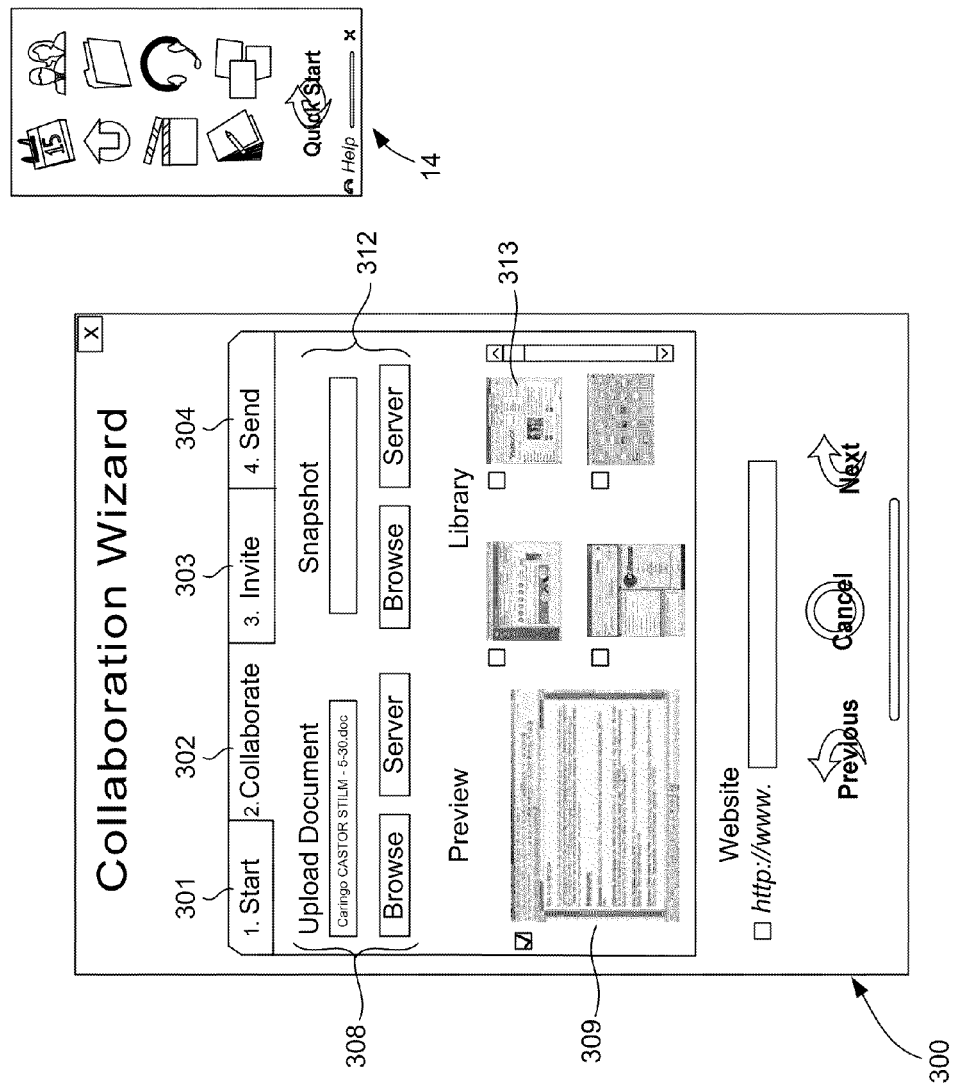
FIG. 12A
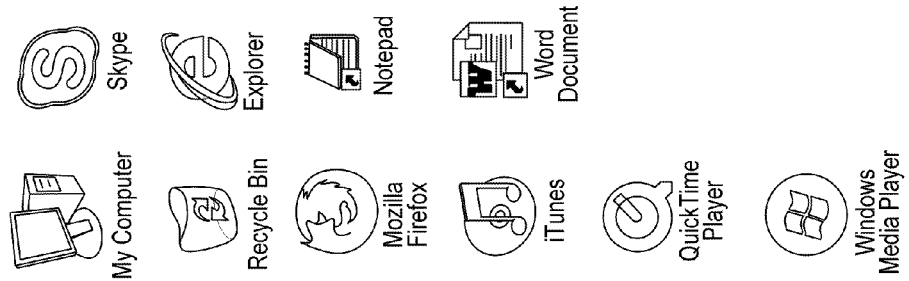

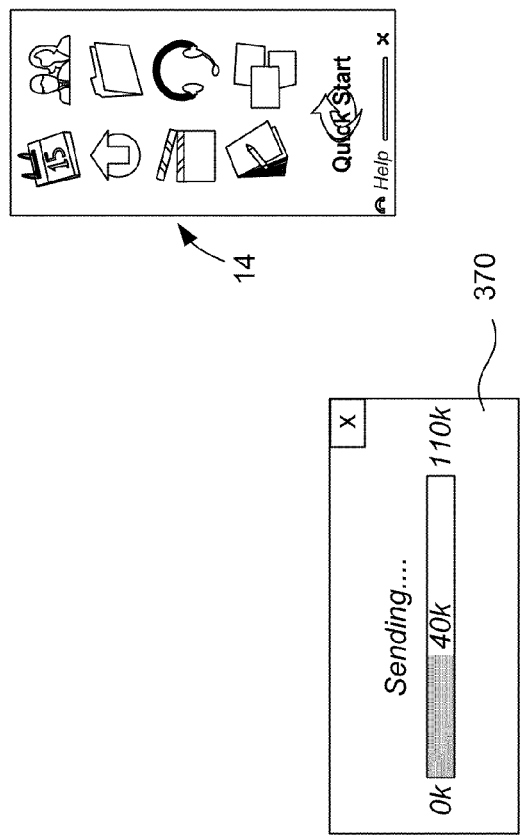
*FIG. 12M*
   
     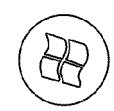

Collaboration System

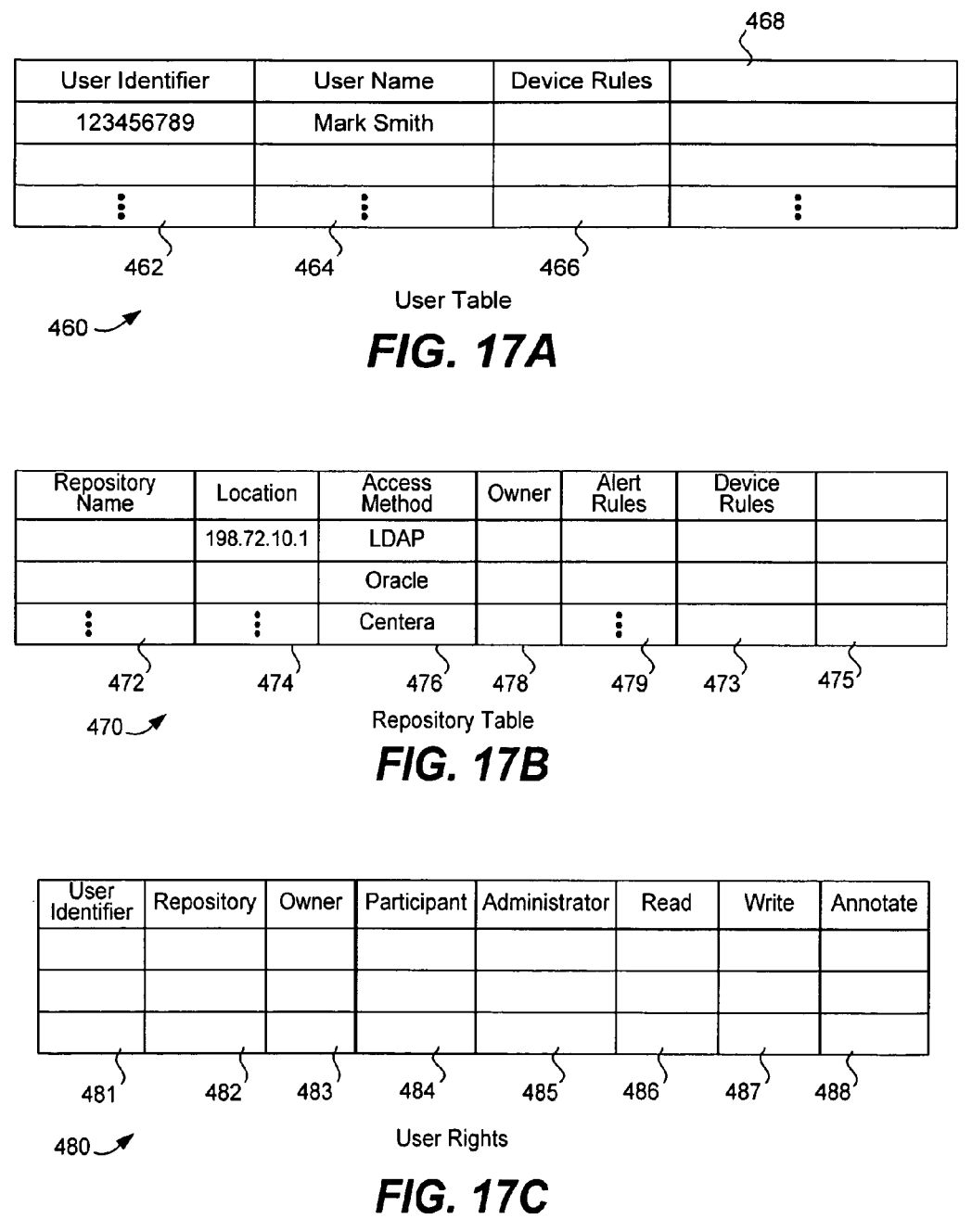

| User Identifier | User Name | Device Rules | |
|---|---|---|---|
| 123456789 | Mark Smith | | |
| | | | |
| ⋮ | ⋮ | ⋮ | ⋮ |

User Table

FIG. 17A

| Repository Name | Location | Access Method | Owner | Alert Rules | Device Rules | |
|---|---|---|---|---|---|---|
| | 198.72.10.1 | LDAP | | | | |
| | | Oracle | | | | |
| ⋮ | ⋮ | Centera | | ⋮ | | |

Repository Table

FIG. 17B

| User Identifier | Repository | Owner | Participant | Administrator | Read | Write | Annotate |
|---|---|---|---|---|---|---|---|
| | | | | | | | |
| | | | | | | | |
| | | | | | | | |

User Rights

FIG. 17C

Objects Supporting Authentication Gateway

RICH MEDIA COLLABORATION SYSTEM

FIELD OF THE INVENTION

The present invention relates generally to rich media collaborative software. More specifically, the present invention relates to a system for managing rich media collaboration by users on documents or other digital objects.

BACKGROUND OF THE INVENTION

Existing messaging technologies have evolved from traditional concepts such as "messages" and "mail." It is for this reason that such technologies are limited in flexibility and adaptability, as they have been specifically designed to support a particular modality. As new messaging protocols, formats and products become available, existing technologies are in constant "catch up" as they attempt to adapt to an ever-accelerating product development cycle.

Various software tools allow individuals to collaborate on adding information to documents. For example, the "SharePoint" software suite available from Microsoft Corporation allows individuals to collaborate on documents. Another software collaboration tool is "WebOffice" by WebEx. While each of these tools provide collaboration, they and other prior art are lacking as described below.

Currently available software for collaborating on documents does not take full advantage of the ability to share information. For example, most software tools are limited to providing the ability to annotate a written document with text or simple drawing tools, or limited to adding supportive documents, calendars or scheduling. These tools do not allow the user to use feature sets of rich media interaction, nor use rich media trails for collaboration. One cannot leave voice on a document along with video and snapshots of pertinent web site information. Further, these tools do not have the ability to let other users leave their rich media interactions.

Further, the sheer volume of electronic mail and the reliance upon e-mail for conducting business poses problems for users. For example, e-mail spam is annoying at the least, limits on e-mail storage cause problems, limits on the size of e-mail messages and attachments that may be sent cause frustration (and these limits are not a reasonable way of communicating in the new rich digital age), and the types of e-mail modules and webmail programs available for use confuse users. One basic difficulty with e-mail is that it is an unauthenticated transport scheme. In other words, no one can ever really know who is behind a particular e-mail address, hence the existence of spam and address spoofing, which leads to virus problems as well as phishing scams and fraud. None of the currently available software tools for collaboration provide an adequate solution to all of these e-mail problems.

Finally, current collaboration software does not provide adequate scalability needed for adding and authenticating thousands of users or for storing nearly unlimited quantities of information. Today, if an organization needs to scale what they are doing, the organization needs to come up with a combination of disparate software and hardware modules in order to keep up with the amount of data to be stored and accessed. This use of disparate software and hardware causes issues in the data center, introduces many points of failure within the network and is not a cost effective way to keep growing.

SUMMARY OF THE INVENTION

To achieve the foregoing, and in accordance with the purpose of the present invention, a collaboration system is disclosed that provides the capability for rich media collaboration, authenticated e-mail functionality within a closed system, and unlimited scalable storage using disintermediation of digital objects and metadata.

In one novel embodiment the present invention allows a user (or any number of users) to annotate a shared document (i.e., any digital object) with text, sound, images, video, an e-mail message, graphics, screen snapshots, web site snapshots or other information so that these annotations may be viewed or listened to by others. An annotation may be any digital object that is attached during collaboration upon the document.

With a second novel embodiment the present invention may replace traditional e-mail, which was never truly built for the uses that it is being harnessed for today. This aspect can replace traditional e-mail systems and allow users to use alert-based messages so that no one can communicate within the system of the present invention without proper authentication and user permission. This aspect has the potential to rid all such system users of the traditional e-mail problems described above. With this aspect of the present invention there is no longer a strict need for traditional e-mail, but this aspect can still speak to legacy users of traditional e-mail.

In a third novel embodiment a remote authentication gateway provides for authentication of users and a repository for metadata. Digital object repositories are separate from the authentication gateway, thus providing for disintermediation of the user metadata from the data (digital objects) in the object repositories. This aspect of the present invention is completely scalable because all objects are seen by the system as objects of fixed content. Thus, this aspect has been designed with unlimited scalability only to be capped by the amount of storage space that has been purchased. This aspect is architecturally unique in that it utilizes a layer of abstraction to separate the metadata from the objects themselves. By allowing virtually any storage device to be used as the physical repository of the digital objects, interactions and user information, the present invention can scale far beyond existing technologies.

In a fourth novel embodiment the collaboration system of the present invention may be hosted by a third party on a server computer available over the Internet. In this embodiment, a user is not required to have collaboration system software on his or her computer and may utilize the benefits of these aspects of the invention over an online connection without realizing that he or she is using any particular collaboration system.

BRIEF DESCRIPTION OF THE DRAWINGS

The invention, together with further advantages thereof, may best be understood by reference to the following description taken in conjunction with the accompanying drawings in which:

FIG. 1A illustrates a typical user interface of the client application on a local user computer.

FIG. 1B illustrates a navigation bar including a subset of available icons.

FIG. 1C illustrates a navigation bar and a color swatches window that appears when the rainbow or color palette is selected.

FIG. 1D illustrates an embodiment in which navigation bar is transparent to allow information from the document underneath to be viewed.

FIG. 12A illustrates a "collaboration wizard" window that is invoked when a user selects the quick start icon.

FIG. 12M illustrates a sending window showing the progress of sending document using one of the delivery options of send tab.

FIG. 15B illustrates the same web page having item but with a symbol indicating that a digital object has been attached in association with item.

FIG. 15C illustrates a quick response window.

FIG. 17A is a user table that includes information about each user in system.

FIG. 17B is a repository table that includes information about each repository in system.

FIG. 17C is a user rights table that includes information regarding the rights each user has to particular repositories.

DETAILED DESCRIPTION OF THE INVENTION

Figure 2A:
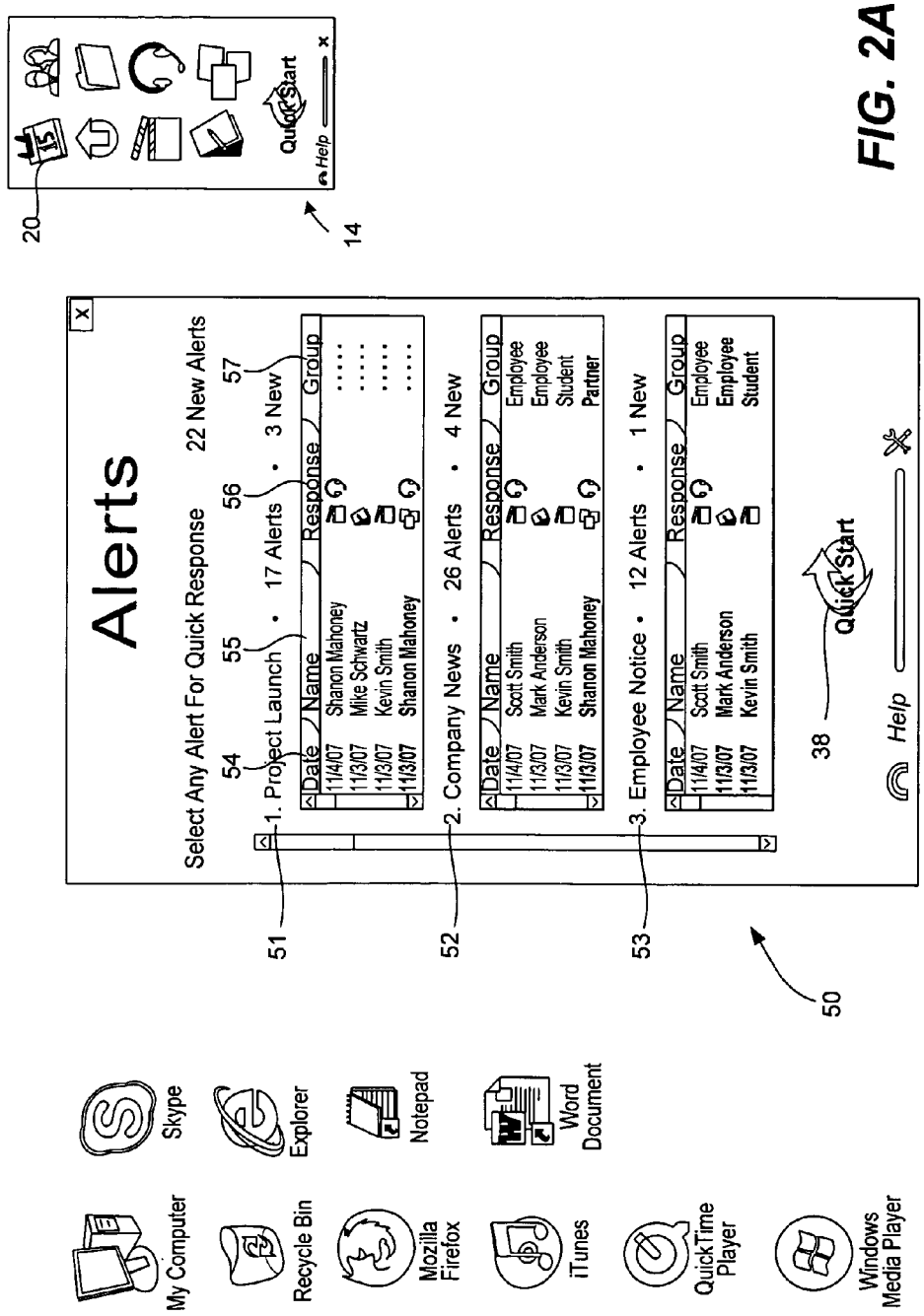
FIG. 2A illustrates an alert window that appears when calendar icon is selected.

The present invention in various embodiments provides a rich media collaboration system that allows users to collaborate on documents, to share information, and to alert other users of changes, new documents, interesting digital objects, etc.

Prior art collaboration software does not allow the user to use feature sets of rich media interaction and these software tools cannot use rich media trails for collaboration. Further, one cannot attach voice to a document with video, one cannot attach snapshots of pertinent web site information, and one cannot upload or download documents with pointers indicating certain attachments within a document for collaboration. Also, these software tools do not have the capability to let other users leave their rich media responses in an easy-to-use collaboration format. Some tools do allow you to send e-mail messages the traditional way, but traditional e-mail has problems as discussed above.

In one novel embodiment, the present invention allows a user (or any number of users) to annotate a shared document (i.e., any digital object) with text, sound, images, video, an e-mail message, graphics, screen snapshots, web site snapshots or other information so that these annotations may be viewed or listened to by others. The rich media added by a user (media such as sound, voice, text, video, etc.) can be added to virtually any digital object found on a computer, mobile telephone, web site or network. For example, digital objects include computer files, documents, spreadsheets, images, photographs, hyperlinks, a web site or portion of a web site, etc. Rich media may be annotated to any item that an individual has selected, and other users of the collaboration system may view this annotation and add their own information.

The present invention takes the position that everything is a digital object. Documents, e-mail messages, voice mail messages, images, chat messages, CAD/CAM files, video files, audio files, rich media, etc., are all digital objects; in fact, all objects or images that can be seen on a computer screen, mobile telephone, PDA, etc., are digital objects. They are artifacts that are stored, protected, retained, possibly destroyed and can all be the subjects of interaction with other digital objects.

In a second novel embodiment, an alert functionality allows a user to inform others of changes to a document, requests for information or comments, the availability of new documents or information, or information that might normally be conveyed in an electronic mail message. The present invention recognizes that from an object-oriented point of view, an electronic mail message is simply another type of digital object. Accordingly, the present system supports the existence of digital objects that represent e-mail messages to implement the alert functionality. Given that the digital object repositories are distributed, secure and mediated, e-mail integration and/or replacement is possible. Rather than using an e-mail server to store messages, a repository is used and stores e-mail messages (or "alerts") as digital objects allocated to system users. The alert functionality then, is limited to those users who are part of the collaboration system.

Use of the alert functionality allows secure and authenticated communication between system users, eventually supporting the elimination of spam, e-mail viruses, phishing, and other problems associated with completely open and unauthenticated electronic mail. There is no limit on the amount of electronic messages that may be stored, and no limit on the size of the message being sent. The user need not be concerned with confusing backup and compliance issues. No dedicated e-mail software programs are needed because other users are informed using alerts instead of e-mail. The alert functionality provides the necessary notifications. One may still invite other people who are not within the collaboration system to view documents by sending a hyperlink created by the system using traditional e-mail software. If someone is already using the present collaboration system, the invitation comes to them in the form of an alert.

The present invention recognizes that an optimal approach to the anonymity problem of e-mail is to authenticate at a gateway. In one specific embodiment, digital certificates are only provided to users once their identity can be verified by a trusted authority. As the system grows, more and more users will be created and authenticated, eventually supporting the phasing-out of existing messaging systems. To support this transition, a number of plug-in interfaces are provided as part of a repository gateway. These interfaces perform translation and delivery between the collaboration system and existing messaging networks. In other words, existing messaging technologies (chat, electronic mail, SMS, instant messaging, broadcasts over the Internet, etc.) are supported by the collaboration system by means of the repository gateway plug-in modules. Plug-in modules include: PSTN, PABX, SMS Relay, SMTP Relay, SMTP MTA, POP, IMAP, HTTP (Gateway), Chat/IRC, client interface, and network acceleration/protocol optimization. Client interface refers to the LWU client interface; this interface allows connections from the client 408 to the repository. Network acceleration/protocol optimization refers to a method of increasing the effective bandwidth of a connection by optimizing the network protocols. Such a method would most likely be used for connections made by mobile devices, smart phones, etc. In the LWU implementation, such acceleration/optimization is implemented as a plug-in module.

In a third novel embodiment, a remote authentication gateway provides for authentication of users and a repository for metadata. Digital object repositories are separate from the authentication gateway and the user metadata repository, thus providing for disintermediation of the user metadata from the data (digital objects) in the object repositories. The metadata provided from the authentication gateway indicates which object repositories each user may access during a particular session. After authentication, a user may access any object repository to which he or she has permission without the need to access the authentication gateway each time before an interaction with each repository.

This separation allows the present technology to process potentially millions of simultaneous users, because processing is involved only on the specific repositories where active data is stored and where interaction is taking place. This distribution of processing provides for maximum efficiency and scalability.

In a fourth novel embodiment the collaboration system of the present invention may be hosted by a third party on a server computer available over the Internet. In this embodiment, a user is not required to have collaboration system software on his or her computer and may utilize the benefits of these aspects of the invention over an online connection without realizing that he or she is using any particular collaboration system.

User Interface

An embodiment of the present invention utilizes a client application resident on a local user's host computer. An example user interface is shown in the following figures. Typically, the client application is opened first and then any suitable word processing application (such as Microsoft Word) or other application needed to view a digital object is opened. Or, the client application may be opened without any word processing or other application being open. Alternatively, the user opens any suitable application and then the user then invokes the client application in order to take advantage of its capabilities. Other applications may also open a digital object with which the client application interacts. The application that is opened will depend on what file type is associated with the file on the user's computer that the user wishes to open and then send to others for collaboration.

FIG. 1A illustrates a typical user interface 10 of the client application on a local user computer. The screen is blank but could contain text, numbers, graphics, images or any information from any software application open and arranged to view a digital object. Shown is a navigation bar 14 that appears over a word processing application, for example. The navigation bar may be implemented using any suitable user interface technology and may of course appear in other sizes, styles or locations on the screen. The navigation bar is preferably separate from an application such as Word. In one embodiment it is a floating tool, similar to what one sees in the Vista operating system with the side bar. Alerts typically appear for a user as visual cues.

A calendar icon 20 allows a user to view recent alerts, invitations, documents or other information that have been flagged for that user. Alerts would typically appear as a flashing icon, a color change, a symbol change, or just a number so one knows that it needs attention. A number indicates the number of alerts to be responded to.

A coworkers icon 22 allows a user to invite others to view documents, to collaborate on documents or to download documents. The coworkers icon is for setting policies for the document and for performing the actual invitation. Once another user is invited, that other user receives an alert via calendar icon 20 when that user executes his own client application and invokes Query Actions, as described below.

A folder icon 24 allows immediate access to the file server of a company or other logical entity. An upload icon 26 allows a user to upload a document, file or other digital object to a storage or repository server. A headphones icon 28 allows the user to annotate a document with voice or sound information. A clapboard icon 30 allows a user to annotate a document with video information. A notepad icon 32 allows a user to annotate a document with text information. A snapshots icon 34 allows a user to annotate a document with a snapshot of any suitable web page, computer screen or screen shot. Photographs or still images are attached as follows. If the image is a photograph that is already owned or present on the user's computer it would be simply uploaded using upload icon 26, if the image is a web site, document screen shot or computer screen shot, the snapshot button is the icon used to upload.

Figure 16:
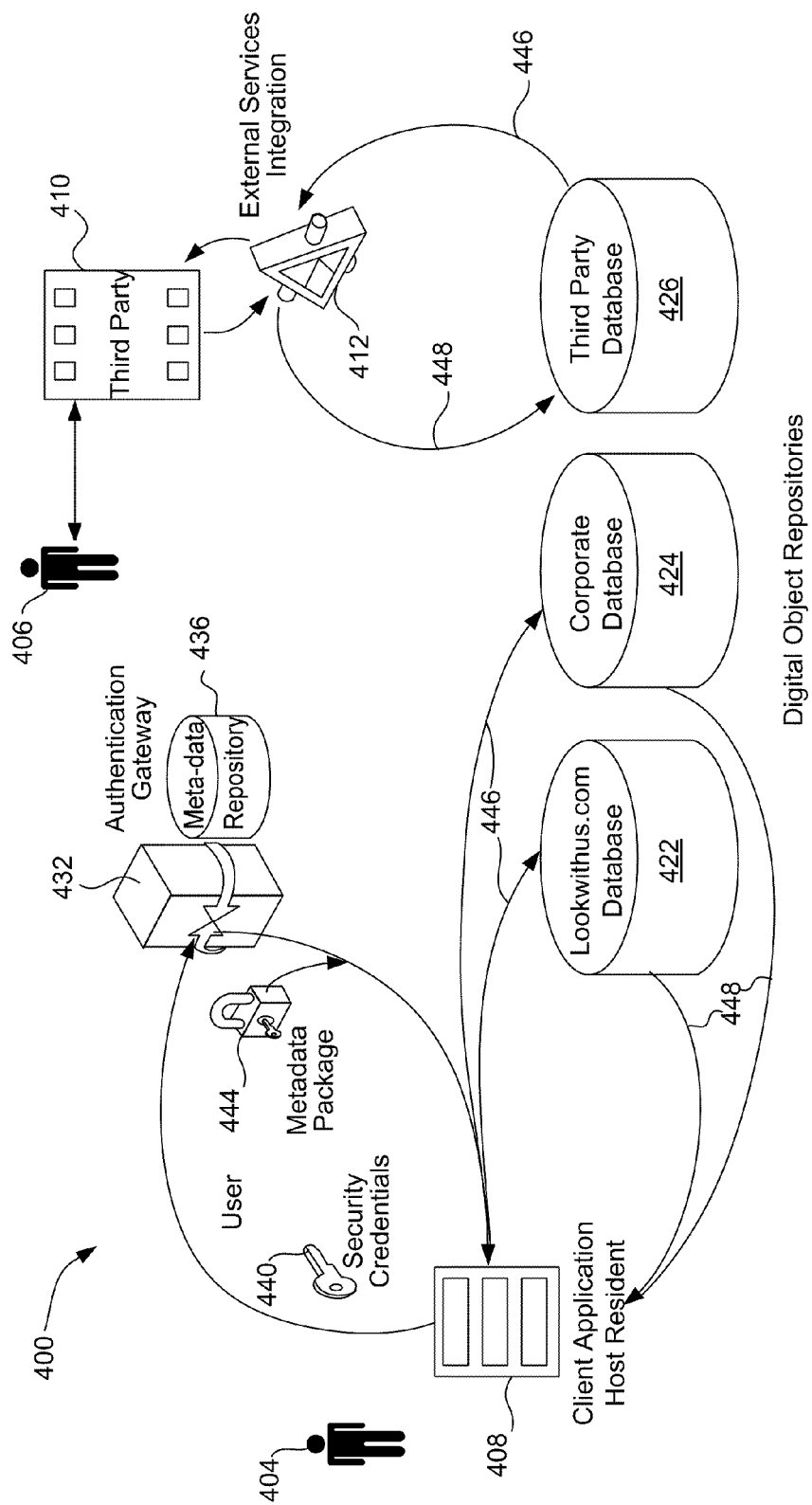
FIG. 16 is a high-level block diagram of a collaboration system.

A quick start icon 38 allows a user to invoke a "collaboration wizard" module within the collaboration system in order to select a document (or any digital object) for collaboration and to invite other users to collaborate on that document as well. Implementation of this module is described beginning at FIG. 12A. Other user interface implementations used to begin collaboration on a document include the "quick response" module available from the alerts window 50 as shown in FIG. 2B, and the "instant collaboration" module available from the contacts window 60 as shown in FIG. 3B. Of course, any suitable user interface may be used to begin collaboration upon a digital object; FIG. 16, et sequitur, shows the flow of internal commands that occur when any of these collaborations are begun.

The navigation bar includes other controls such as a slider bar 40 for viewing more icons or for specifying which icons should actually be present based on a custom user-defined environment. Navigation bar 14 may also be shrunk in size, may have more or fewer icons appearing, may be rolled up similar to an old world scroll, may be made transparent, may be relocated, shrunk into the OS running programs, bar, etc. The navigation bar 14 may also be minimized to present an unobtrusive appearance on the user's computer screen. Of course, the navigation bar may be minimized, hidden or obscured in other ways as is known in the art. The navigation bar is essentially a tool bar, and has the functionality of standard application tool bars: show, hide, dock, undock, ability to customize buttons, etc. By selecting a particular icon the user has tools available at his or her local computer for receiving information, sharing information, communicating and annotating.

FIG. 1B illustrates a navigation bar including a subset of available icons. The client application may be configured to allow a user to access only a subset of the functionality of navigation bar 14. This embodiment illustrates a client application that provides the user with the opportunity to review alerts, share information by inviting others, and upload and view files, annotate with video or sound, but does not provide the user with the opportunity to annotate documents with text or snapshots, or invoke the e-mail module or the quick start module.

FIG. 1C illustrates a navigation bar 14 and a color swatches window 48 that appears when the rainbow or color palette is selected. The automatic color allows the user to work in the default color scheme on the user's computer screen. The selection of the varied color squares allows the user to work in custom colors. Window 48 allows the user to change the colors of the user interface.

FIG. 1D illustrates an embodiment in which navigation bar 14 is transparent to allow information from the document underneath to be viewed. Of course, the navigation bar may be minimized, hidden or obscured in other ways as is known in the art.

Figure 2B:
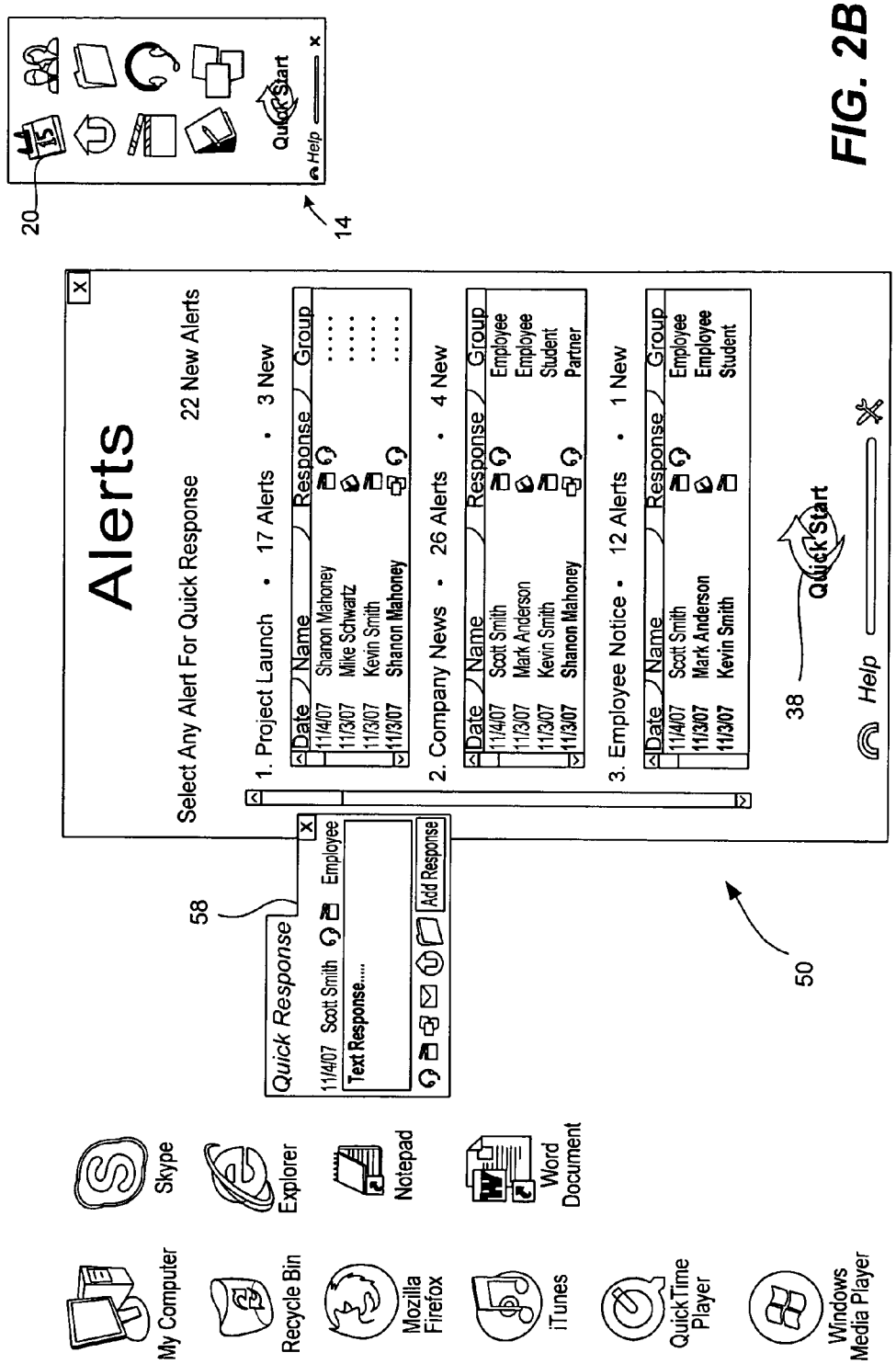
FIG. 2B illustrates a quick response window that appears when a user selects any particular alert in order to respond.

FIG. 2A illustrates an alert window 50 that appears when calendar icon 20 is selected. Alerts window 50 includes all alerts, invitations, messages or documents that have been sent from others to the user. Alerts are listed by category; categories 51-53 are shown. The alert function is internal to the LWU Application and is a simple means of providing event-based data to the user.

For example, the first category 51 is "project launch," the second category 52 is "company news," and the third category 53 is "employee notice." Each category includes the name of the category, the number of pending alerts and the number of new alerts. Each alert under each category in the alert window includes a date 54, the source of the alert 55 (e.g., the person from whom the item originates), a response list 56 that lists the type of rich media that is attached to each alert, and a group name 57 that lists to which group the source person belongs. The response list lets the user know ahead of time what type of media attachments are attached to each alert i.e., a sound clip, a video clip, another text message, etc. Name field 55 indicates the creator of a particular document that has originated the alert.

By clicking on (or selecting) a particular alert, the document or message appears on the user's screen including a representation of any annotations that have been added to that document or message. Each alert is typically a text document (such as document 200 of FIG. 13A) and may be annotated with any other digital object such as a message, video, photograph, image, music, etc. When selected, the document is transferred from its digital repository to the user's computer. The system will retrieve a copy of the document for the user and store it in the memory of the computer, or in a browser's associated memory, similar to the process of downloading digital information. All documents (or any digital object) are preferably transferred from the LWU repositories to the user's computer via the LWU client application/LWU browser client application or the browser interface. The network session is encrypted by the LWU client application so that transmissions cannot be maliciously intercepted. Should a digital object be "opened" or "selected" by a user, that object will be fetched from the LWU repository.

FIG. 2B illustrates a quick response window 58 that appears when a user selects any particular alert in order to respond. In this example, the alert dated Nov. 4, 2007 from Scott Smith has been selected for response. The quick response window allows a user to type a quick text response to the alert. The user may optionally listen to the sound clip or the video clip that are attached to this alert. Optionally, the user may also add a rich media response by clicking on one of the symbols next to the "add response" button including a sound clip, a video clip, a snapshot, an e-mail message, any document (dependent on the predetermined privileges given by the originator) that can be uploaded from a server, or a document found on the local server (folder icon). Responding to the alert using the envelope icon of the quick response window allows a user to respond to alerts by returning a new alert only to the originating user of the original alert. Such a process is described below. The presence of the envelope icon in the quick response window 58 indicates that the originating user has allowed a "direct reply." This means that the user of FIG. 2B may click on the envelope icon in order to send a direct reply back to the originating user (which appears as an alert for the originating user), rather than responding with a message that all invited users may see.

Preferably, a quick response that utilizes the envelope icon in order to send a direct reply utilizes the "query actions" in the flow diagrams discussed below. Sending a message via a direct reply to another user would work in a similar way (using "query actions") as when a user is collaborating upon a document by annotating text and that annotation is returned to the originator of the collaboration as a new alert. In his fashion, a user collaborating upon a document may respond privately to the originator of that document by using the direct reply option under a quick response, instead of using a standard collaboration upon a document which all users will be able to see.

In order to see the document or message that has been sent by Scott Smith the alert is first selected. Once the alert is selected, the object is streamed from the LWU Repository and is opened on the user's computer using the default application for that document type, i.e., Microsoft Word, Adobe Acrobat, etc., (see, for example, FIG. 13A). Once a quick response reply has been composed, the user closes the quick response window and the quick response is automatically sent to the named originating user via a direct reply or as an alert. The quick response results in a direct reply or alert being sent to the originating user along with any rich media that is attached in the quick response.

Figure 2C:
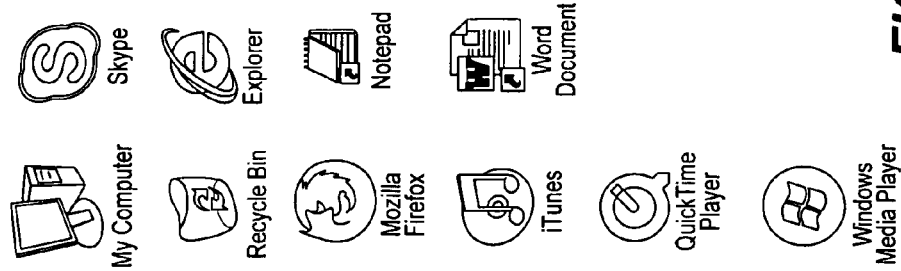
FIG. 2C illustrates an alert window that appears when calendar icon is selected, and a collaboration contact rules window that appears when the user right clicks on a contact name.

FIG. 2C illustrates an alert window 50 that appears when calendar icon 20 is selected, and a collaboration contact rules window 59 that appears when the user right clicks on a contact name. FIG. 2C shows collaboration rules specific to a particular document. In particular, these collaboration rules will apply to the alert and document received from Scott Smith on Nov. 4, 2007. The user may select rules that govern how the document from Scott Smith may be collaborated upon. Section 59a allows the user to select various types of rich media that will be allowed to be attached to the document. Also, a "hide contact" icon allows the user to hide the users from each other. Further, a download icon allows the user to download the digital object to their device. The user may remove Scott Smith from the collaboration by checking the box in section 59b. Finally, the user must supply his password in section 59c in order for these changes to take effect. The user may gain the power to dictate rules regarding a document that Scott Smith has sent because user rights are either set explicitly by an administrator or are inherited based on group membership.

Preferably, rules for the collaboration are only set by the originator of the collaboration. The current user can only dictate the rules if they are the initiator of the collaboration. The initiating user may click on the "remove from the collaboration."

An envelope icon allows any user taking part in this collaboration to submit a "direct reply" that will result in an alert being sent only to the originator of the collaboration. In other words, enabling the envelope icon in the rules settings allows the named user to respond directly to the owner of the digital object that is being collaborated upon without everyone else who is collaborating upon the digital object being able to see the response. If the envelope icon is not enabled, then the named user will not be able to respond directly to the originator of the collaboration, but may respond by collaborating upon the document in the normal fashion, in which case his or her collaboration will be able to be seen by everyone who is collaborating upon the document. In operation, the originator of the collaboration creates a document and sets the rules to allow all invited users to see what others have contributed. The originator may also allow individual users to send a direct reply to himself or herself that will appear as an alert in the alert box of the originator. An originator may set the rules for other users or allow an individual user to select a direct reply as follows. FIG. 12I at 340 and step three of the collaboration wizard (under the invite tab) show two buttons "Individual Rules" and "All Contact rules." These allow the user to define which rules will be allowed for either individuals in a group and for or an entire group. In one embodiment, the digital object repository that includes the subject document (e.g., the document from Scott Smith) includes metadata that has the permission information pertinent to that repository, its containers and each object within. For example, this metadata associates these rules with a particular document. Each time a user (or application) attempts to add, change, view, delete or annotate a digital object, the users credentials are checked against the permission data in the repository metadata. Users have permissions (or rights) on CONTAINERS and the objects within them. A user's CONTAINER-level permissions are located in UserRights table 770 of FIG. 21. Users have roles (or rights) on OBJECTS as defined in the User Object table 724 of FIG. 21. In general, FIG. 2C shows collaboration rules specific to a particular document.

Figure 3A:
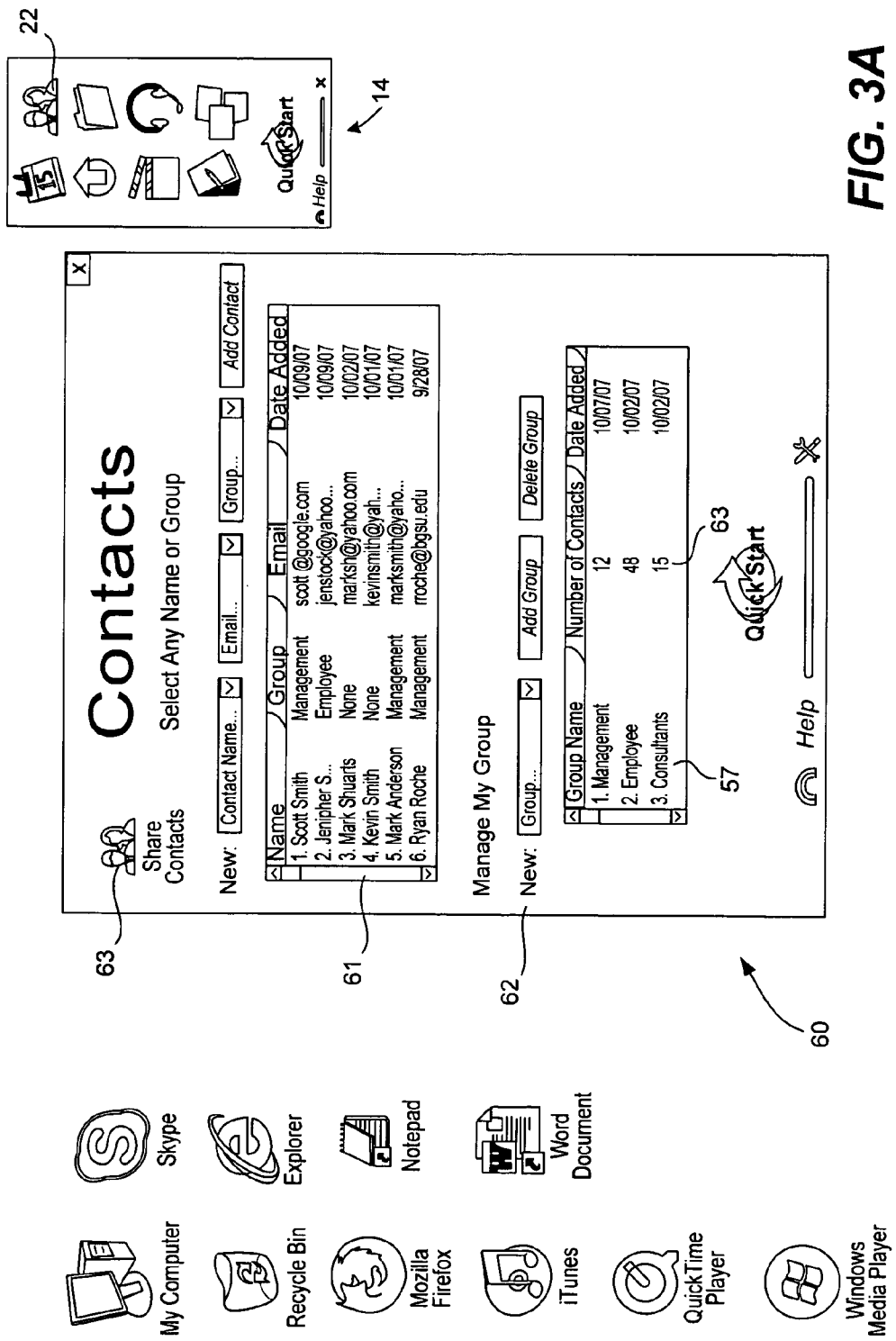
FIG. 3A illustrates a contacts window that appears when co-workers icon is selected.
Figure 3B:
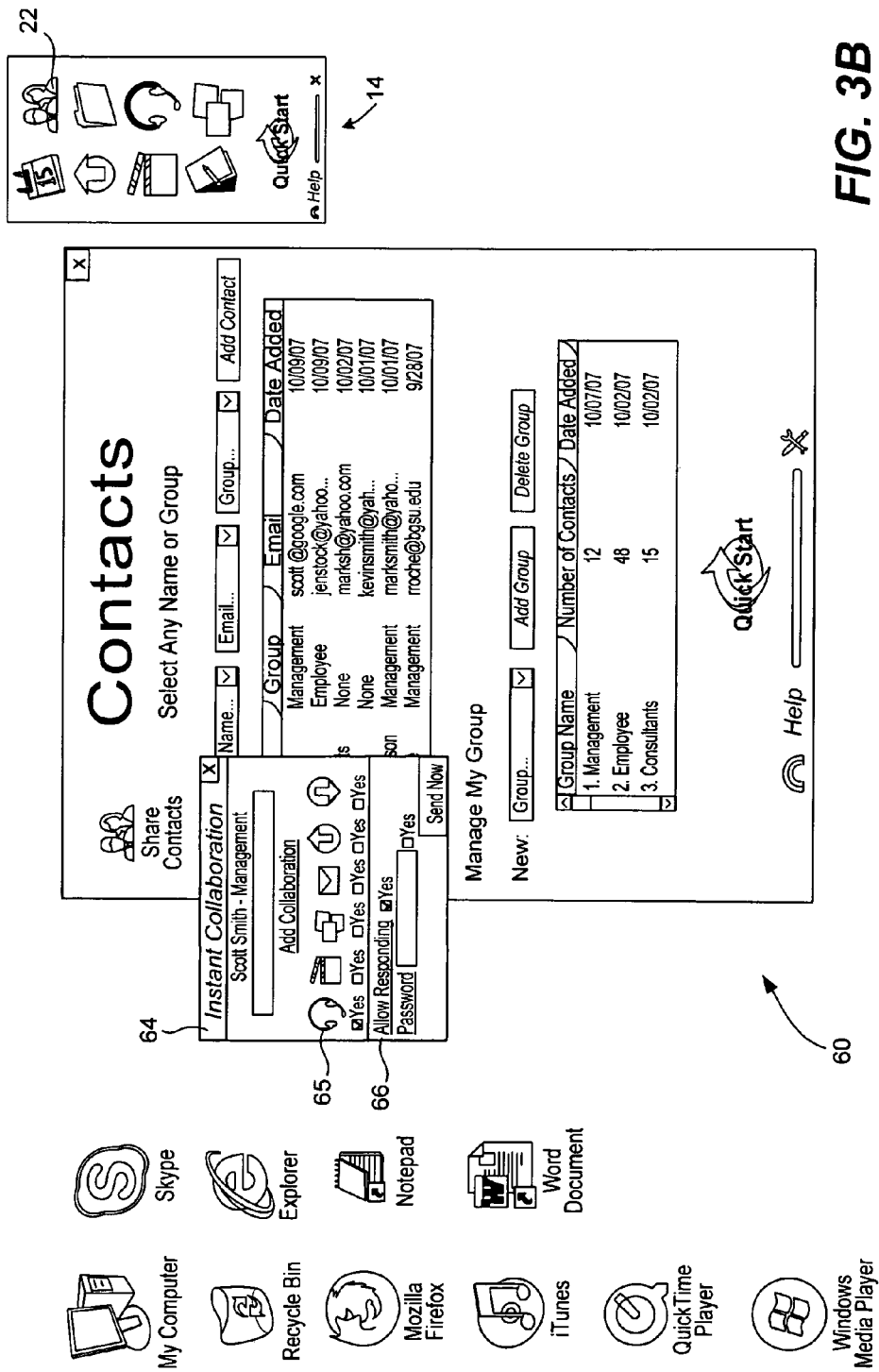
FIG. 3B illustrates a contacts window that appears when coworkers icon is selected, and an instant collaboration window that appears when a particular user is selected from the contacts list.

FIG. 3A illustrates a contacts window 60 that appears when co-workers icon 22 is selected. Contacts window 60 allows a user to manage his or her contacts used in conjunction with the e-mail module of the client application and also applies to alerts. Shown is a list of contacts 61 that include for each contact a name 55, a group 57 to which each person belongs, an e-mail address and date added. A new contact may be added above the list of contacts by adding the contact name, e-mail address and group name. Each individual may also manage the groups with which they have contact by using the lower half of contacts window 60. Shown are the current groups with whom the user may establish contact, and for each group there is a group name 57, the number of contacts in that group, and the date that group was added to the individual's group list. In section 62 the user may also add an existing group to their group list, delete a group or define a new group. Share contacts 63 is an icon that brings up the share contacts window 71 below. Through the use of group management, the individual user has the power to create or delete groups for his or her own use.

FIG. 3B illustrates a contacts window 60 that appears when coworkers icon 22 is selected, and an instant collaboration window 64 that appears when a particular user is selected from the contacts list. In this example, the user Scott Smith has been selected to collaborate on a particular document with the current user. As shown, the collaboration window includes the name of the person to be invited, the type of rich media to be sent to the person 65, and permissions 66. The user may select any of the rich media types in order to attach that type of digital object to a given document. The download icon allows the coworker to download any document for which the coworker may have permission. The envelope icon indicates a private "direct reply" message to the selected coworker from the user.

In section 66 the user may allow the invited person to respond or not and must enter his or her password before sending the instant collaboration request. Upon sending the request, a corresponding alert will be generated for user Scott Smith and the calendar icon in his navigation bar of his client application will indicate that an alert is pending. Other ways of executing an invitation include having the system send an invitation with a hyperlink via traditional e-mail, sending a simple text message to a handheld device, or sending a text message to telephone voice mailbox using text-to-speech software to transform the text into sound.

Figure 3C:
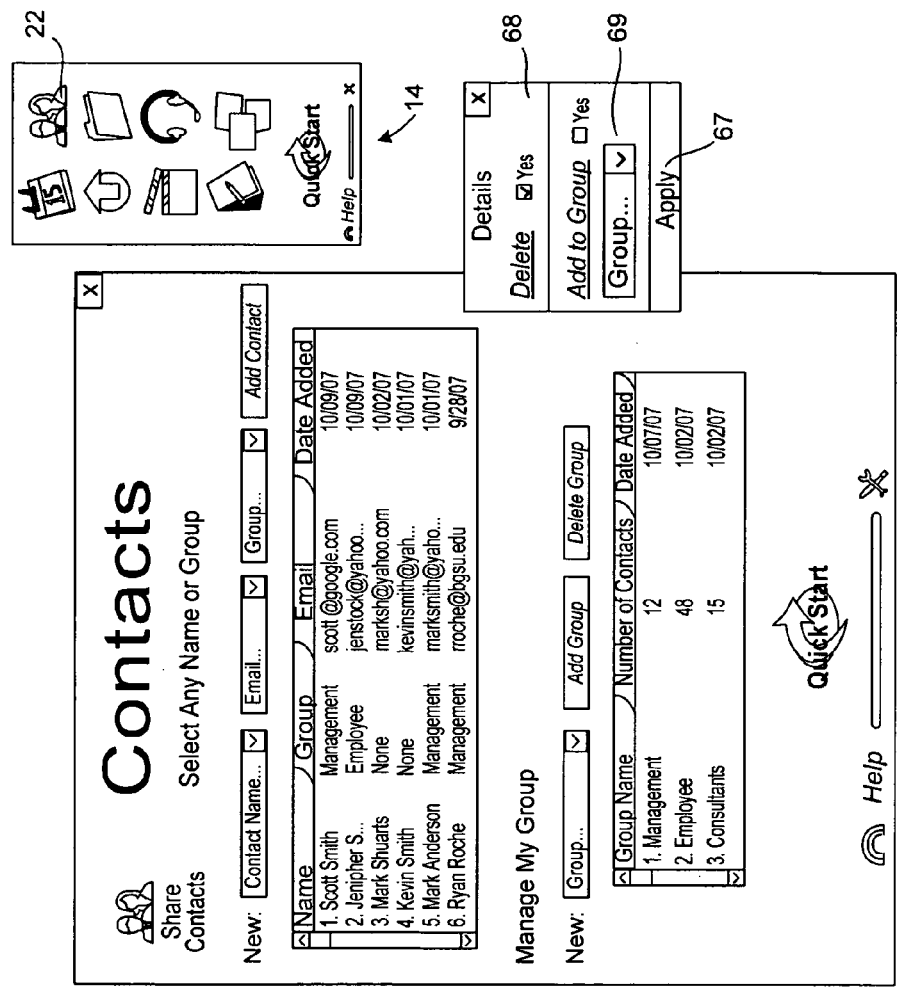
FIG. 3C illustrates a details window that appears when a particular contact is selected.

FIG. 3C illustrates a details window that appears when a particular contact is selected. The window includes a delete button number 68 in order to delete a user from the project, and an add button 69 in order to add a new user or group of users to a particular group 60. An apply button 67 allows these changes to take effect. The purpose of this details window is to add or remove users in a simple manner.

Figure 3D:
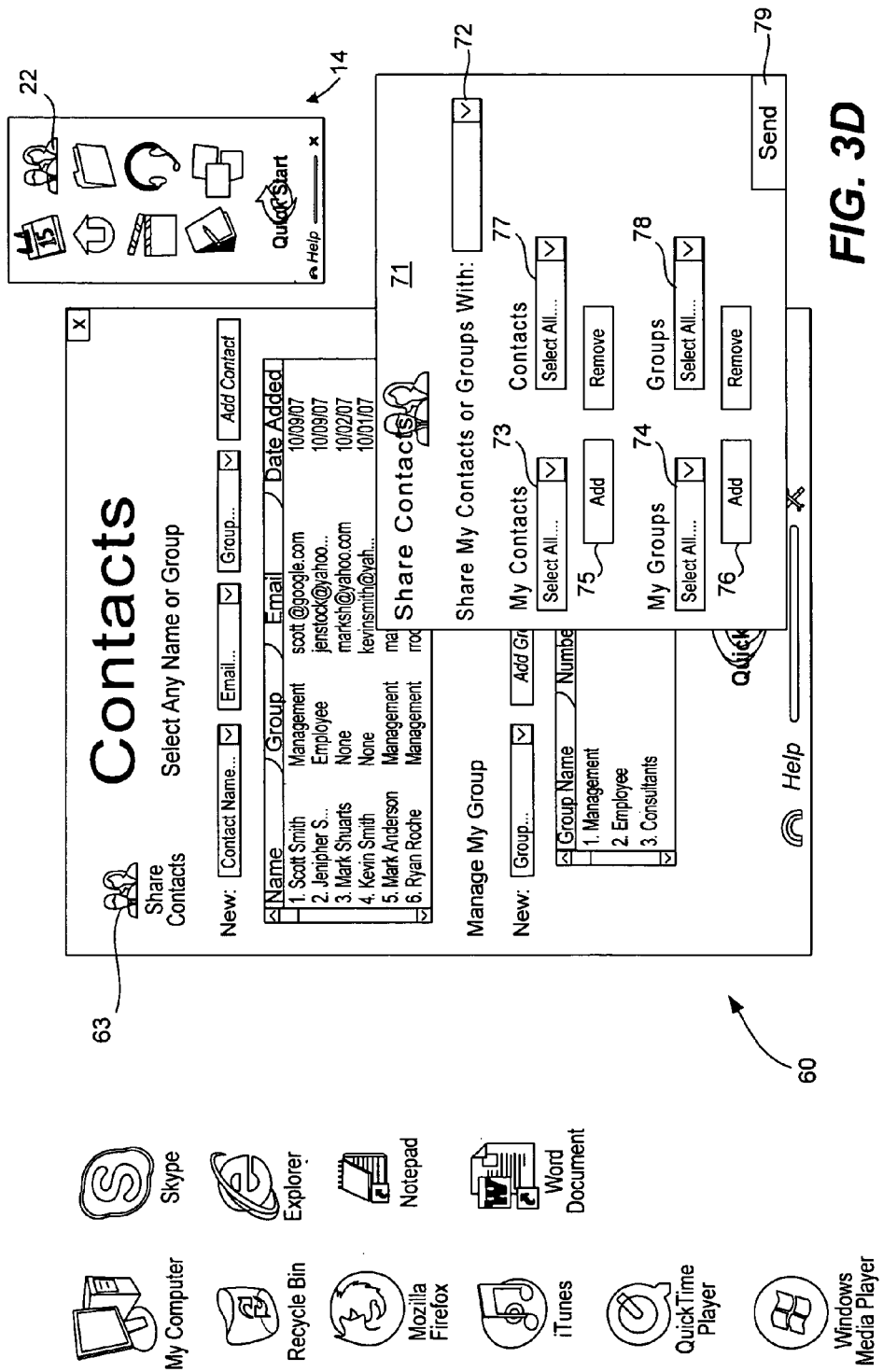
FIG. 3D illustrates a share contacts window that appears when share contacts is selected.

FIG. 3D illustrates a share contacts window 71 that appears when share contacts 63 is selected. Included is a selection field 72 to enable the user to select contacts or groups to share his or her contacts or groups with. Selection fields 73 and 74 allow the user to select the contacts or groups that will be shared using buttons 75 and 76. Fields 77 and 78 indicate the contacts or groups with whom the selections should be shared. The Remove buttons allow certain contacts or groups to be deleted. Send button 79 initiates the action of sharing the contacts and groups that have been selected.

Figure 4:
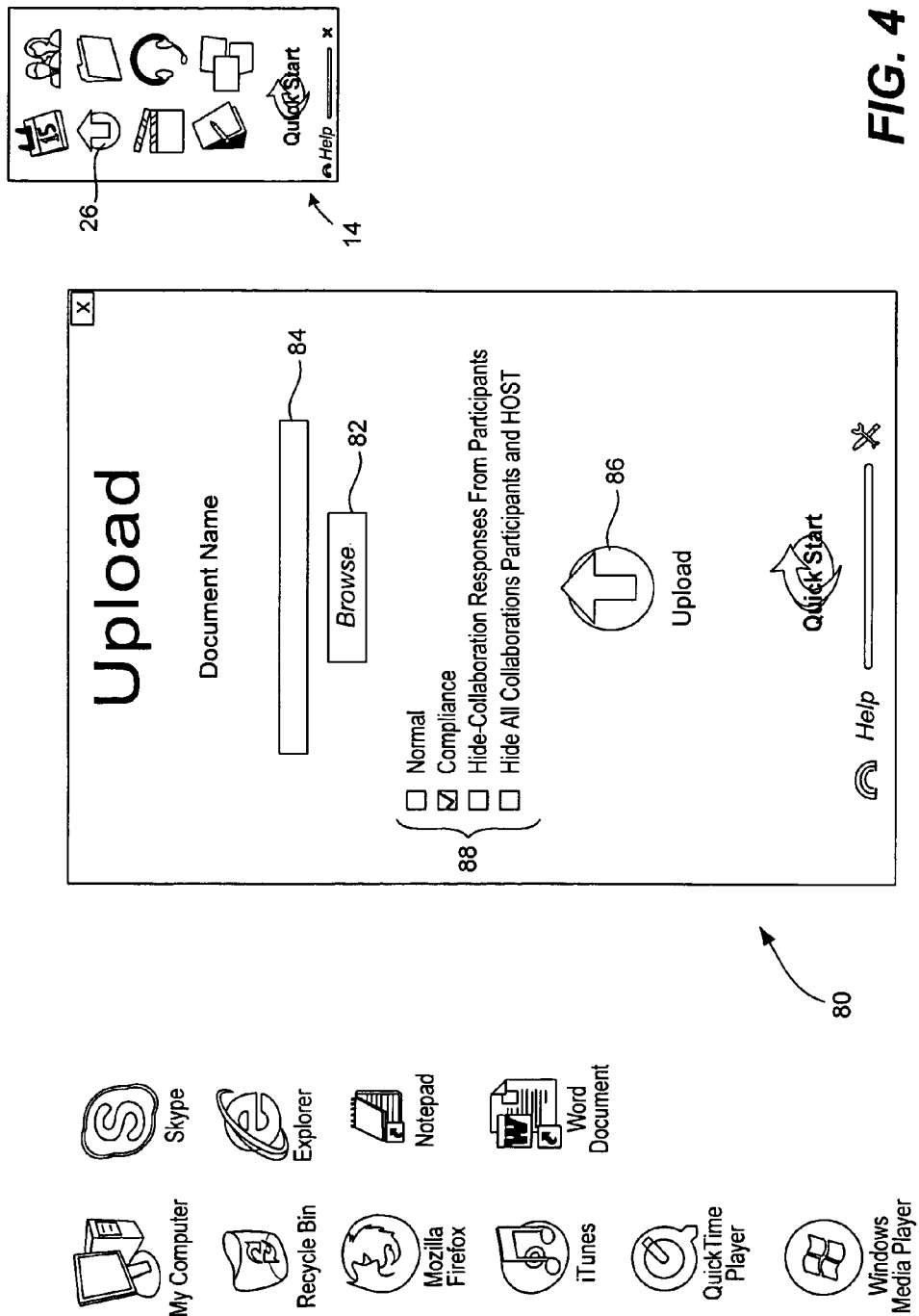
FIG. 4 illustrates an upload window that appears when upload icon is selected.

FIG. 4 illustrates an upload window 80 that appears when upload icon 26 is selected. Upload window 80 allows a user to browse his or her computer in order to select a particular document, photograph, video clip, music file, or any digital file to upload to a storage or repository server to begin or to continue a collaboration. Any uploading type browser may be used. The uploaded document may be a supporting document to attach to a particular source document, the uploaded document may be a file of digital information that will be annotated to the source document, or the uploaded document may be the original document for a new collaboration project. As shown, upload window 80 includes a browse button 82 for browsing files, a document name 84 and an upload button 86 for executing the upload. Check boxes 88 allow the user to specify whether the upload is normal, whether it is a compliance upload (meaning that the document will be backed up in a compliant manner, such as to multiple locations and as non-changeable files as required by regional or local governing rules), and whether the collaboration should be hidden from the various participants. A collaboration can be hidden from various participants by not allowing these participants to see names of other users or their annotations. The uploaded document then appears in the collaboration window 300 of FIG. 12A and is represented by an uploaded file icon.

Figure 13A:
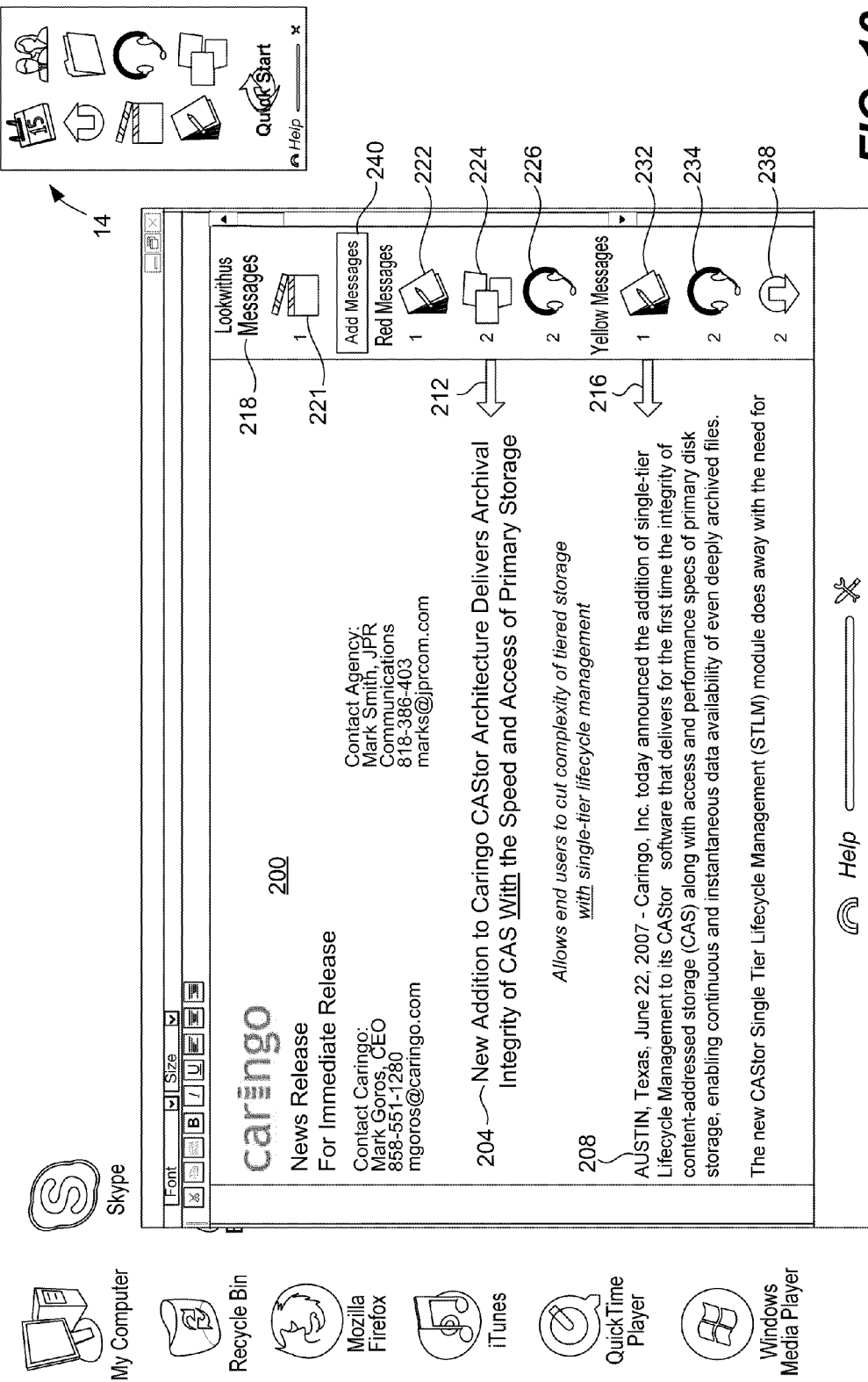
FIG. 13A illustrates a document that has been annotated with rich media by a user.

Preferably, any annotation to a document (i.e., any digital object to be attached to the document such as a video clip, sound file, etc.) is stored in the digital object repository with that document. Each repository will have an object-to-object relationship table in a metadata structure that indicates which annotations are attached to which documents. For example, a line in each table indicates an identifier for the annotation and an identifier for the corresponding document to which the annotation is attached. Indicating to a user where a file is attached to a document when viewed by a user may be done with relational color schemes. For example, FIG. 13A shows color-coded icons 212 and 216 indicating where particular annotations are attached in a document.

The execution of the upload window is able to direct the uploaded document to a particular location. Once upload button 86 is selected, the upload window will direct the document to the residing repository. The residing repository is set up by the local IT server administrator when the system software is being used on a private network, or it is automatically set up when dealing with a Lookwithus.com, Inc. site or when dealing with a third-party hosted site like Amazon S3 or with a CDN-type service company.

Figure 5:
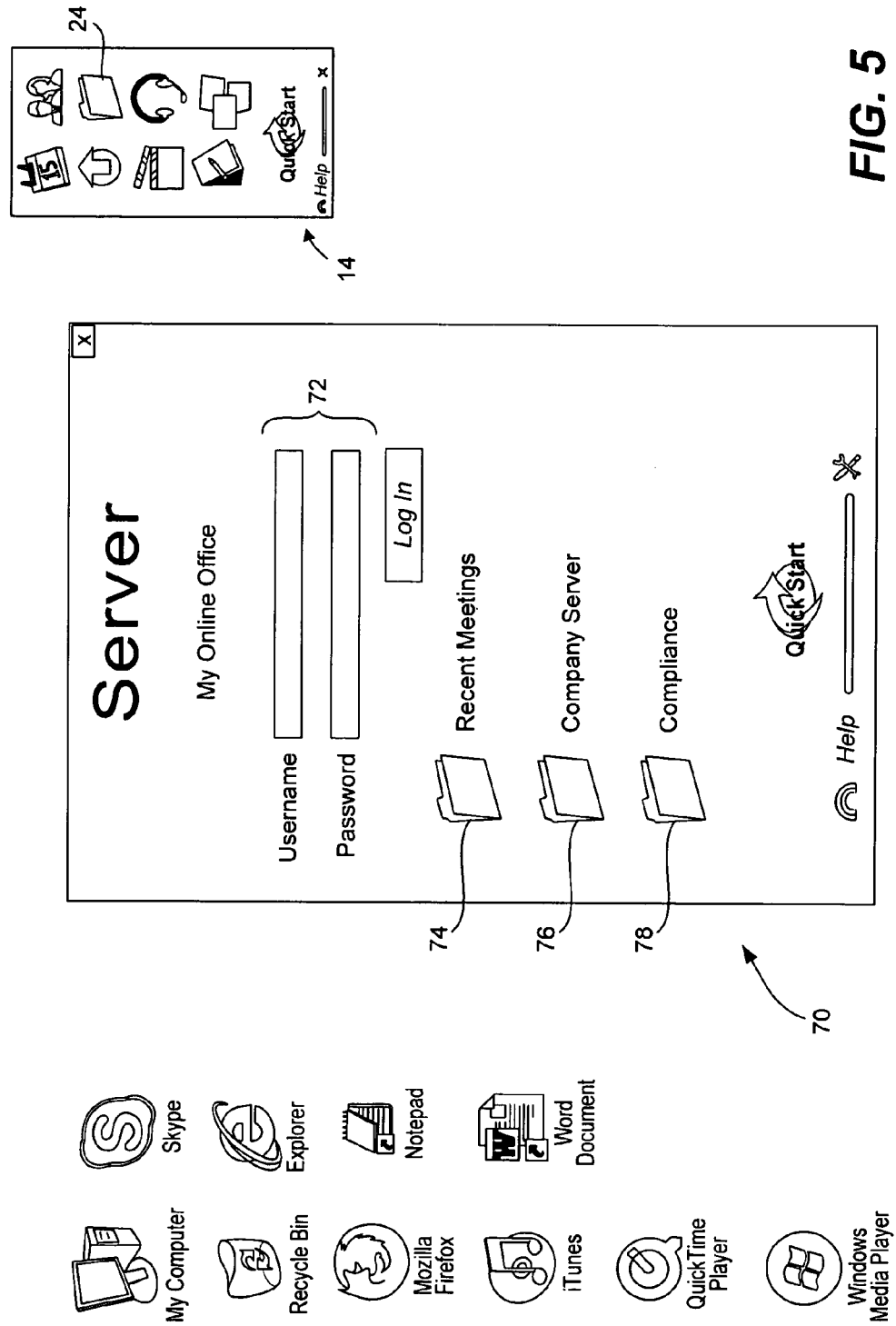
FIG. 5 illustrates a server window that appears when folder icon is selected.

FIG. 5 illustrates a server window 70 that appears when folder icon 24 is selected. Server window 70 allows a user to immediately view the file server or servers of his or her company. Of course, permissions may be set up to allow the user to view only particular file servers or to view file servers across a range of departments, subsidiaries, geographic regions, or other subset or superset of available file servers. As shown, server window 70 preferably requires the user to enter a user name and a password 72 in order to log in. Once logged in, the available folders or directories 74, 76 and 78 are displayed. By clicking upon one of the displayed folders the user has access to documents within that folder.

Figure 6:
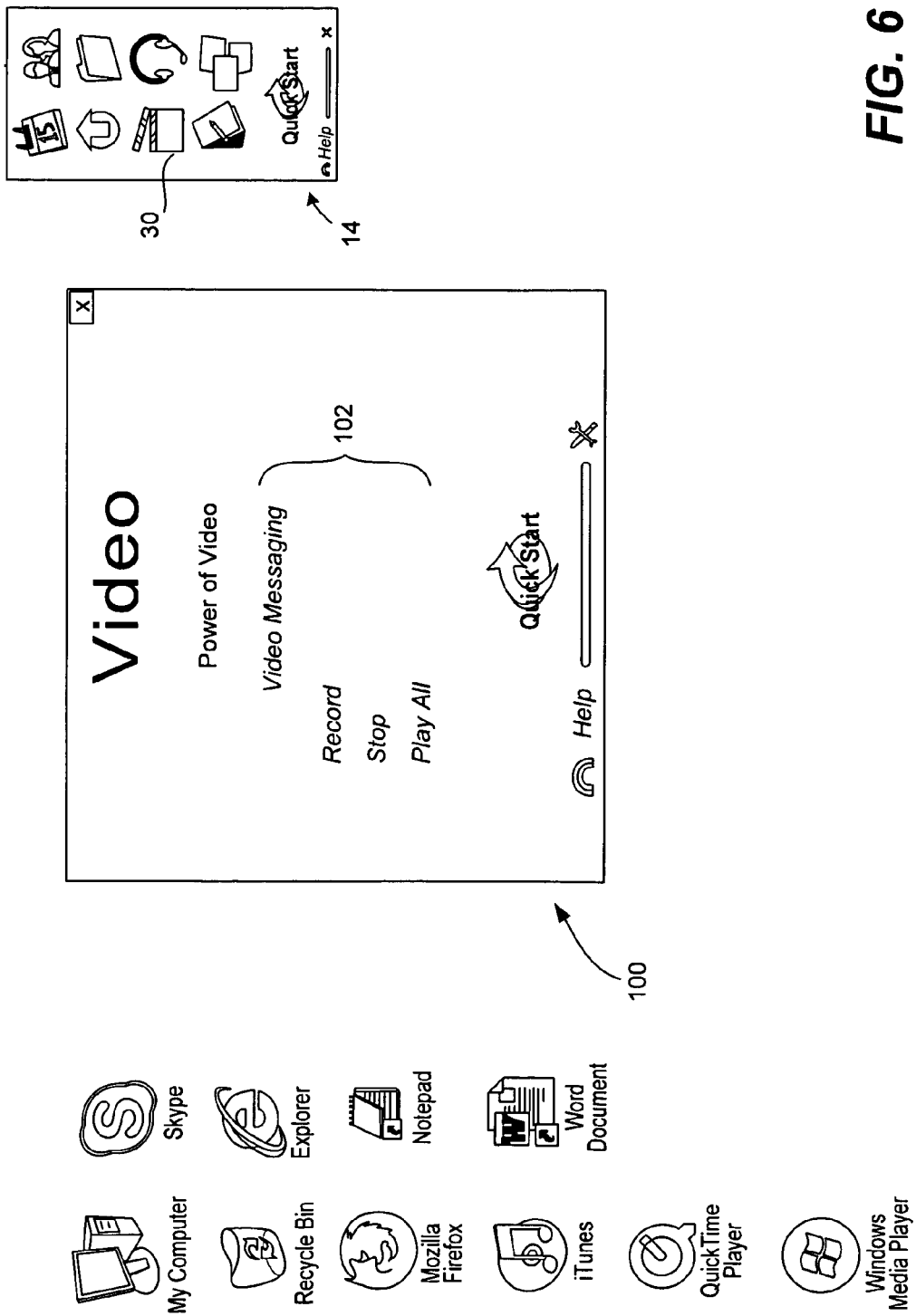
FIG. 6 illustrates a video window that appears when clapboard icon is selected.

FIG. 6 illustrates a video window 100 that appears when clapboard icon 30 is selected. Video window 100 allows a user to annotate video data to a particular document (including motion video or still images). Included also are buttons 102 for directly recording video or an image from a computer-attached camera, and a duration indicator of the video file being recorded. A user may browse his or her local computer in order to find a particular video file to annotate to a document, or the user may attach a video file that is recorded using buttons 102. A quick start icon at the bottom of the window provides the ability to begin a collaboration as shown in FIG. 12A. In order to fast-forward or rewind the user drags an icon on the bottom timeline to the position where they would like to begin viewing or to begin recording.

Figure 7:
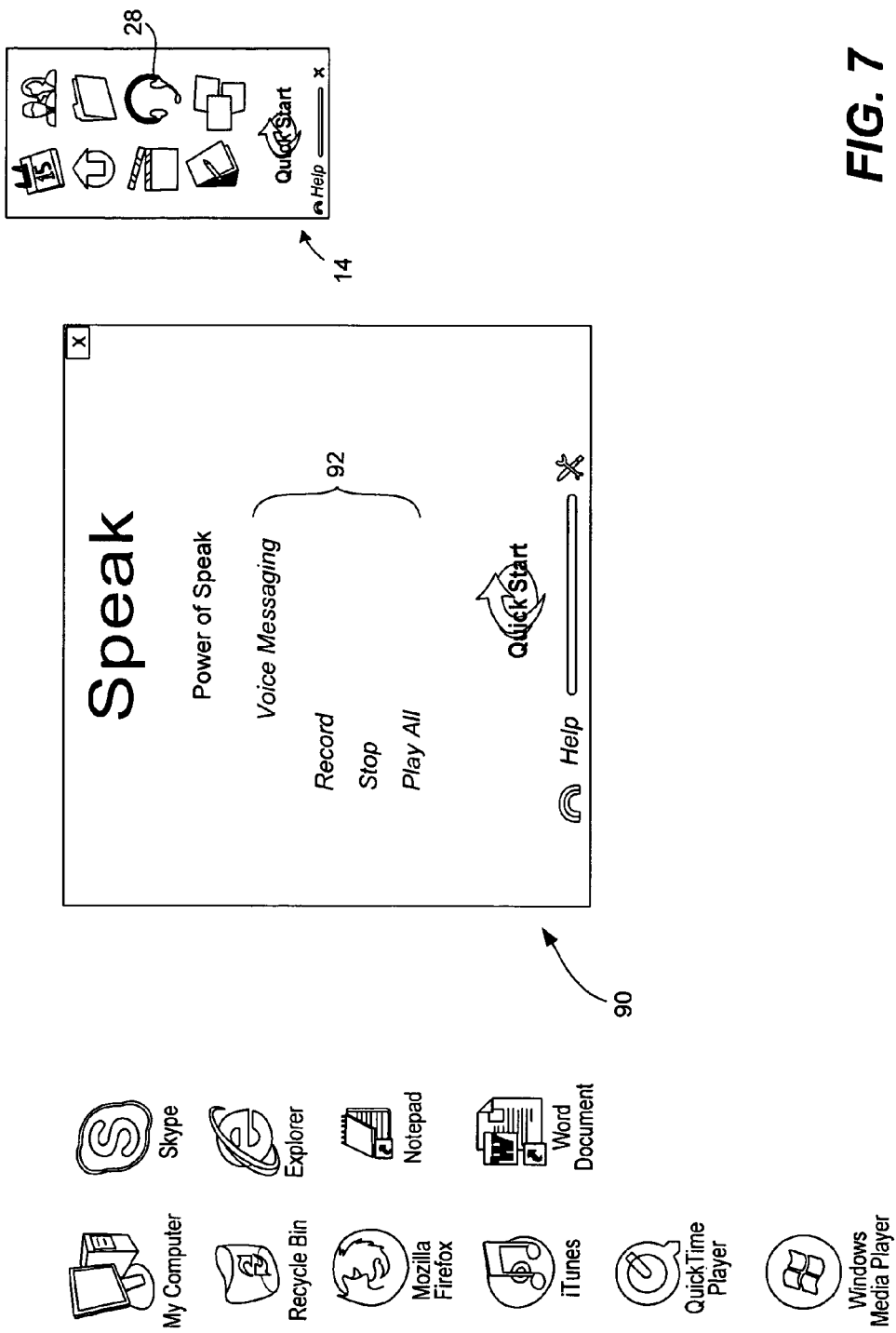
FIG. 7 illustrates a sound window that appears when headphones icon is selected.

FIG. 7 illustrates a sound window 90 that appears when headphones icon 28 is selected. Sound window 90 allows a user to annotate voice or sound data to a particular document. Included also are buttons 92 for directly recording voice or sounds from the computer microphone, and a duration indicator of the sound file being recorded. A user may attach a sound file that is recorded using buttons 92. A quick start icon at the bottom of the window provides the ability to begin a collaboration as shown in FIG. 12A. In one embodiment, relational color schemes are used to indicate where a sound file is actually attached to a document. In order to fast-forward or rewind the user drags an icon on the bottom timeline to the position where they would like to begin listening or to begin recording.

Figure 8:
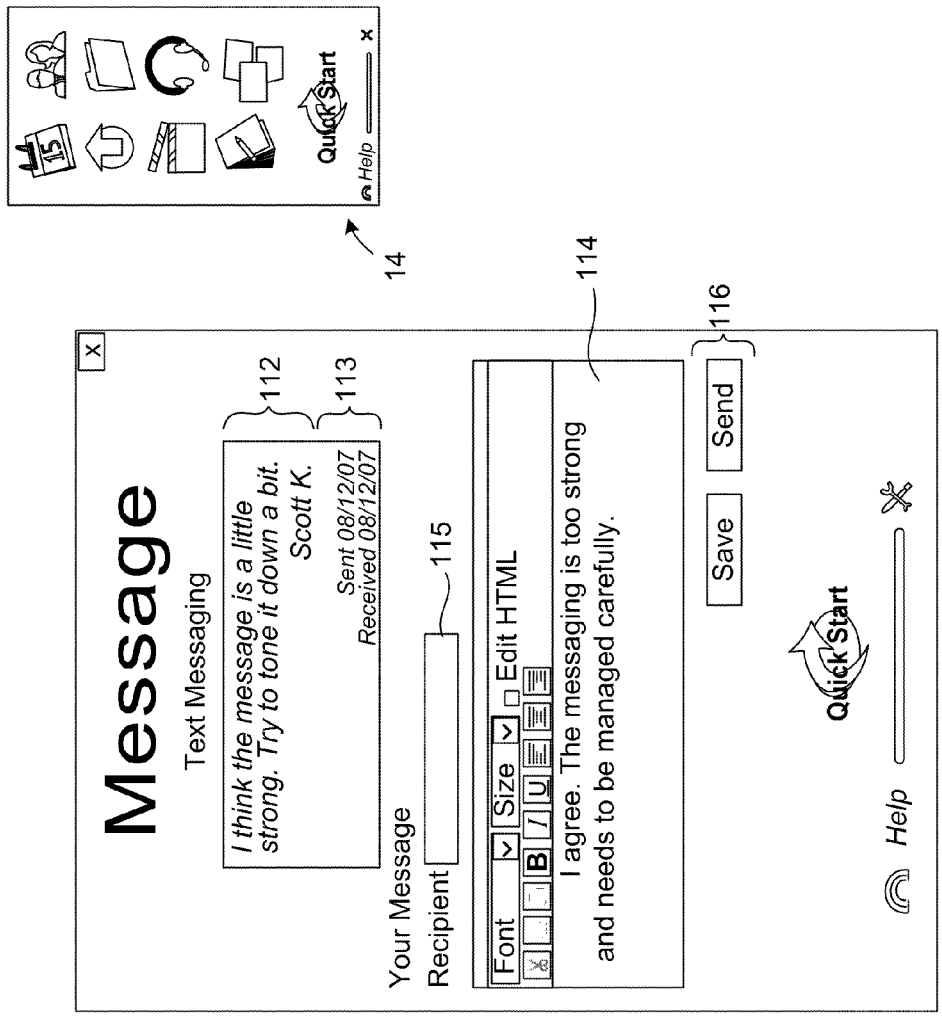
FIG. 8 illustrates a text window that appears when notepad icon is selected.

FIG. 8 illustrates a text window 110 that appears when notepad icon 32 is selected. Text window 110 allows a user to annotate text to a particular document (including text, symbols, formulas, graphics, animation, etc.). Included are any previous text annotations 112 found at a particular place in the document along with time and date information 113. Previous text annotations are any text that another user has already added to the document that can be viewed by the current user when deciding whether to add a text annotation of his own at that particular point in the document. Window 114 is where the current user types (or dictates using speech recognition software) the text that he or she wishes to annotate at that particular point in the document. Buttons 116 perform a "save" of the text with the annotated document when selected, or a "send" of the text when selected. The send option is used to add the annotations or to initiate the creation of a document for annotating. A quick start icon at the bottom of the window provides the ability to begin a collaboration as shown in FIG. 12A. The user may indicate at which point in a document to attach text by a user interface that uses color-coded icons to indicate an attachment point. For example, FIG. 13A illustrates arrows 212 and 216 showing where attachments have been made.

Figure 9:
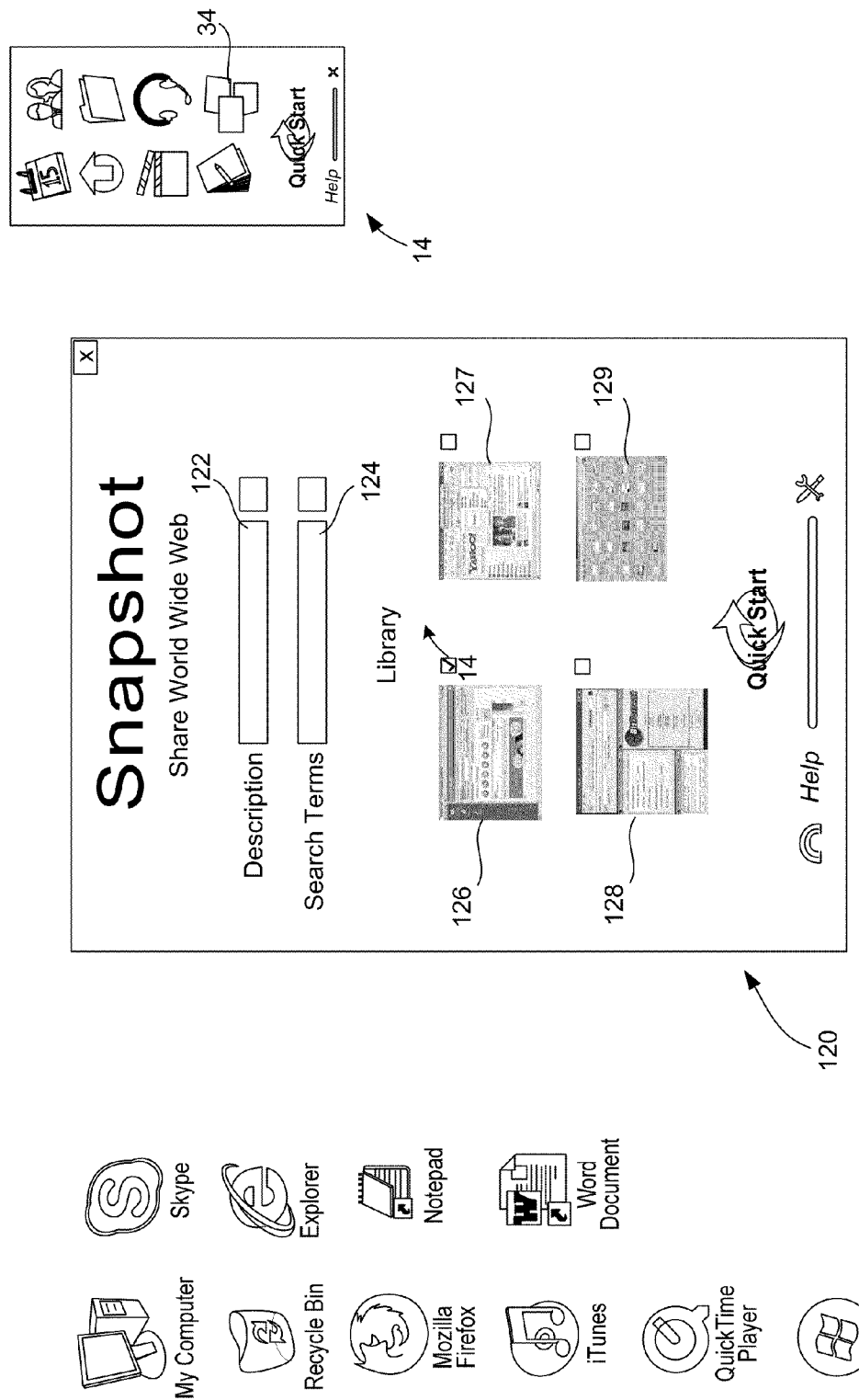
FIG. 9 illustrates a snapshot window that appears when snapshots icon is selected.

FIG. 9 illustrates a snapshot window 120 that appears when snapshots icon 34 is selected. Snapshot window 120 allows a user to annotate a snapshot to a particular document (including a snapshot of a web page, a screen shot of a computer screen, a portion of the screen or an image). Included are a description 122 of the snapshot, any snapshots 126-129 in a library, and search terms 124. As shown, image 126 has been selected as an attachment.

Search terms 124 are used in association with the description of the attached snapshot in order to provide searchable terms for that snapshot in order to share the snapshot with more than just the viewers of the annotated document. One may add search terms so that the snapshot image is picked up by search engines or other software and then shared for social networking, informational or educational purposes. Snapshots are placed into the library and selected using the upload button 80 or using the technique described in FIG. 12A.

The above has described the creation and selection of rich media for attachment to a particular document. Once a user has annotated a source document with a digital attachment the source document and attachment are both uploaded to a repository as described below for later viewing or collaboration by other users. Uploading is also used for storage, archiving, and compliance. Compliance may require a user-defined time based on applicable compliance laws.

Figure 10:
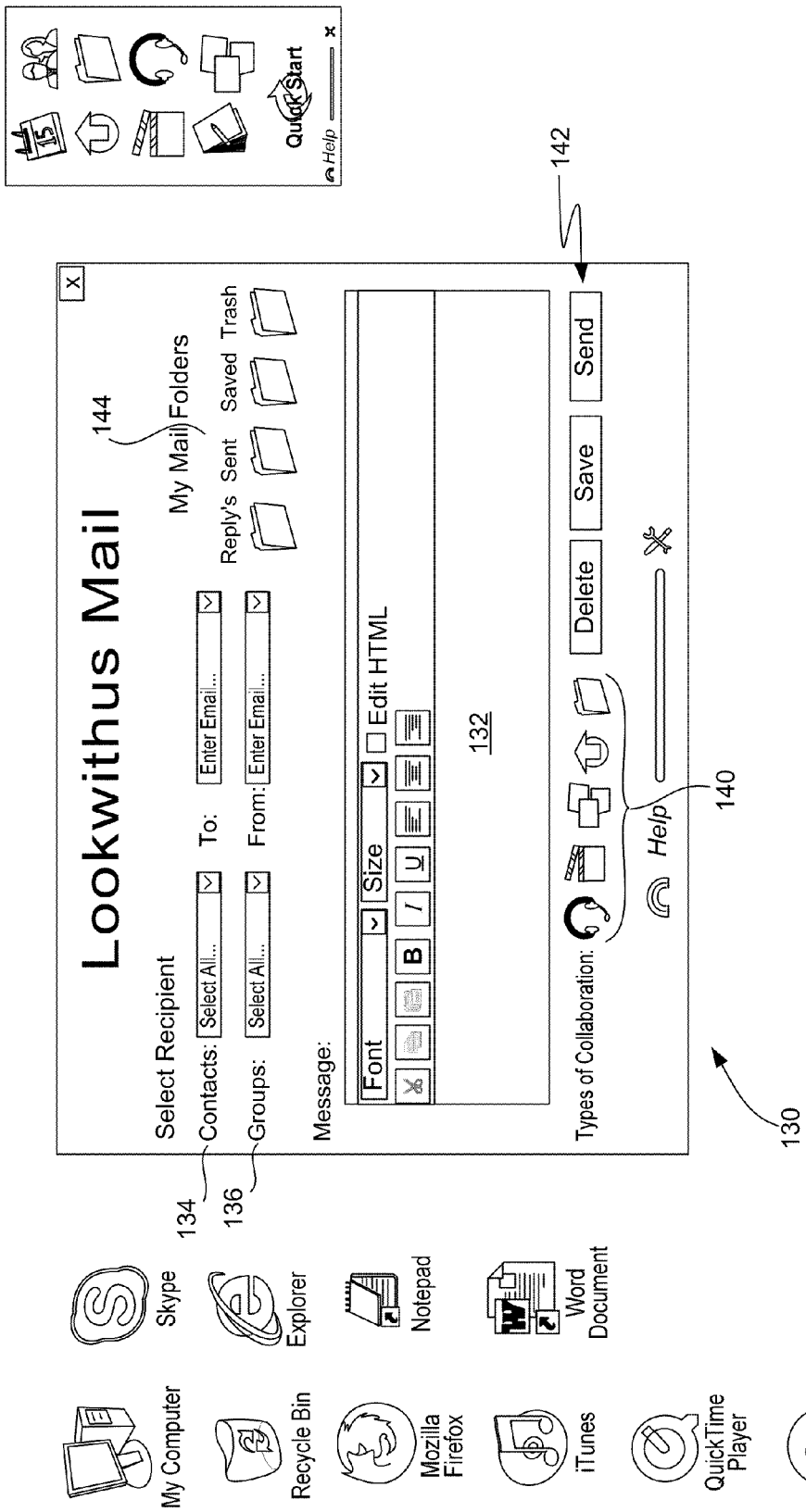
FIG. 10 illustrates an e-mail window that appears when selected.

FIG. 10 illustrates an e-mail window 130 that appears when the application is selected. For example, the e-mail window is launched by the LWU Client application. The user interface is part of the set of libraries used by the LWU Client application.

Selection of this icon invokes an e-mail module of the client application that may be used to send electronic mail between users of the collaboration system. Implementation of the e-mail module may be done using off-the-shelf e-mail modules or by implementing an e-mail module similar to known e-mail modules as is known to those of skill in the art. The e-mail module may be implemented using numerous options. Given that POP and IMAP are existing protocols and clients, one may simply implement an existing POP/IMAP client and then modify the messaging translation at the LWU Repository API 806 in FIG. 23. Alternatively, one may implement a proprietary POP/IMAP module for reasons of performance, scalability and security. If this proprietary module is implemented, the implementation is secured by the same digital certificates upon which the authentication gateway is implemented. This e-mail module (LWU mail) allows a user to send messages to other users using traditional mail servers.

The e-mail functionality may differ from the alert functionality in the following sense. Should POP or IMAP integration be required, the LWU application provides alerts via existing e-mail transfer methods. For example, instead of an alert being activated in the user's LWU client, the alert is sent to the registered e-mail address configured in user management. This feature is most likely used by users participating in collaboration but who do not have the LWU client installed on their computer.

E-mail window 130 includes a box 134 to select one of the user's contacts, a box 136 to select one of the user's groups, or a box 138 to enter a specific e-mail address. The text of the message is entered into window 132 and buttons 142 allow a message to be deleted, saved or sent. Folders 144 save previously handled messages. Box 140 is provided to show which types of media or digital objects have been added to the collaboration for which the user is sending an invitation to view. In this example, the types of collaboration include a sound file, a video clip, a snapshot, an uploaded file, or a file from a local server. The message is stored in a repository, for example, it is stored in the LWU repository.

Figure 11:
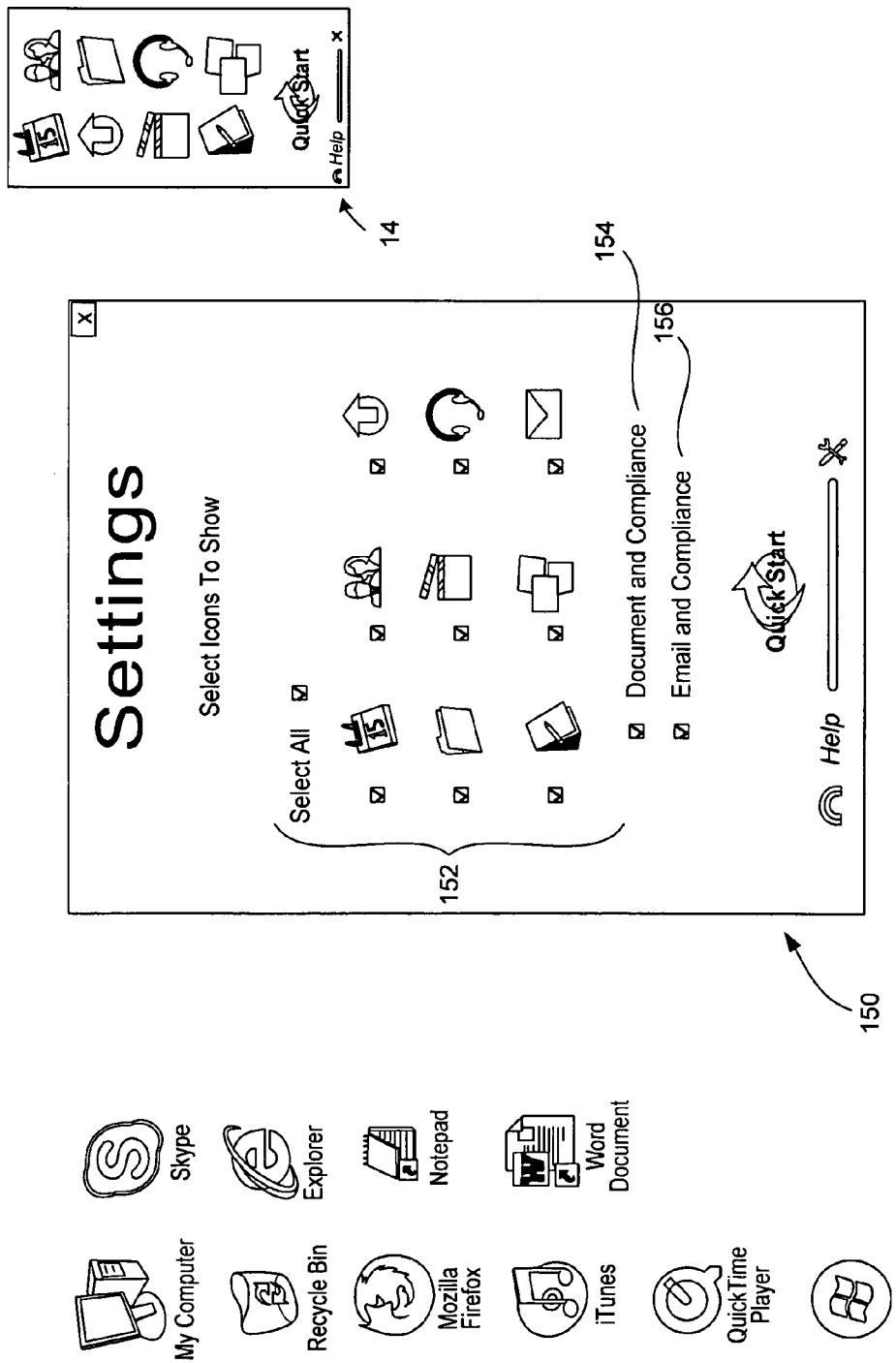
FIG. 11 illustrates a settings window that appears when the wrench icon is selected.

FIG. 11 illustrates a settings window 150 that appears when the wrench icon is selected. This window allows the user to choose which of icons 152 will appear in navigation bar 14. A "document and compliance" checkbox 154 allows the user to set compliance regulations for the document in a compliant manner, while an "e-mail and compliance" checkbox 156 allows a user to keep all e-mail or alerts backed up in a compliant manner.

User Interface—Start a Collaboration

FIG. 12A illustrates a "collaboration wizard" window 300 that is invoked when a user selects the quick start icon. This submodule of the client application is invoked when the user wishes to identify a document for collaboration and then invite other users of the system to collaborate upon that document, and is handled internally by the system as a "create interaction" step 636.

Window 300 includes a start tab 301, a collaborate tab 302, an invite tab 303 and a send tab 304. The start tab is used to identify a particular digital object that the user wishes to start a collaboration upon. Section 308 allows the user to type in a particular file name, browse for files on his or her computer, or look through folders on a company server. For example, window 309 shows a preview of a document that has been listed above. Alternatively, section 312 allows a user to type in the name of an image, browse his or her computer, or look through folders on a company server to identify a snapshot. Library 313 allows a user to select one of many snapshots that reside in a library on the user's own computer. Once a particular digital object has been selected for collaboration the user may select the next button or select tab 302 directly.

Figure 12B:
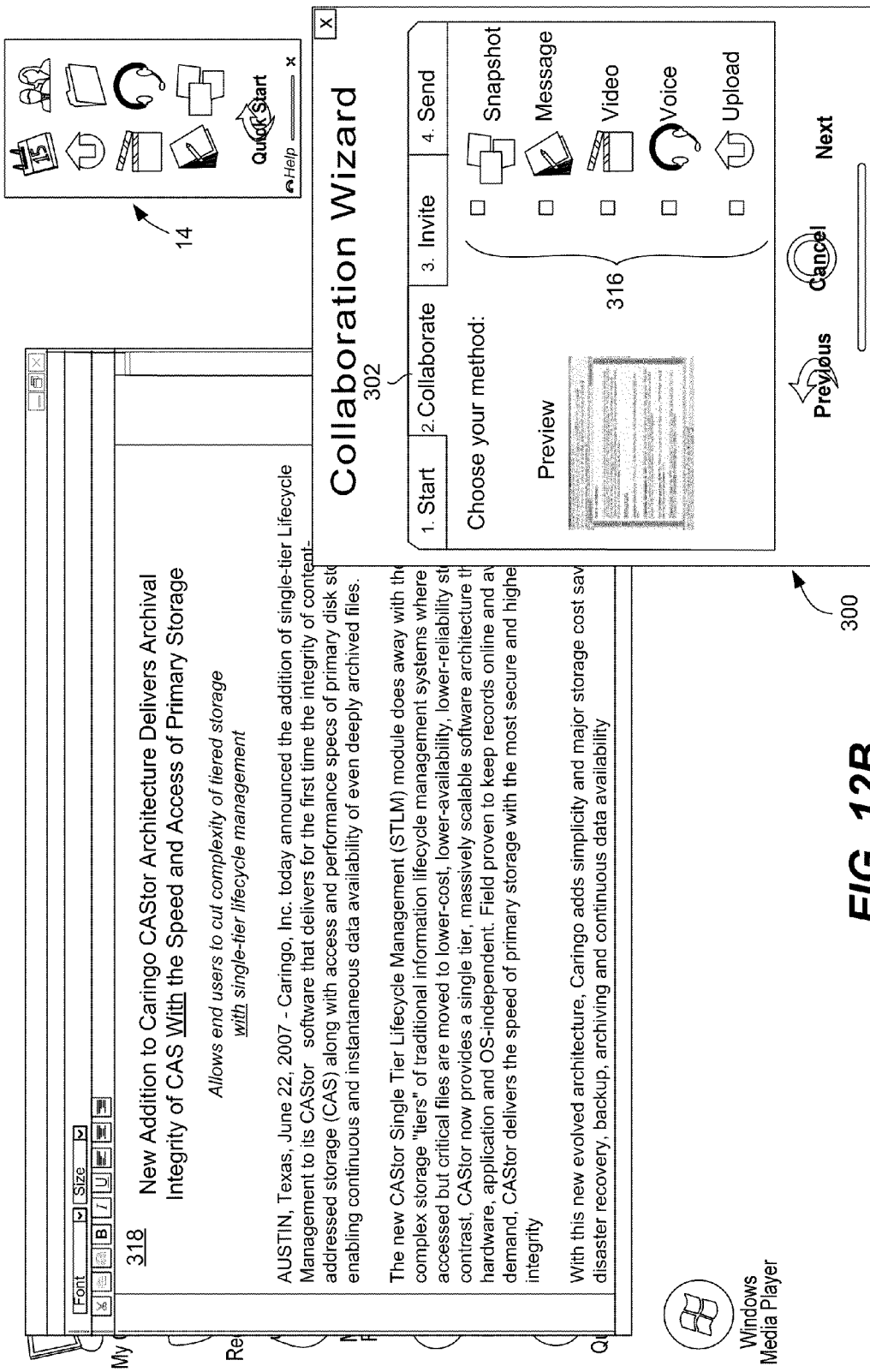
FIG. 12B illustrates a document opened with its relevant software application when the collaborate tab is selected from window.

FIG. 12B illustrates a document 318 opened with its relevant software application (in this case, Microsoft Word) when collaborate tab 302 is selected from window 300. Once the collaborate tab is selected the identified document or snapshot is opened using the particular software application that is able to open and view that particular digital object as is known to one of skill in the art. For example, a spreadsheet application would open a spreadsheet, a word processing application would open a document, an image viewer would open a JPEG file, Adobe Acrobat would open a PDF file, etc. Once the document 318 has been opened the user is then able to choose how to collaborate upon that document by attaching any of a number of rich media types. Of course, it is not necessary that any attachments be added—the user may simply invite and send the selected document to other users for their collaboration. As shown, section 316 allows the user to attach to the document any number of uploaded digital objects, snapshots, text messages, video clips or sound clips.

Figure 12C:
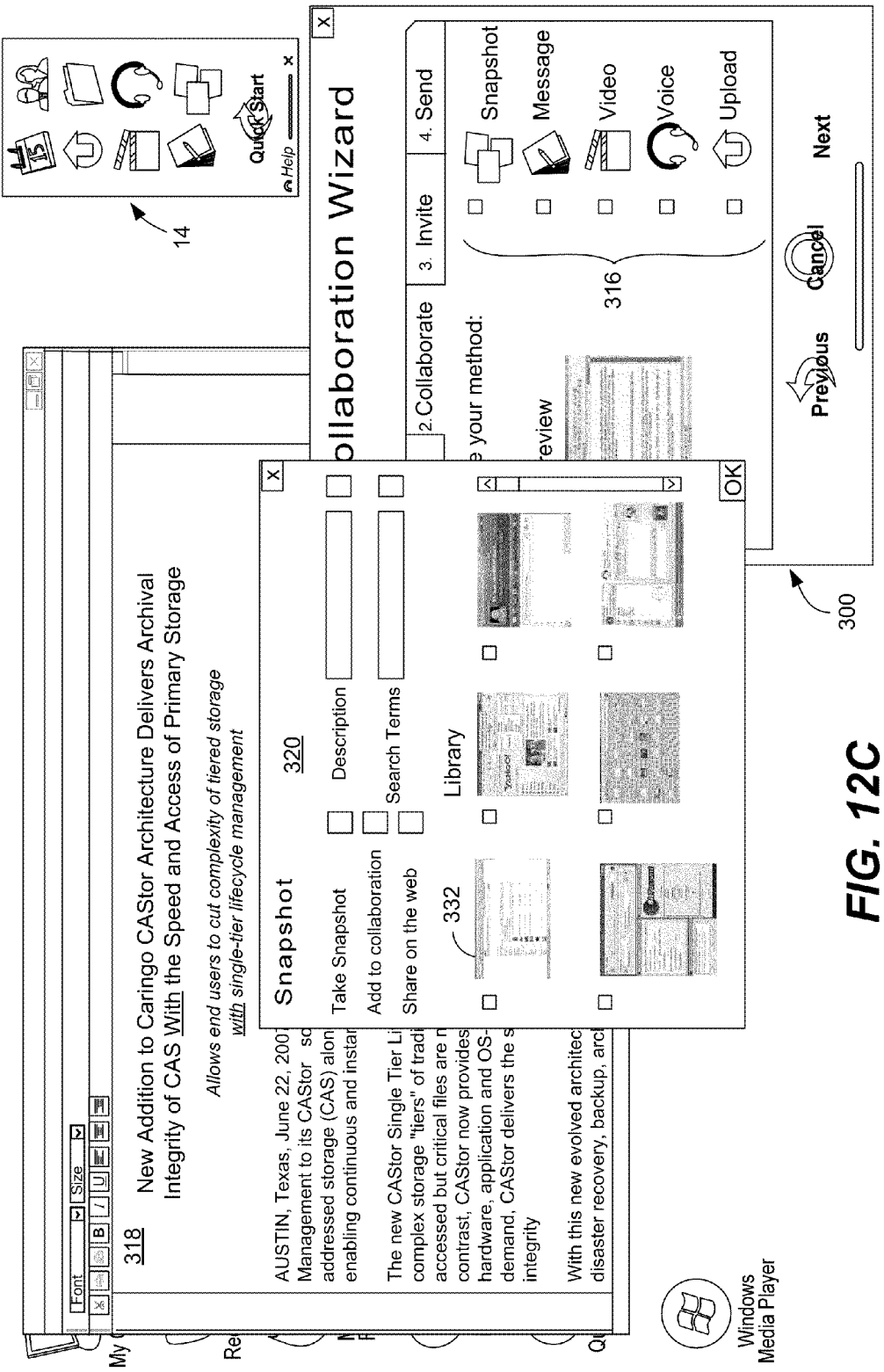
FIG. 12C illustrates that snapshot window opens when the user selects snapshot in section.

FIG. 12C illustrates that snapshot window 320 opens when the user selects snapshot in section 316. Window 320 allows the user to attach any of a number of snapshots 322 to the document 318. The user may simply select a snapshot 322 from his or her personal library, may take a snapshot using a camera attached to his or her computer, and may also add a description and search terms to the selected snapshot. The checkbox "add to collaboration" is for adding to the project as another annotation. The checkbox "share on the Web" will give the collaboration attributes so that a search engine may pick up only the selected annotation to share on the World Wide Web.

Figure 12D:
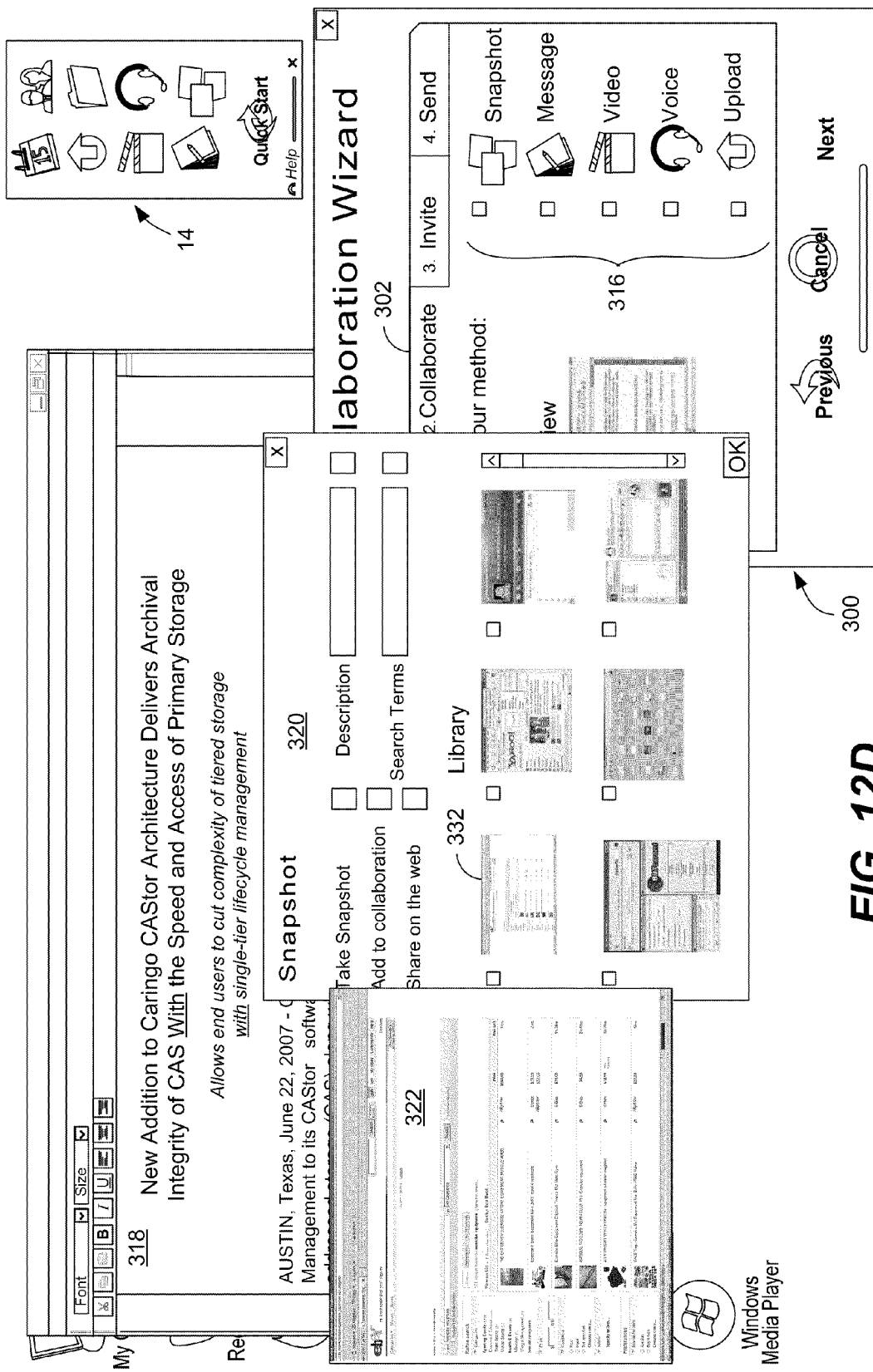
FIG. 12D illustrates the full version of snapshot that appears when the user checks the box for that snapshot in the library section of window.

FIG. 12D illustrates the full version of snapshot 322 that appears when the user checks the box for that snapshot in the library section of window 320. As shown, snapshot 322 is an image of a web page that the user wishes to attach to document 318. Once the OK button is selected in window 320 the snapshot will be attached to document 318 so that others may view it when they review the document.

Figure 12E:
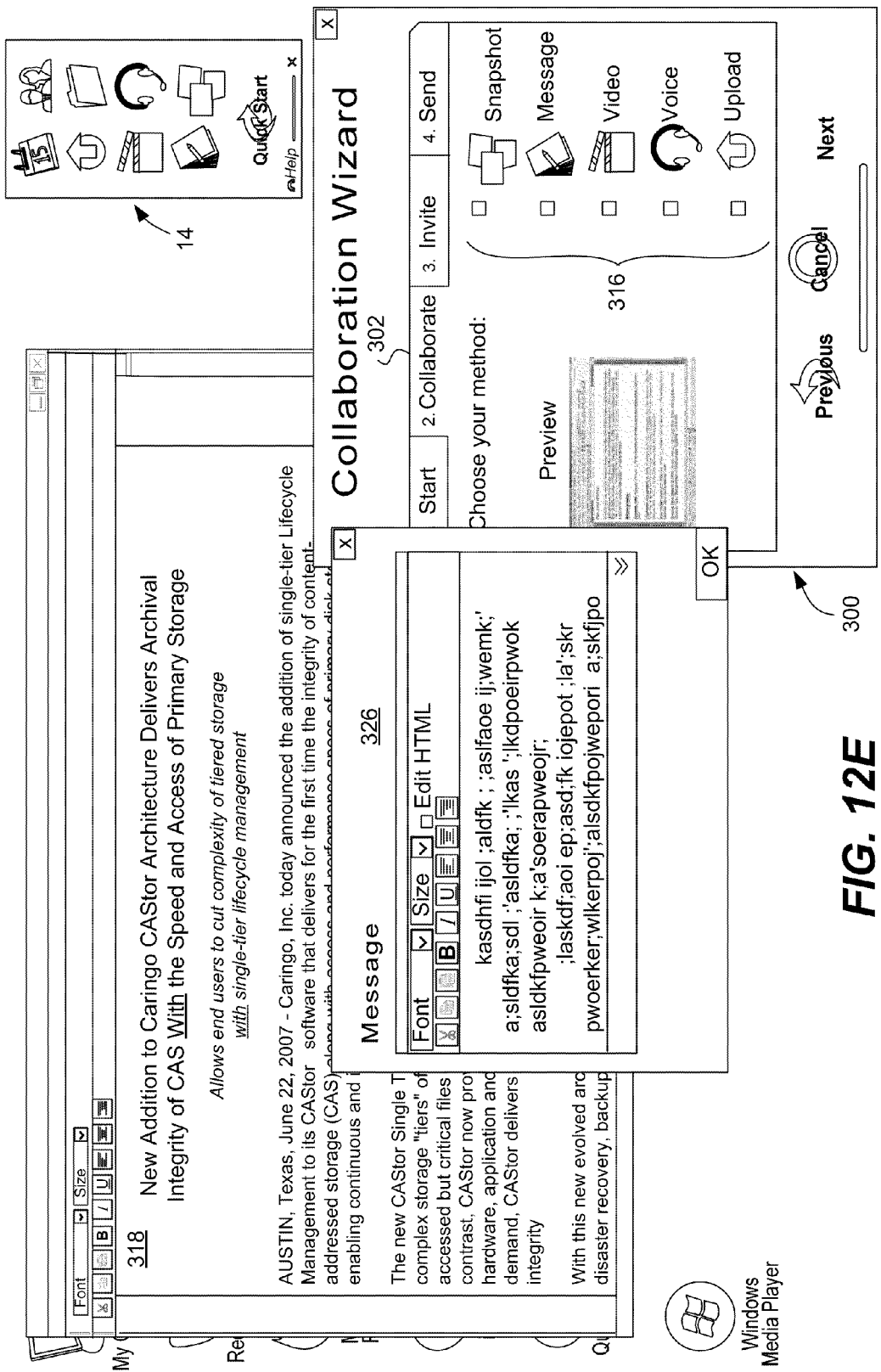
FIG. 12E illustrates that message window opens when the user selects message in section.

FIG. 12E illustrates that message window 326 opens when the user selects message in section 316. Window 326 allows the user to attach any amount of text to the document 318. The user simply types or dictates the text he or she wishes to attach. Once the OK button is selected in window 326 the message will be attached to document 318 so that others may view the text when they review the document as an alert.

Figure 12F:
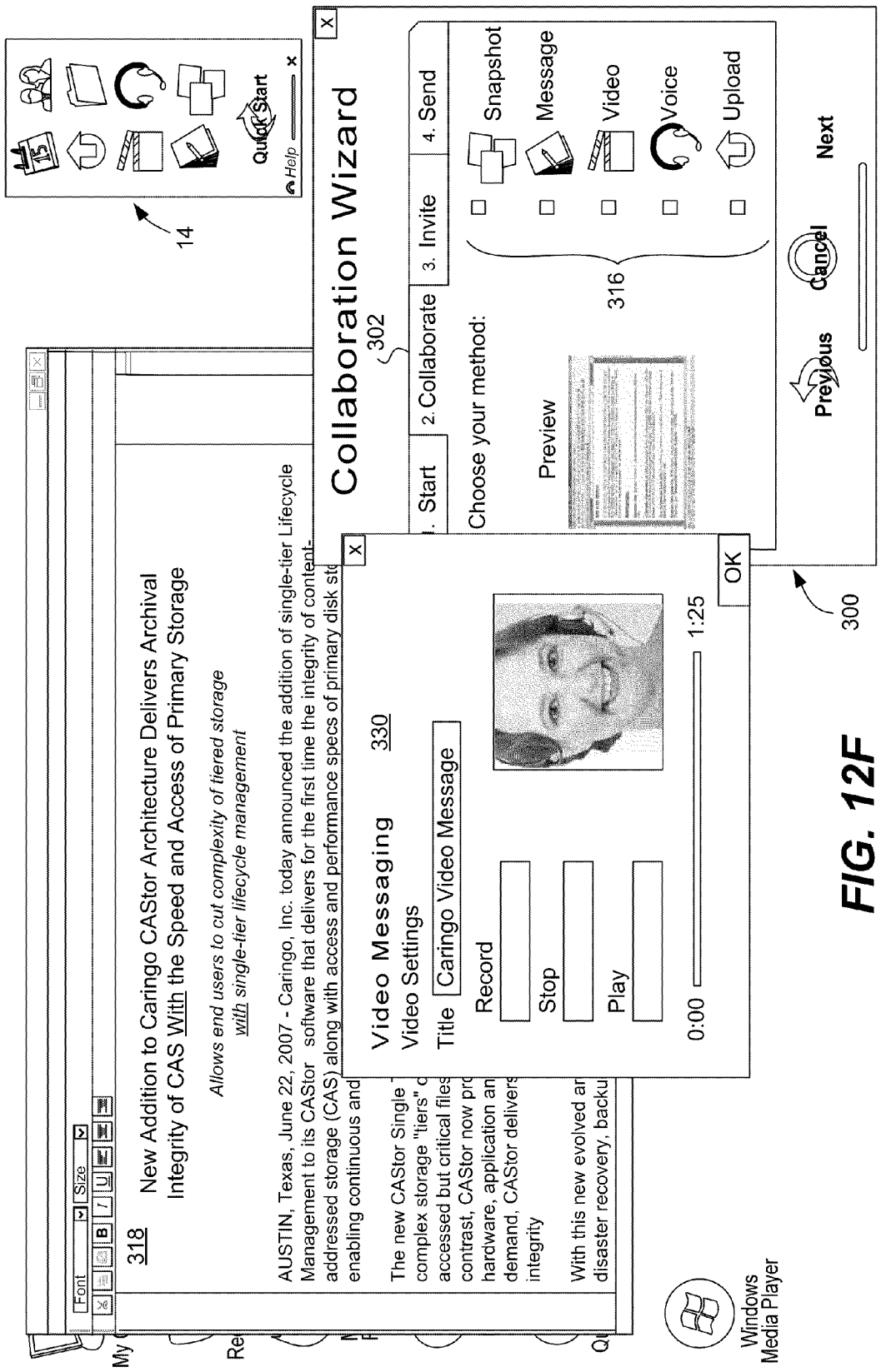
FIG. 12F illustrates that video window opens when the user selects video in section.

FIG. 12F illustrates that video window 330 opens when the user selects video in section 316. Window 330 allows the user to attach any video clip to the document 318. The user simply uses buttons in window 330 to control a video camera attached to his or her computer in order to create a video clip that he or she wishes to attach. Alternatively, a user may attach a prerecorded video clip by using the upload button in section 316 to select a prerecorded video clip file. Once the OK button is selected in window 330 the video clip will be attached to document 318 so that others may view the video when they review the document.

Figure 12G:
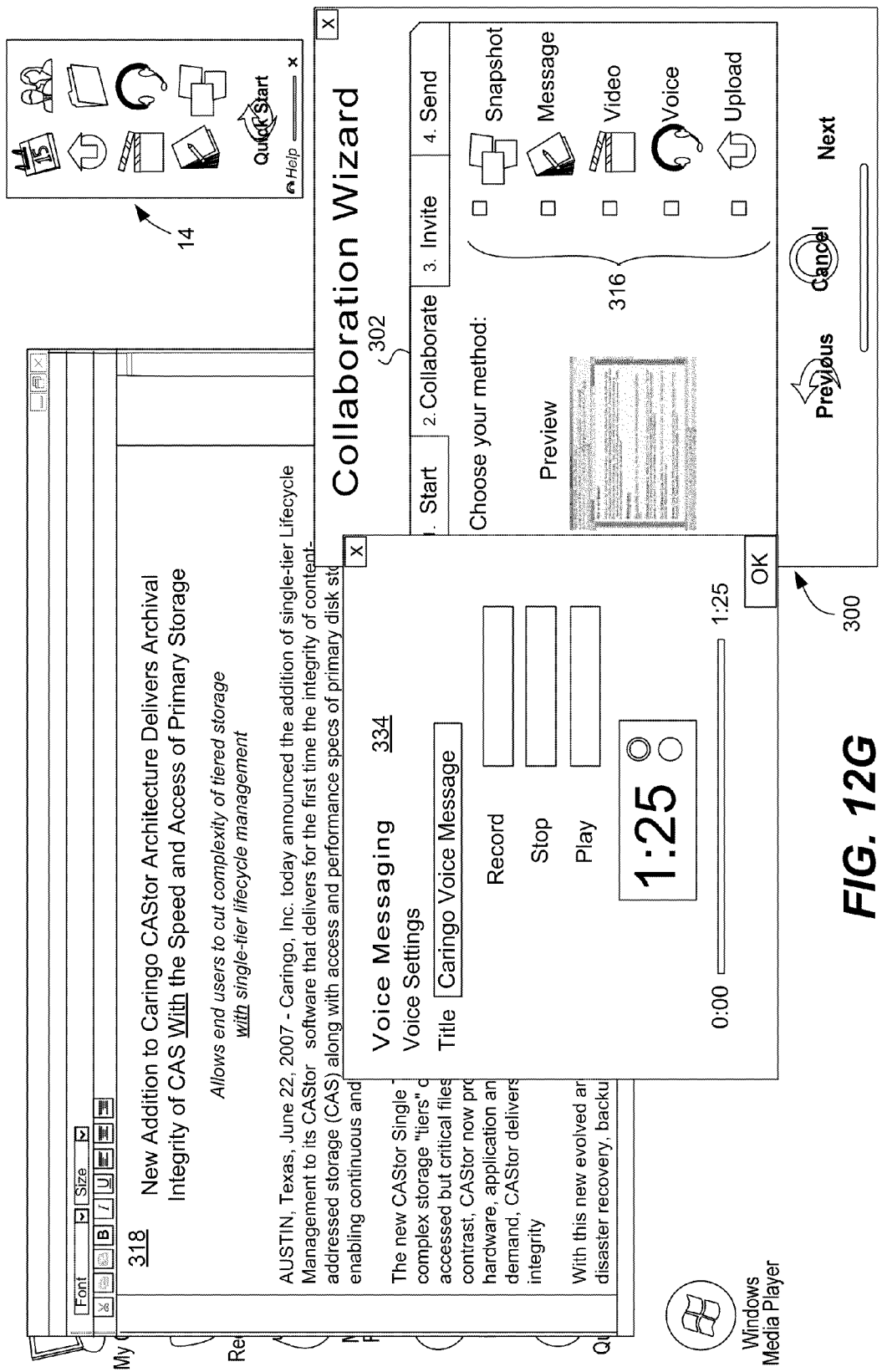
FIG. 12G illustrates that sound window opens when the user selects voice in section.

FIG. 12G illustrates that sound window 334 opens when the user selects voice in section 316. Window 334 allows the user to attach any sound clip to the document 318. The user simply uses buttons in window 334 to record sound using a microphone attached to his or her computer in order to create a sound file that he or she wishes to attach. Alternatively, a user may attach a prerecorded sound file by using the upload button in section 316 to select a prerecorded sound file. Once the OK button is selected in window 334 the sound file will be attached to document 318 so that others may listen to the sound file when they review the document.

Figure 12H:
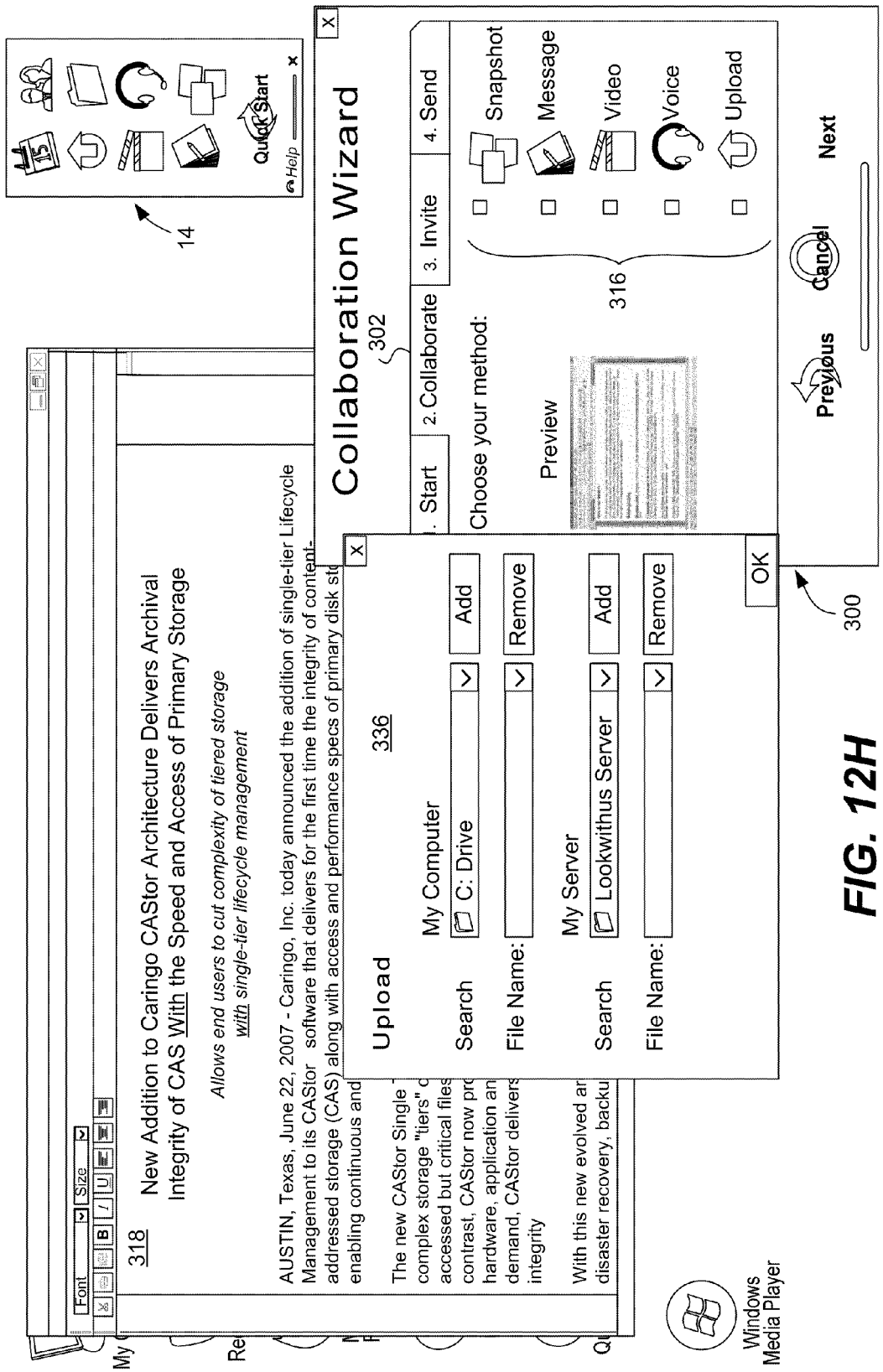
FIG. 12H illustrates that upload window opens when the user selects the upload icon in section.
Figure 12I:
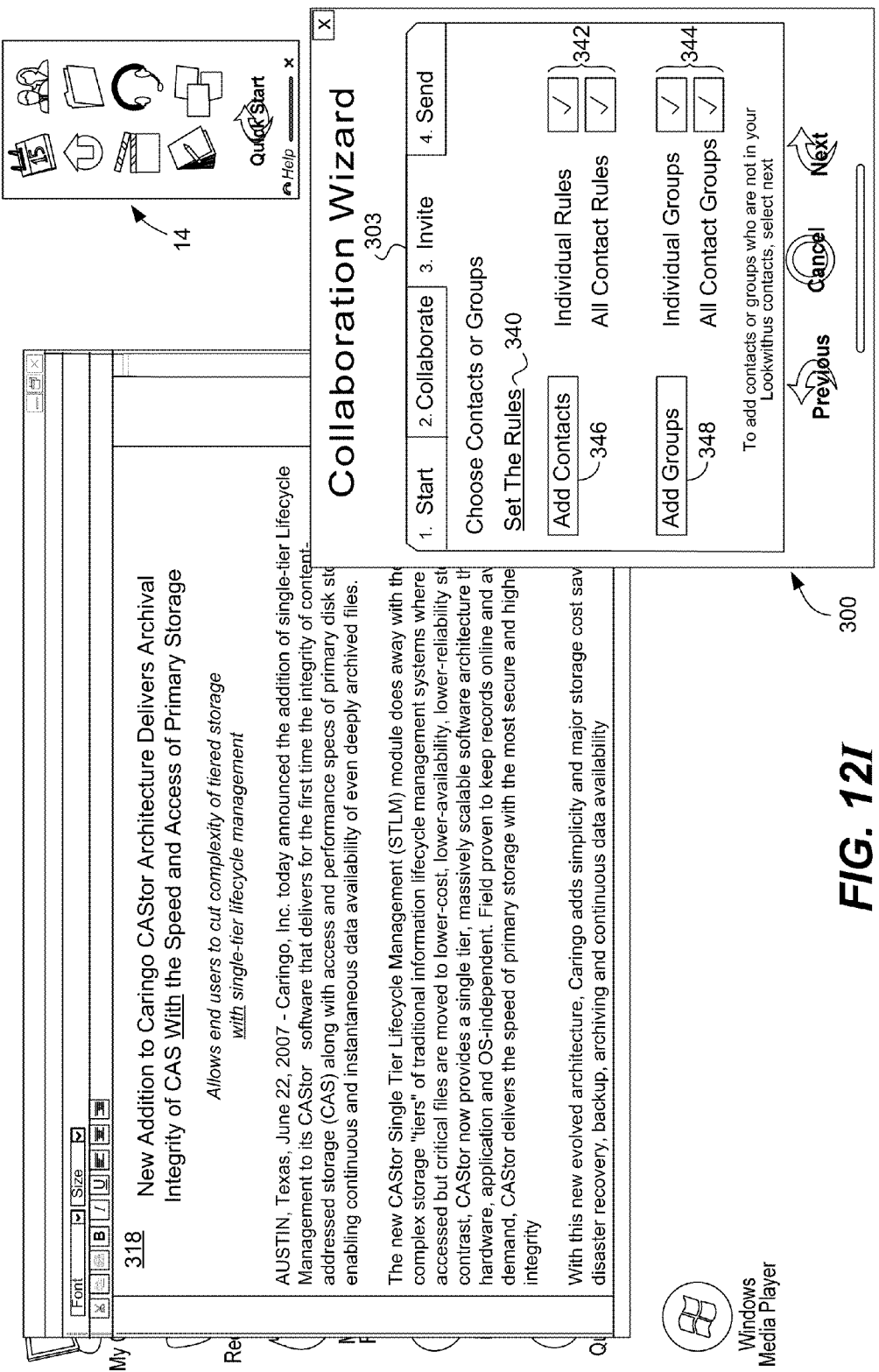
FIG. 12I illustrates options available to the user when the invite tab is selected.

FIG. 12H illustrates that upload window 336 opens when the user selects the upload icon in section 316. As shown, the upload window allows the user to search his or her computer in order to select the file to upload or to search any connected server to upload a file. Once the OK button is selected in window 336 the uploaded file will be attached to document 318 so that others may view the file when they review the document.

FIG. 12I illustrates options available to the user when the invite tab 303 is selected. The function of the invite tab is generally to tell other users about a collaboration project that needs their attention. Option "set the rules" 340 allows the user to set rules indicating what type of collaboration is allowed upon document 318. Add contacts button 346 allows the user to create a list of contacts from the client application e-mail module to whom document 318 will be sent. Add groups button 348 allows the user to add groups from the client application e-mail module. Section 342 allows the user to create custom rules for attachments for each individual and to allow a set of rules to apply to all contacts. Section 344 allows the user to create custom rules for attachments for each individual group and to allow a set of rules to apply to all groups. Selecting the next option allows the user to add contacts or groups who are not included in the client application e-mail module by advancing to the send tab 304.

Figure 12J:
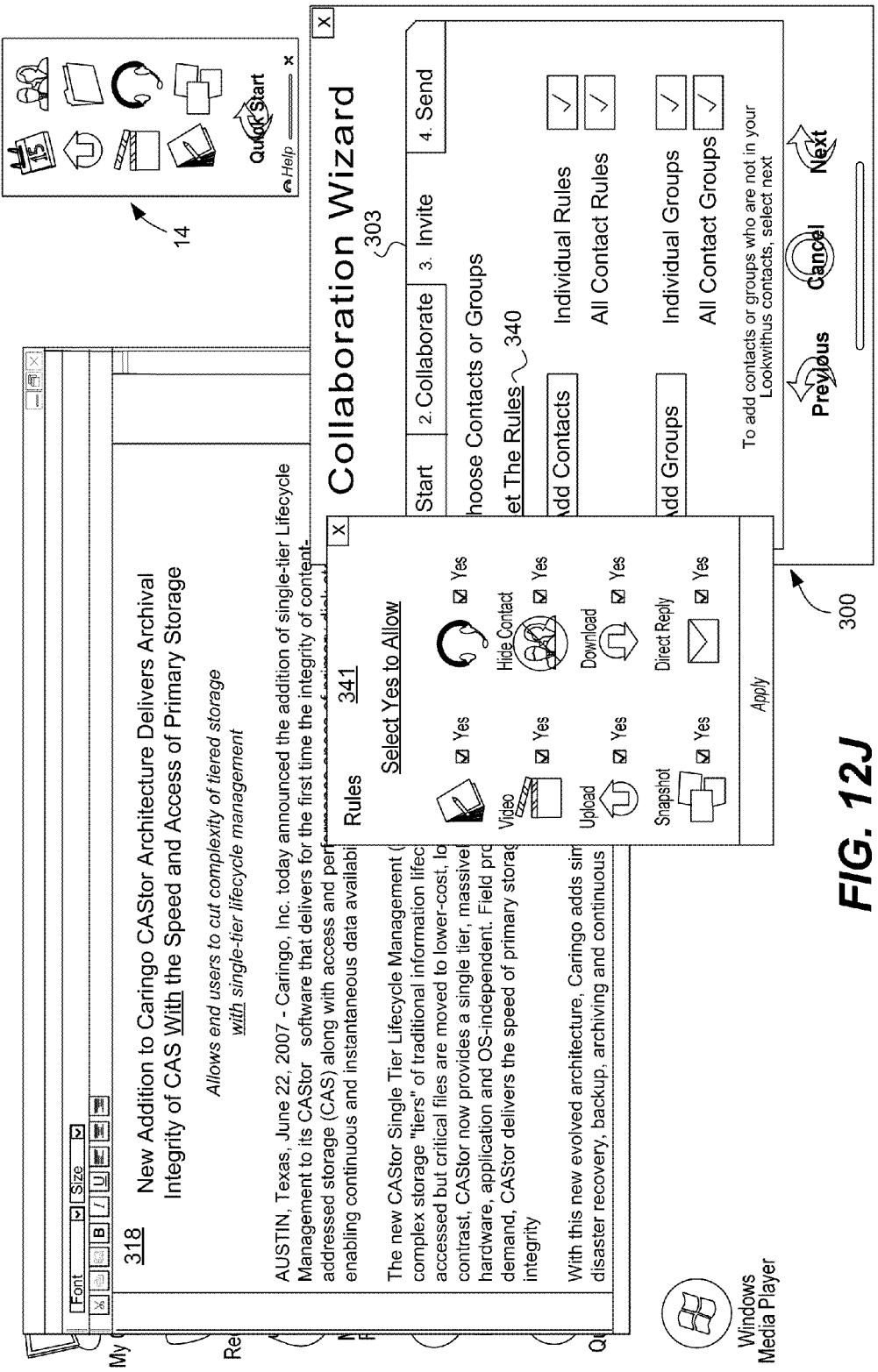
FIG. 12J illustrates a rules window that is opened when a user selects "set the rules" option.

FIG. 12J illustrates a rules window 341 that is opened when a user selects "set the rules" option 340. Window 341 allows a user to set rules that will allow others to only attach certain types of rich media to document 318 when collaborating. For example, by selecting the various check boxes, the user allows others collaborating upon the document to attach messages, video clips, and sound files. Further, by selecting the upload checkbox, the user allows others to add any documents or digital objects that they would like. By selecting the download checkbox, the user allows others to download document 318 from a repository to the other user's local computer. By selecting the "hide responding" checkbox, the user allows others to collaborate upon and attach rich media to the document without revealing their identity. In this fashion, the host user can set the rules regarding the digital object being collaborated upon. The identity of the other user may be "hidden" when attaching rich media to a document. For example, when user information is "hidden," the user identifier information is filtered out of the metadata package on the client application. The user information still exists within the LWU repository.

The rules may be stored in the LWU Repository. In the process of collaborating upon a document, the client application may check these rules to make sure that the user is following them. For example, a user may not commence a collaboration unless they have rights to do so. If a user's rights are modified during a session, the LWU repository sets a SPOIL flag on the user's metadata package which forces the user's rights to be re-read from the authentication gateway, thereby updating the rights of the user. The rules that are set up in FIG. 2C at 59 are the types of rich media collaboration interactions that will be allowed in the collaboration project. The envelope icon in the rules settings allow the user to enable the option of receiving a "direct reply" from other users that will appear as a new alert.

Figure 12K:
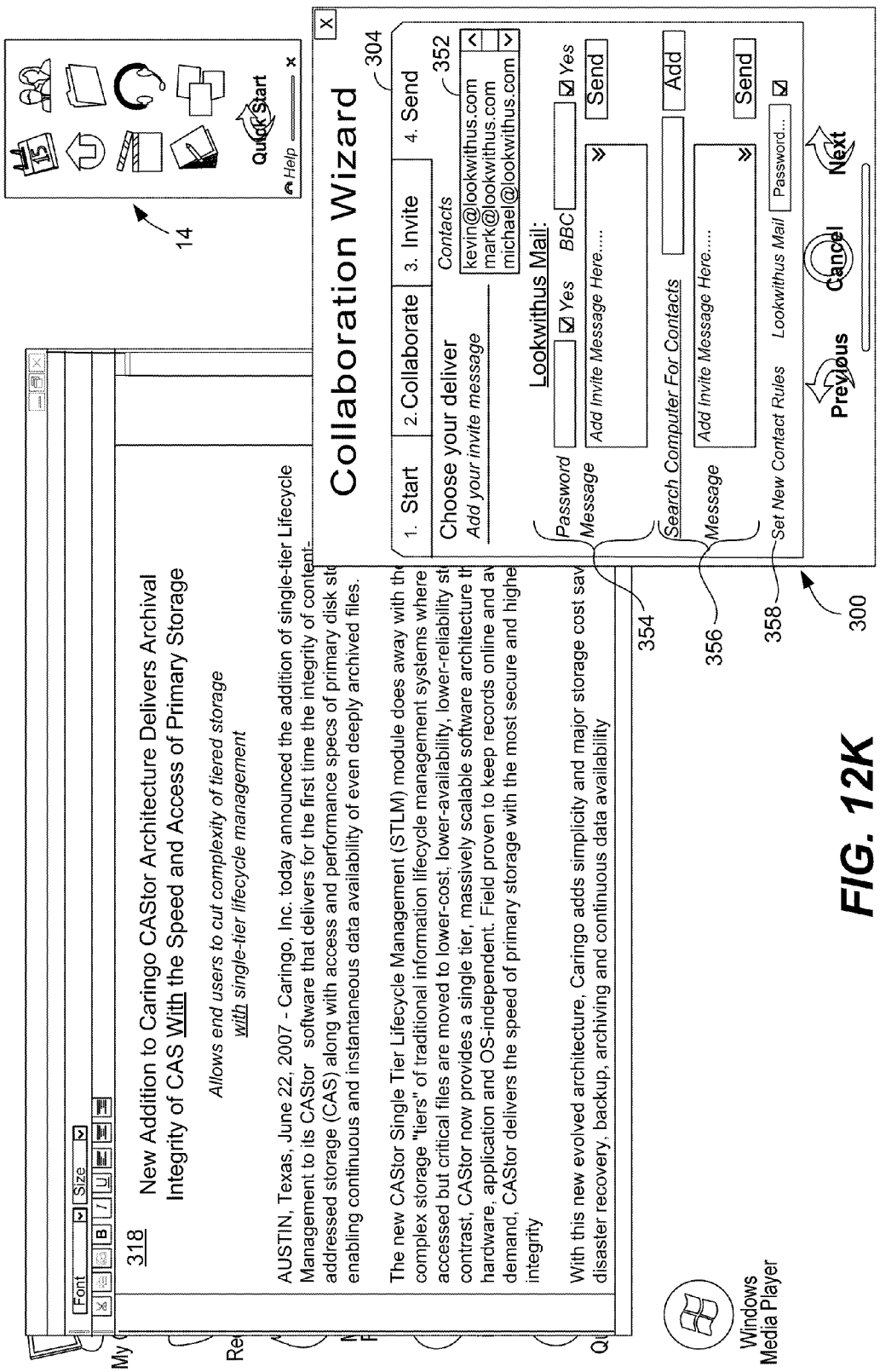
FIG. 12K illustrates the options available to the user when send tab is chosen.

FIG. 12K illustrates the options available to the user when send tab 304 is chosen. Once document 318 has been selected, the user has added any rich media if desired, and a list of contacts has been identified, send tab 304 allows the user to not only choose a particular delivery method but also to add a custom invitation message. For example, contacts box 352 lists the contacts that have previously been chosen using invite tab 303. Section 354 allows document 318 to be sent to the contacts in 352 using the e-mail module of the client application. A password is added and any message.

Section 356 allows the user to search his or her computer for e-mail contacts in any e-mail module available on the computer. A message may be added and a password. The option "set new content rules" 358 allows the user to set new contact rules. Preferably, the messages are sent via e-mail or alerts. These save icon is used to save a project for collaboration at a later time.

Figure 12L:
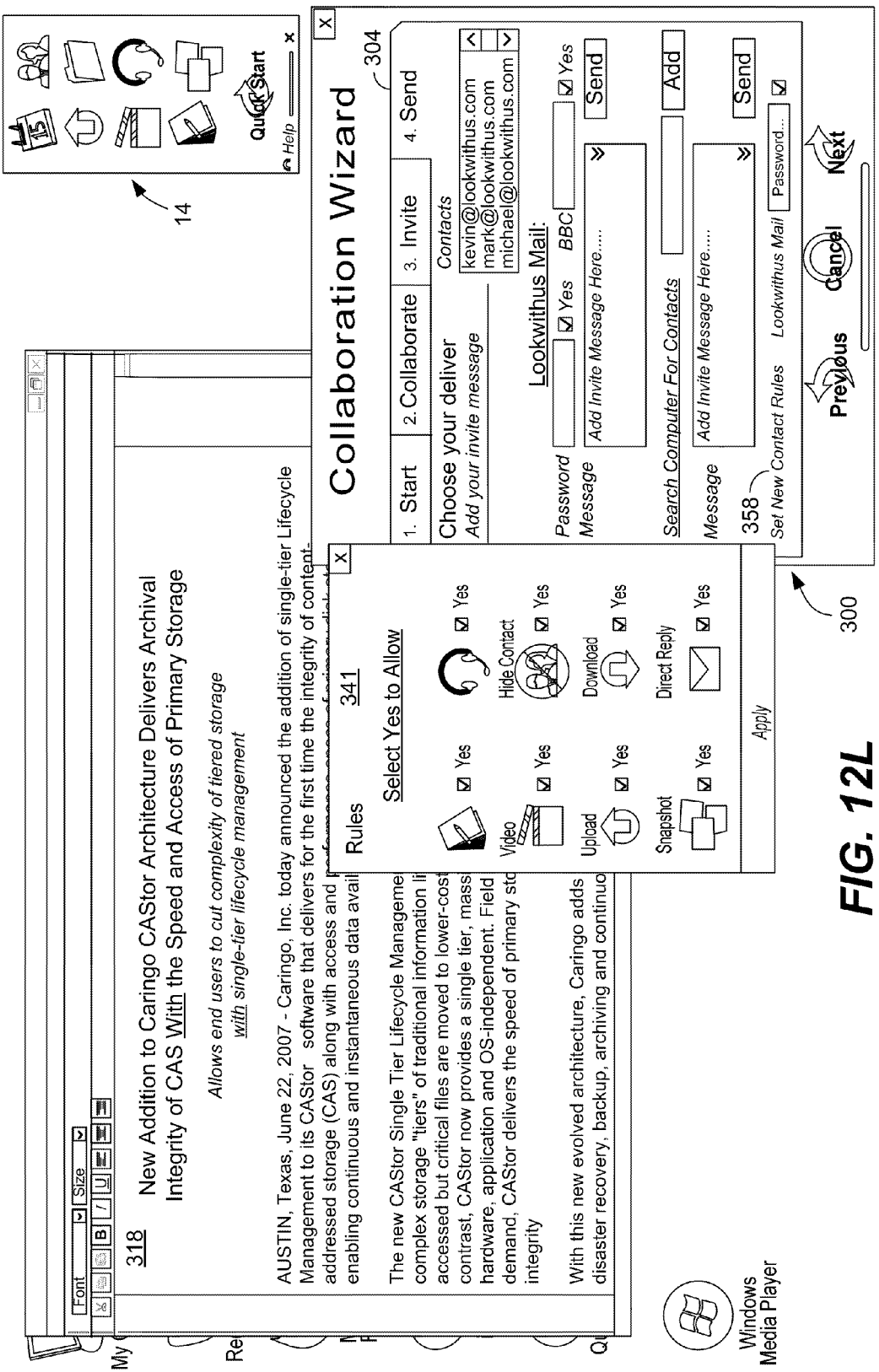
FIG. 12L illustrates the rules window that is opened when a user selects the "set new contact rules" option.

FIG. 12L illustrates the rules window 341 that is opened when a user selects the "set new contact rules" option 358 (for a new contact found on the user's computer not within the e-mail module of the client application). As discussed above with respect to FIG. 12J, window 341 allows the user to set rules dictating what other users may do with document 318. Any rules defined in window 341 will apply to a new contact on the computer. The envelope icon in the rules settings allow the user to enable the option of receiving a "direct reply" from other users that will appear as a new alert.

FIG. 12M illustrates a sending window 370 showing the progress of sending document 318 using one of the delivery options of send tab 304. The document may be sent to a contact within the e-mail module of the client application using the send button associated with section 354 of send tab 304, may be sent to an e-mail contact on the user's computer who is not in the e-mail module of a client application using the send button associated with section 356, or may be sent to any user having an instant message link using section 360. The document is preferably sent as an alert.

User Interface—View Annotated Document

The above describes how a user may initially attach rich media to any digital object such as a word processing document, view alerts, share information and generally interact initially with the system. The below figures illustrate specific embodiments in which another user is now viewing documents that have been sent by the original user or perhaps have had rich media attached by any number of other users.

FIG. 13A illustrates a document 200 that has been annotated with rich media by a user (or perhaps by multiple users). In addition to navigation bar 14, the client application provides a floating attachments bar 218 that may float on or near document 200 and may also have any level of transparency. The first icon, icon 220, indicates the type and number of rich media responses that are associated with the document overall. For example, a single video clip has been attached to the document 221.

The document includes title 204 and paragraph 208 that each have been annotated. Symbols 212 and 216 (e.g., red arrow 212 and yellow arrow 216) are used to indicate to the user particular places, paragraphs, sentences, etc. that have been annotated. Icons 222-226 ("red") indicate the digital objects have been attached to the document in association with title 204 (red arrow 212). In particular, a single text message 222, two snapshots 224, and two sound files 226 have been attached that provide background, comments, questions or information concerning title 204. Icons 232 and 234 ("yellow") indicate that two text messages 232 and two sound files 234 have been attached to provide information concerning paragraph 208 (yellow arrow 216). The icons and symbols 212 and 216 may be color coded or marked in a similar way to indicate which icons are associated with which symbol (and thus with which portion of the document). The numerals to the left of each icon indicate the number of responses for each type of rich media that have been attached. For example, the numeral would let the user know the number of video responses, audio responses, etc., that have been attached for each separate media type.

As described earlier, digital attachments are preferably stored in the repository associated with the digital object to which they pertain. Because attachments are also considered digital objects, these digital objects may be related to one another and this relationship is also stored in the repository that holds the digital objects. It is also possible to relate two or more objects that span repositories by using the full identifier of the digital object: repository name |container|ObjectID. In the case of a snapshot attachment, for example, the snapshot image is stored in the repository and the snapshot is related to the document to which it was attached. Relationships are bi-directional, i.e., ObjectID_123 is related to ObjectID_456 AND ObjectID_456 relates to ObjectID_123. This relationship allows for rapid searching of digital object relationships.

By clicking on one of the icons 221-234 the user is able to hear or see the attached information. The information can be transmitted and viewed in different manners. In one embodiment, 624 of FIG. 18 demonstrates the client request process. The client queries the available object repository and selects/requests the object to view. Those objects are transmitted from the LWU Repository to the web page in association with item 272. The object is then opened by the default application for that type of object/document: Microsoft Word, PDF, etc. Download icon 238 allows the user viewing document 200 to download a digital object to his or her computer that has been attached to the document. "Add Message" button 240 allows a user to add a message as shown below.

Figure 13B:
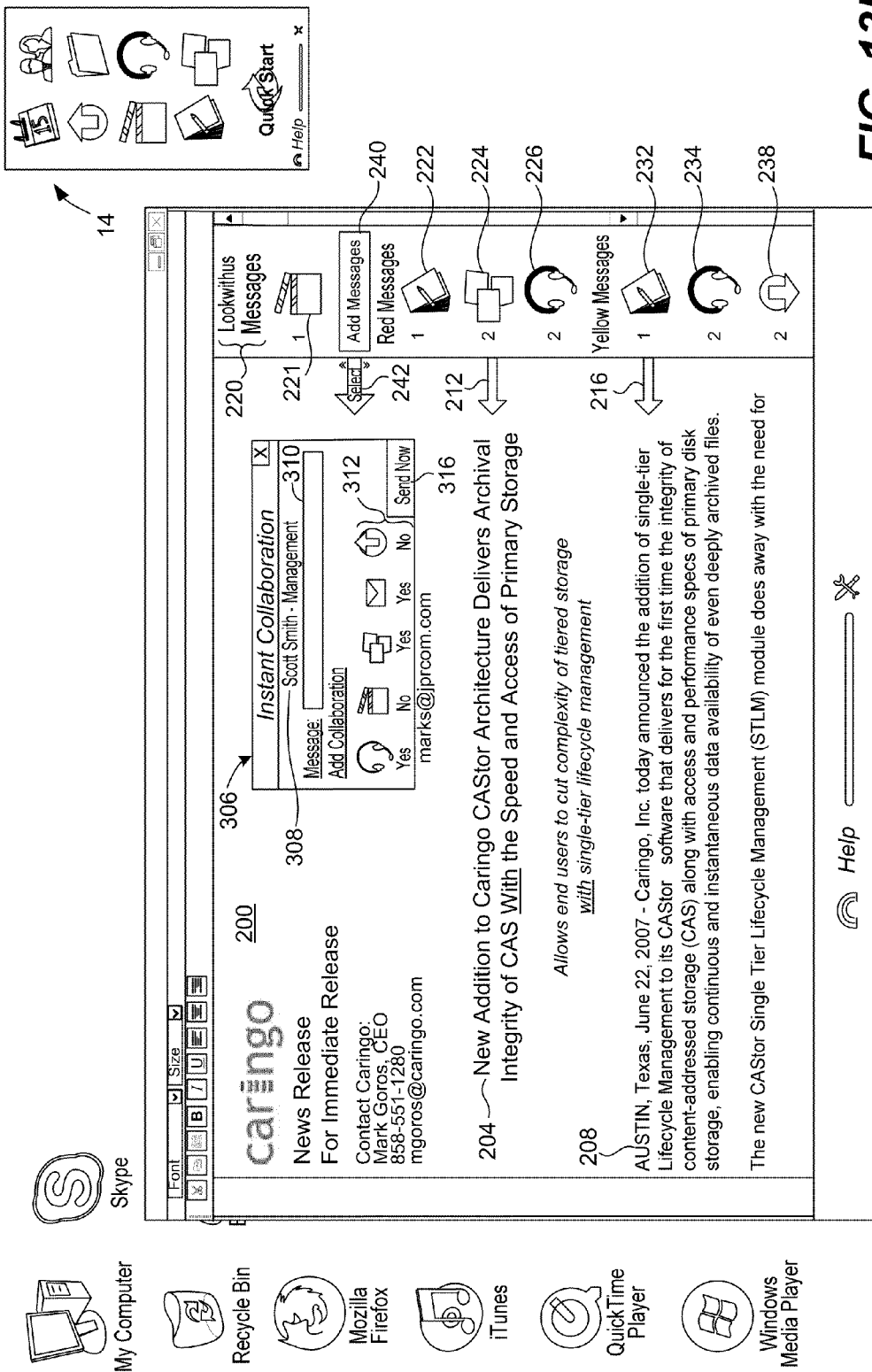
FIG. 13B illustrates a user adding message.

FIG. 13B illustrates a user adding message. First, the user selects button 240 that opens instant collaboration window 306 allowing the user (Scott Smith) to add a digital object, document or rich media to the original document. A select icon 242 also appears, allowing the user to scroll up and down through the document 200 in order to select a location at which to add his or her collaboration on the original document 200. Icons 312 along with a corresponding "yes" or "no" indicate which type of responses or actions have been allowed by the originator of the document. For example, the originator has allowed that sound files may be attached to the original document but video clips may not. Once an attachment has been selected by the user to be attached to the document 200 the user selects button 316 which will insert the annotation at the location indicated by icon 242.

Figure 13C:
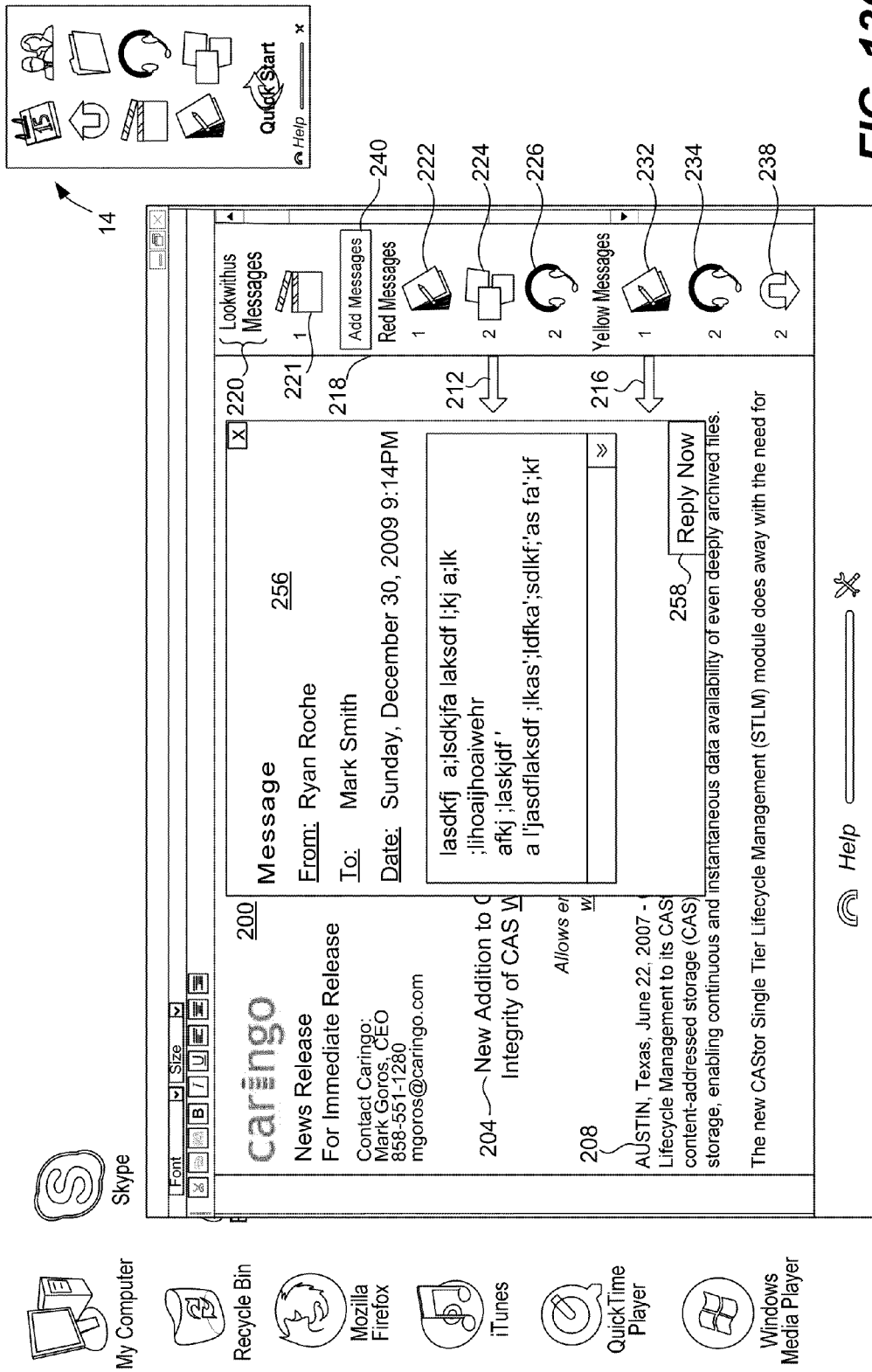
FIG. 13C illustrates a user viewing an attachment.

FIG. 13C illustrates a user viewing an attachment. As shown, the user selects icon 222, the text message icon, in order to view the text message 256 that has been added by another user.

Figure 13D:
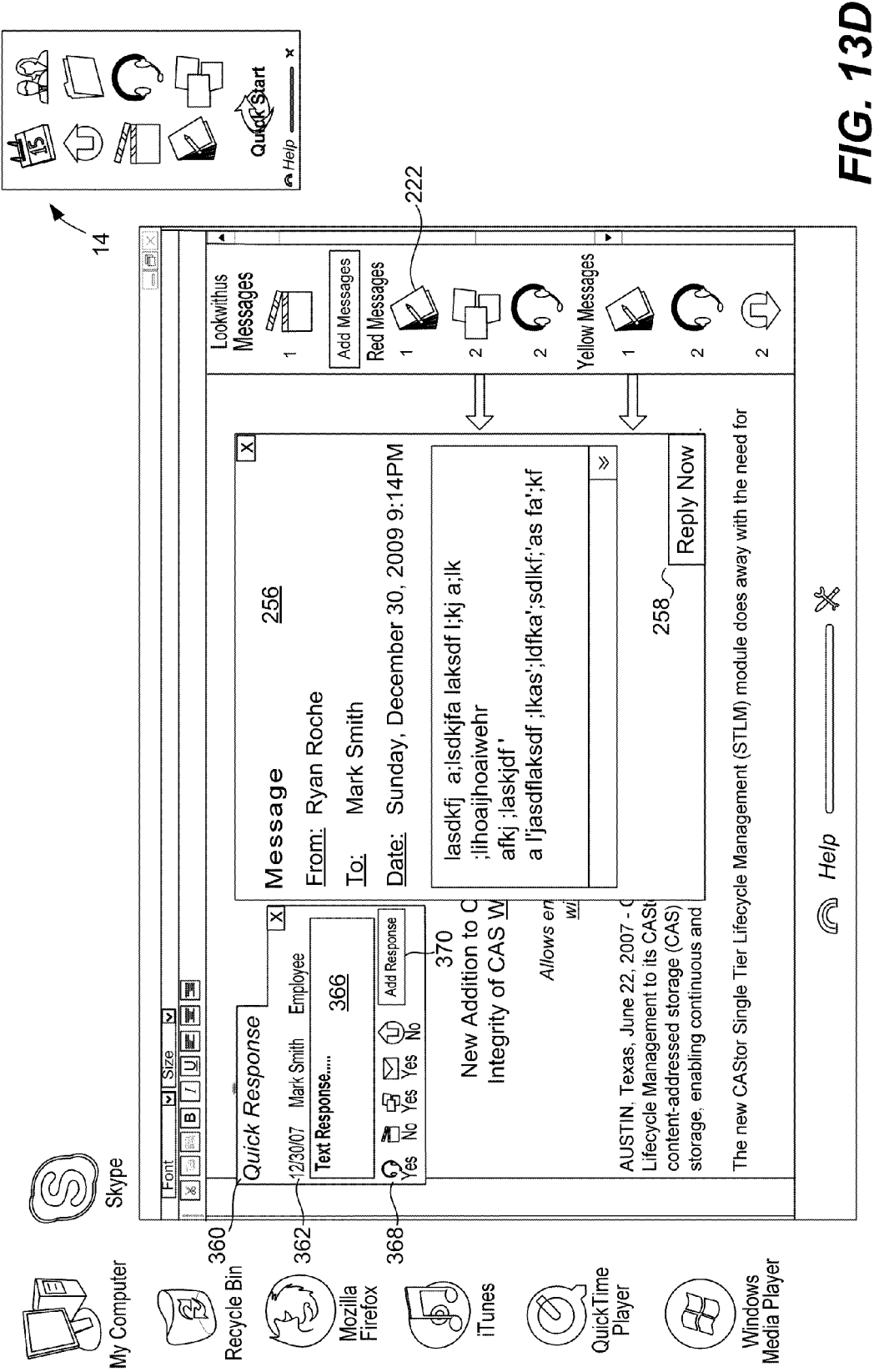
FIG. 13D illustrates a user responding to a particular attachment.

FIG. 13D illustrates a user responding to a particular attachment. As shown, the user has selected button 258 in order to open quick response window 360. Icons 368 indicate which types of rich media may be attached as allowed by the originator of the document. Once any rich media has been attached and a text message 366 added, button 370 allows the user to add to his new attachment which is in response to the attachment 256. The new attachment will also be placed at the same location in document 200 as message 256.

Figure 13E:
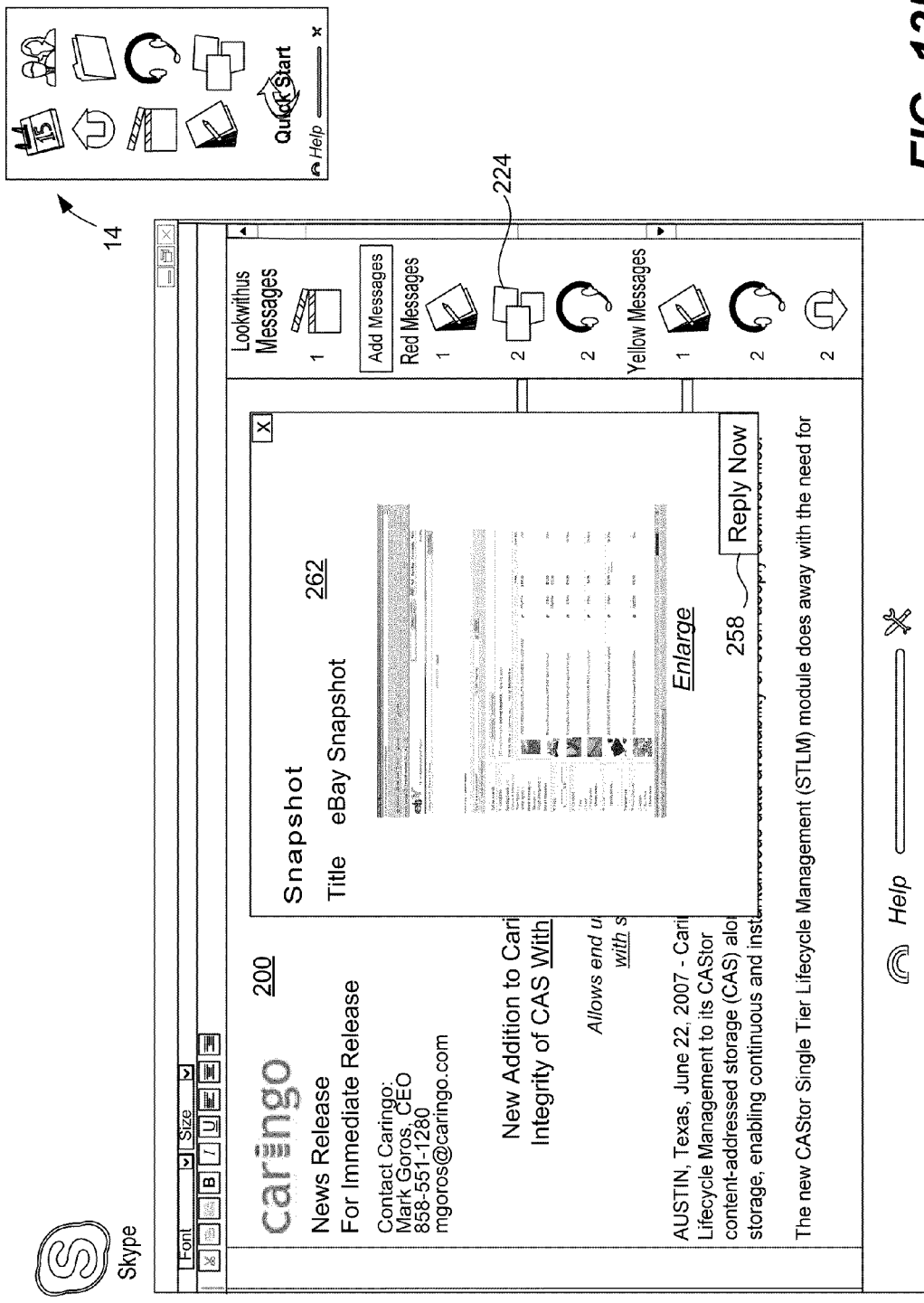
FIG. 13E illustrates a user viewing an attachment.

FIG. 13E illustrates a user viewing an attachment. As shown, the user selects icon 224, the snapshot icon, in order to view the snapshot as shown in window 262 that has been added by another user.

Figure 13F:
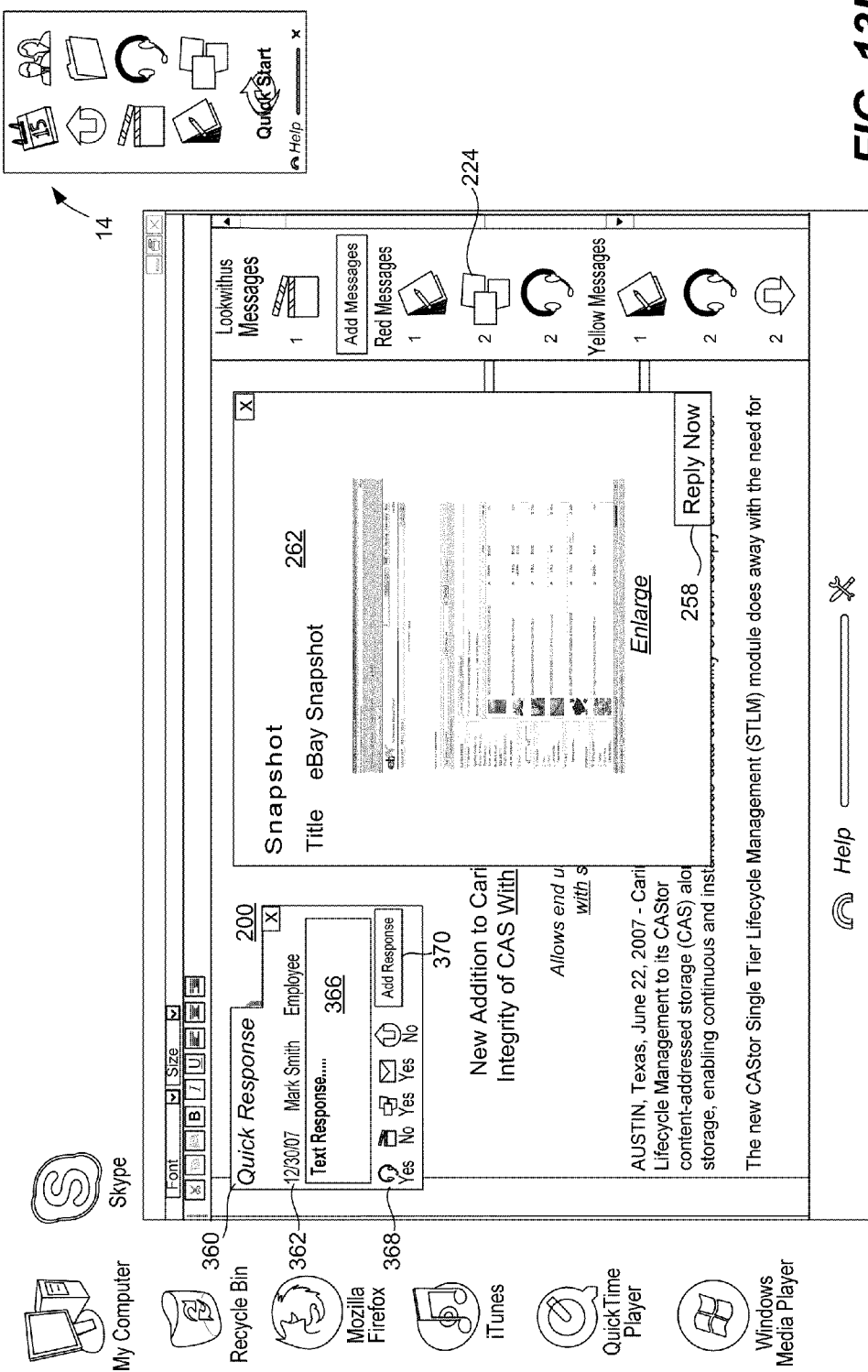
FIG. 13F illustrates a user responding to a particular attachment.

FIG. 13F illustrates a user responding to a particular attachment. As shown, the user has selected button 258 in order to open quick response window 360. Icons 368 indicate which types of rich media may be attached as allowed by the originator of the document. Once any rich media has been attached and a text message 366 added, button 370 allows the user to add to his new attachment which is in response to the attachment 262. The new attachment will also be placed at the same location in document 200 as snapshot 262.

Figure 13G:
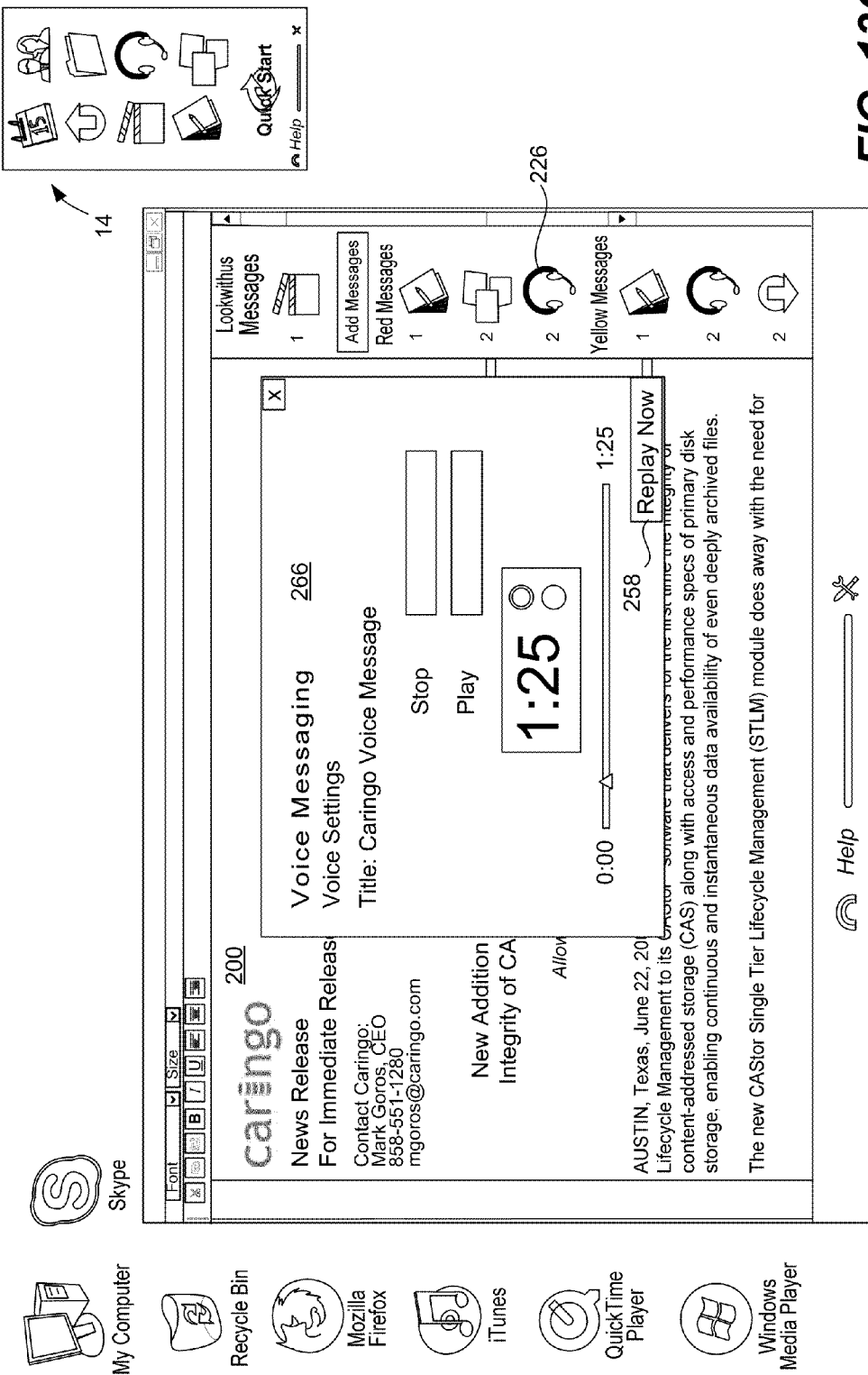
FIG. 13G illustrates a user viewing an attachment.

FIG. 13G illustrates a user viewing an attachment. As shown, the user selects icon 226, the audio icon, in order to listen to the audio as shown in window 266 that has been added by another user.

Figure 13H:
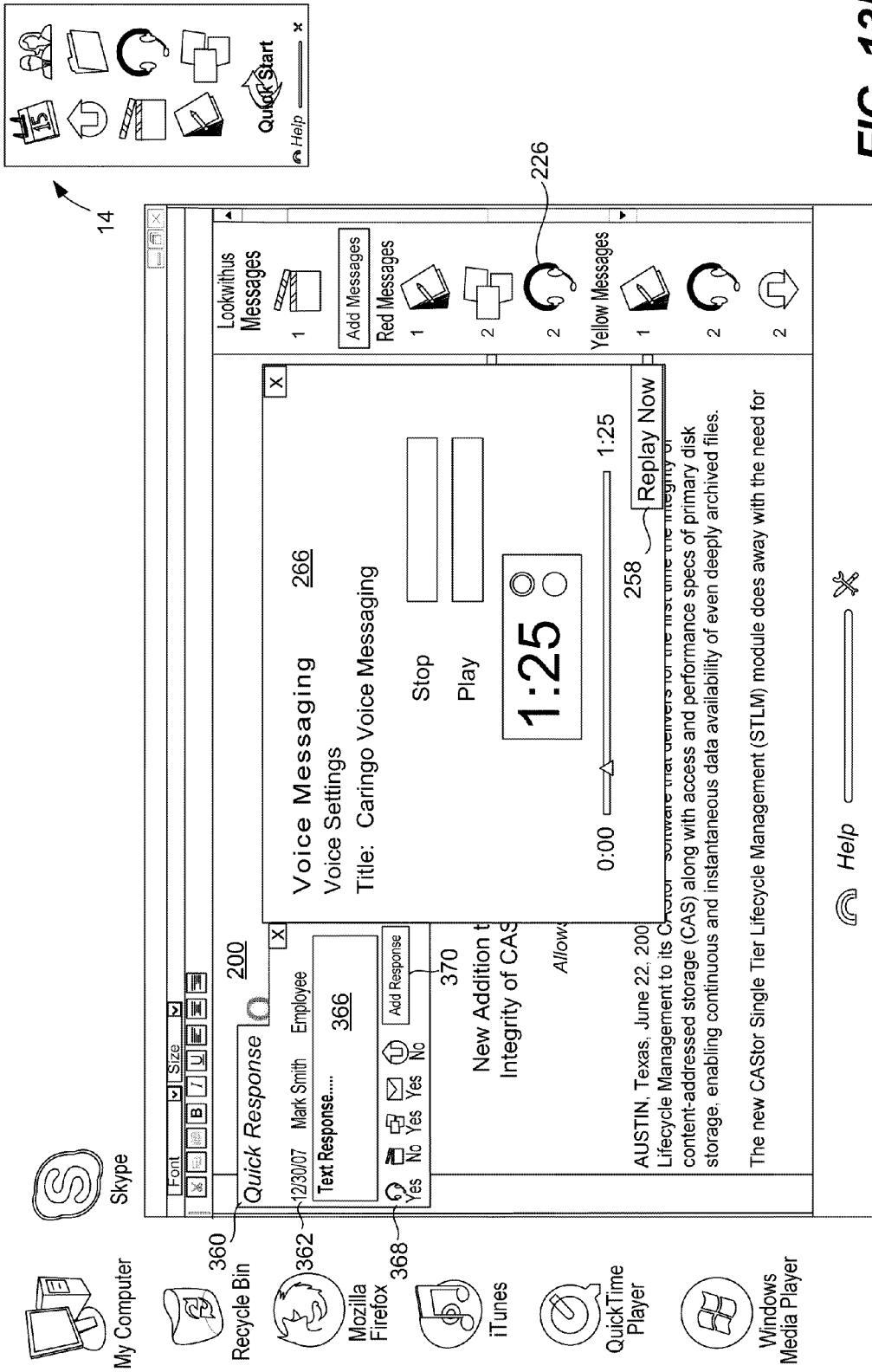
FIG. 13H illustrates a user responding to a particular attachment.

FIG. 13H illustrates a user responding to a particular attachment. As shown, the user has selected button 258 in order to open quick response window 360. Icons 368 indicate which types of rich media may be attached as allowed by the originator of the document. Once any rich media has been attached and a text message 366 added, button 370 allows the user to add to his new attachment which is in response to the attachment 266. The new attachment will also be placed at the same location in document 200 as audio file of window 266.

Figure 13I:
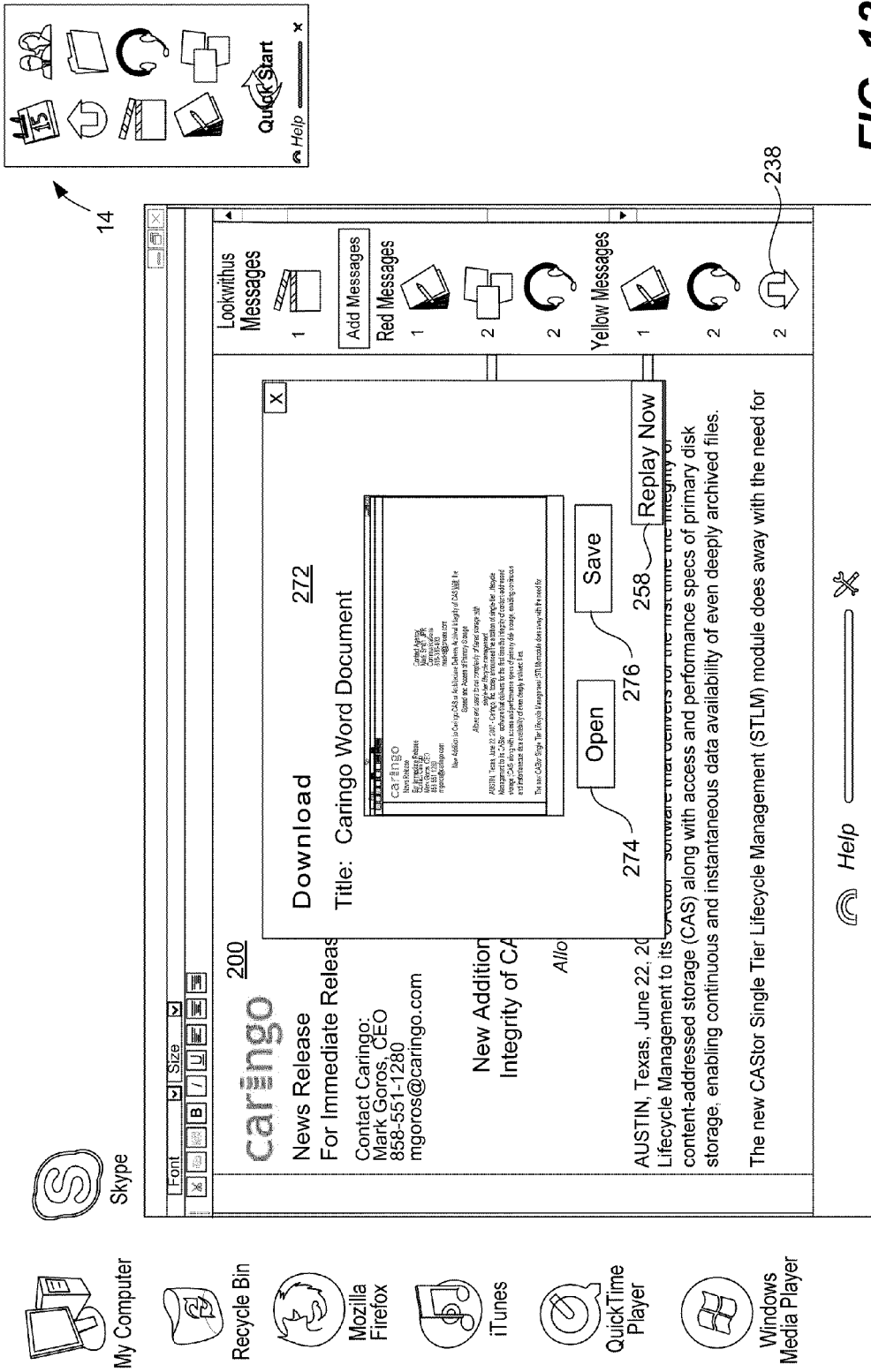
FIG. 13I illustrates a user viewing an attachment.

FIG. 13I illustrates a user viewing an attachment. As shown, the user selects icon 238, the download icon, in order to view the document attached to original document 200 by another user that is available for download. Button 274 opens the document for viewing. Button 276 allows the user to save the document to his or her computer.

Figure 13J:
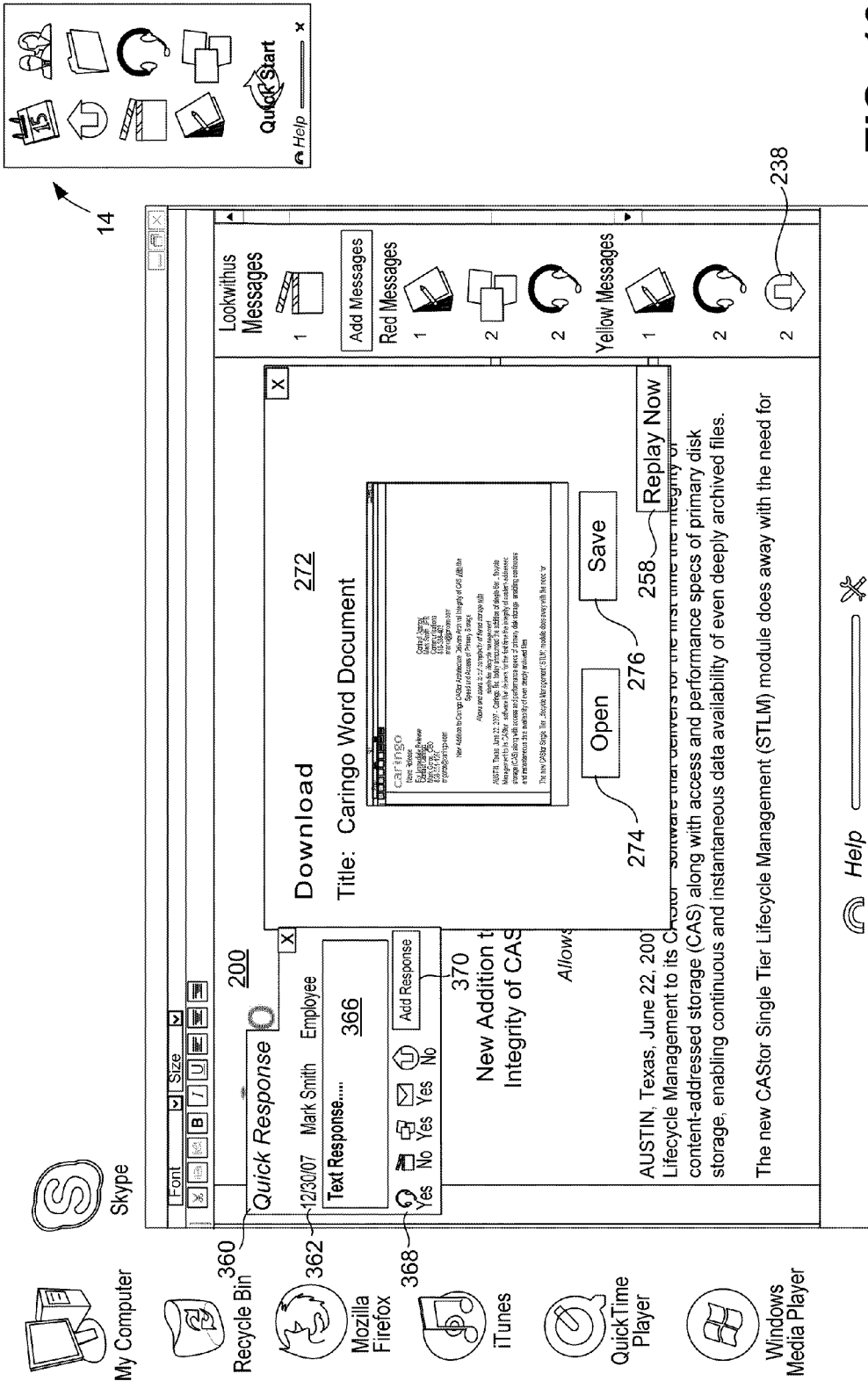
FIG. 13J illustrates a user responding to a particular attachment.

FIG. 13J illustrates a user responding to a particular attachment. As shown, the user has selected button 258 in order to open quick response window 360. Icons 368 indicate which types of rich media may be attached as allowed by the originator of the document. Once any rich media has been attached and a text message 366 added, button 370 allows the user to add to his new attachment which is in response to the attachment 272. The new attachment will also be placed at the same location in document 200 as document 272.

Figure 13K:
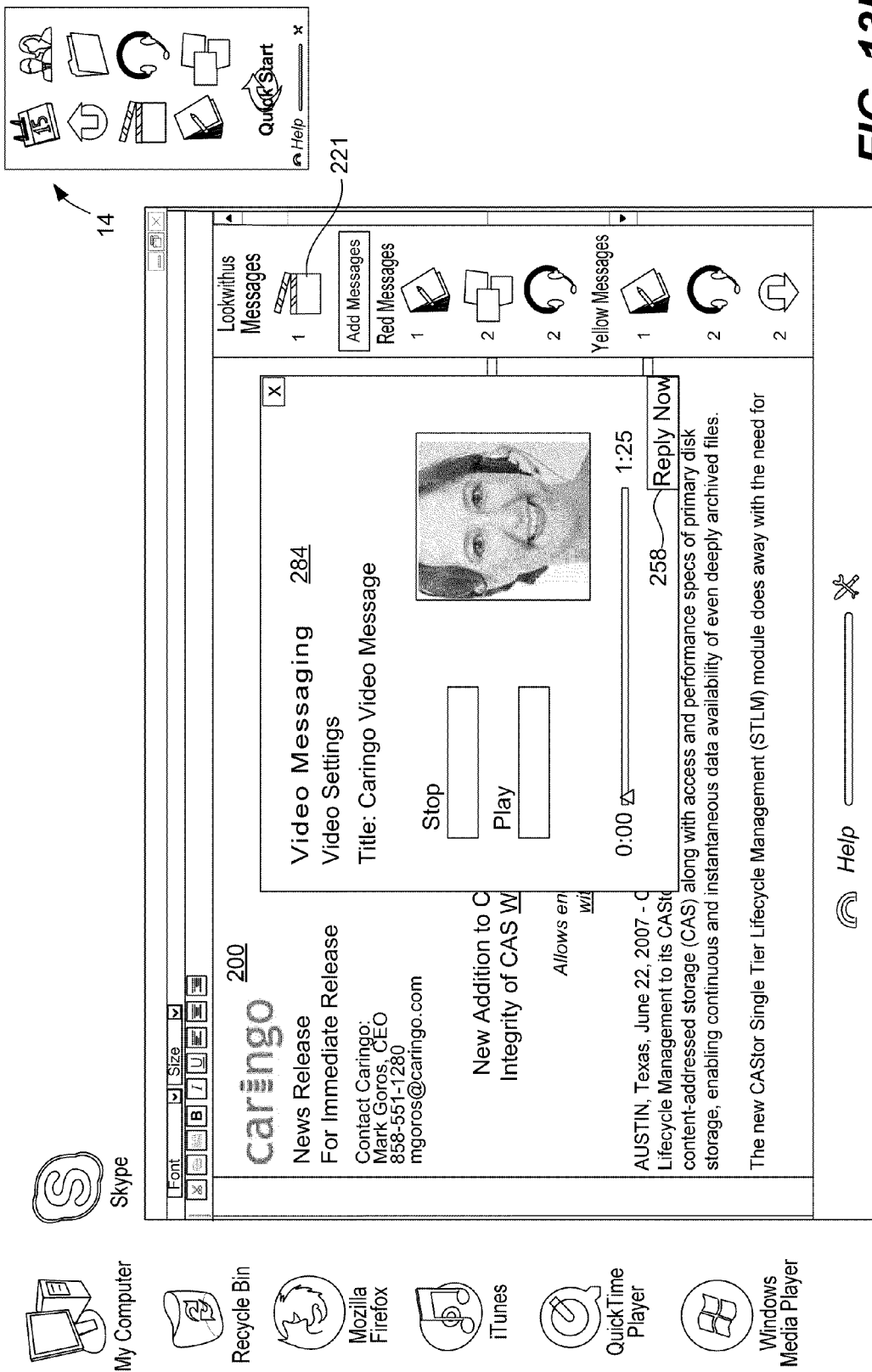
FIG. 13K illustrates a user viewing an attachment.

FIG. 13K illustrates a user viewing an attachment. As shown, the user selects icon 221, the video clip icon, in order to view the video 284 attached to original document 200 by another user.

Figure 13L:
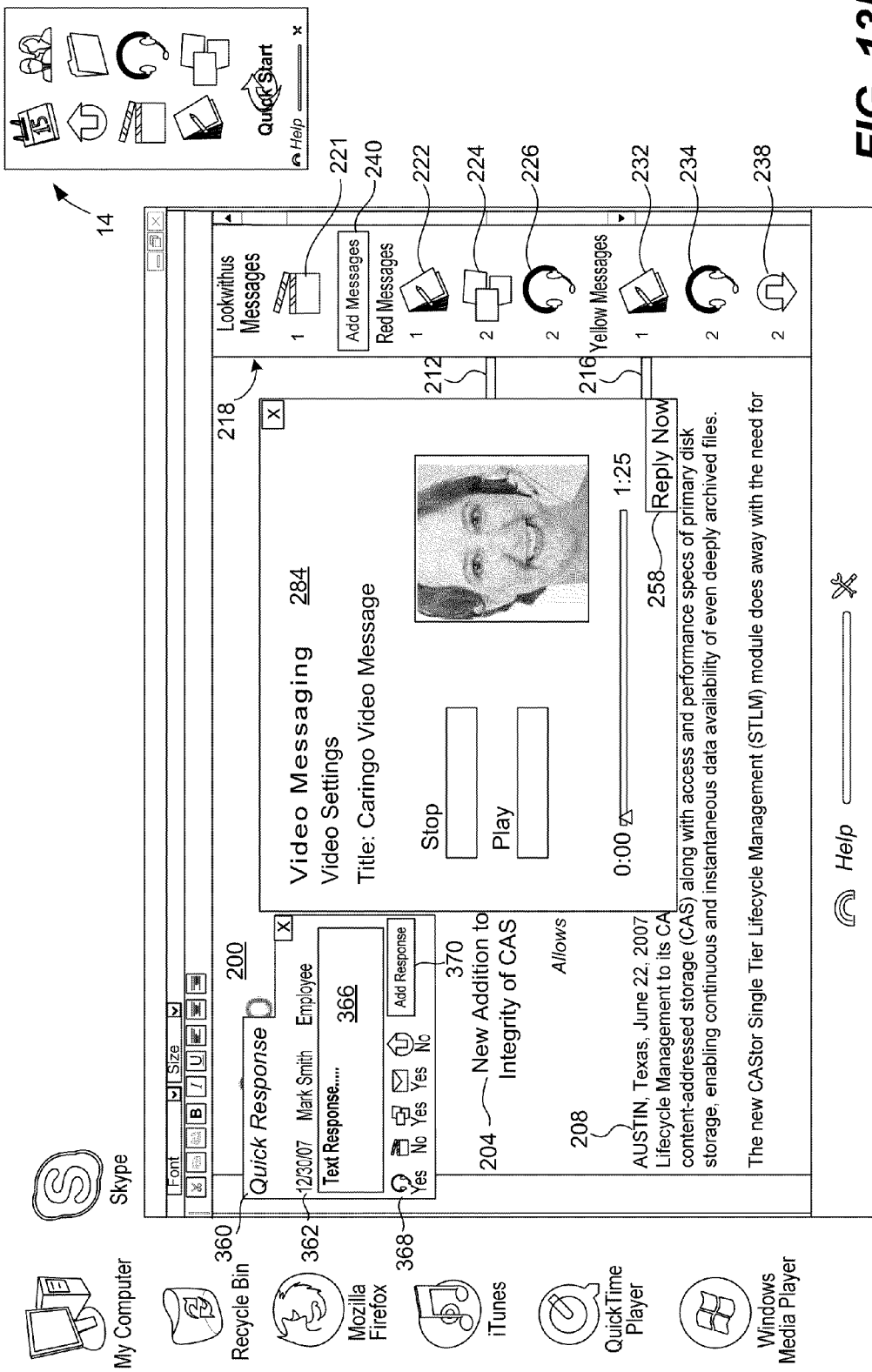
FIG. 13L illustrates a user responding to a particular attachment.

FIG. 13L illustrates a user responding to a particular attachment. As shown, the user has selected button 258 in order to open quick response window 360. Icons 368 indicate which types of rich media may be attached as allowed by the originator of the document. Once any rich media has been attached and a text message 366 added, button 370 allows the user to add to his new attachment which is in response to the attachment 284. The new attachment will also be placed at the same location in document 200 as video clip 284.

Collaboration System Integrated with Third-Party Technology

In addition to the collaboration system being implemented within a community of users (such as a corporation) through use of a client application resident on each user's computer, or being implemented by having a client application resident in a browser of a public computer, the collaboration system may also be implemented by allowing a third party to incorporate the software into its own environment for the benefit of any users. A user would not be required to have a client application resident on his or her computer nor would be required to be using a computer with a browser having the client application resident. For example, any institution implementing a web site may incorporate the collaboration system as part of its web site at the back end so that any user accessing the web site may take advantage of the technology.

Figure 14A:
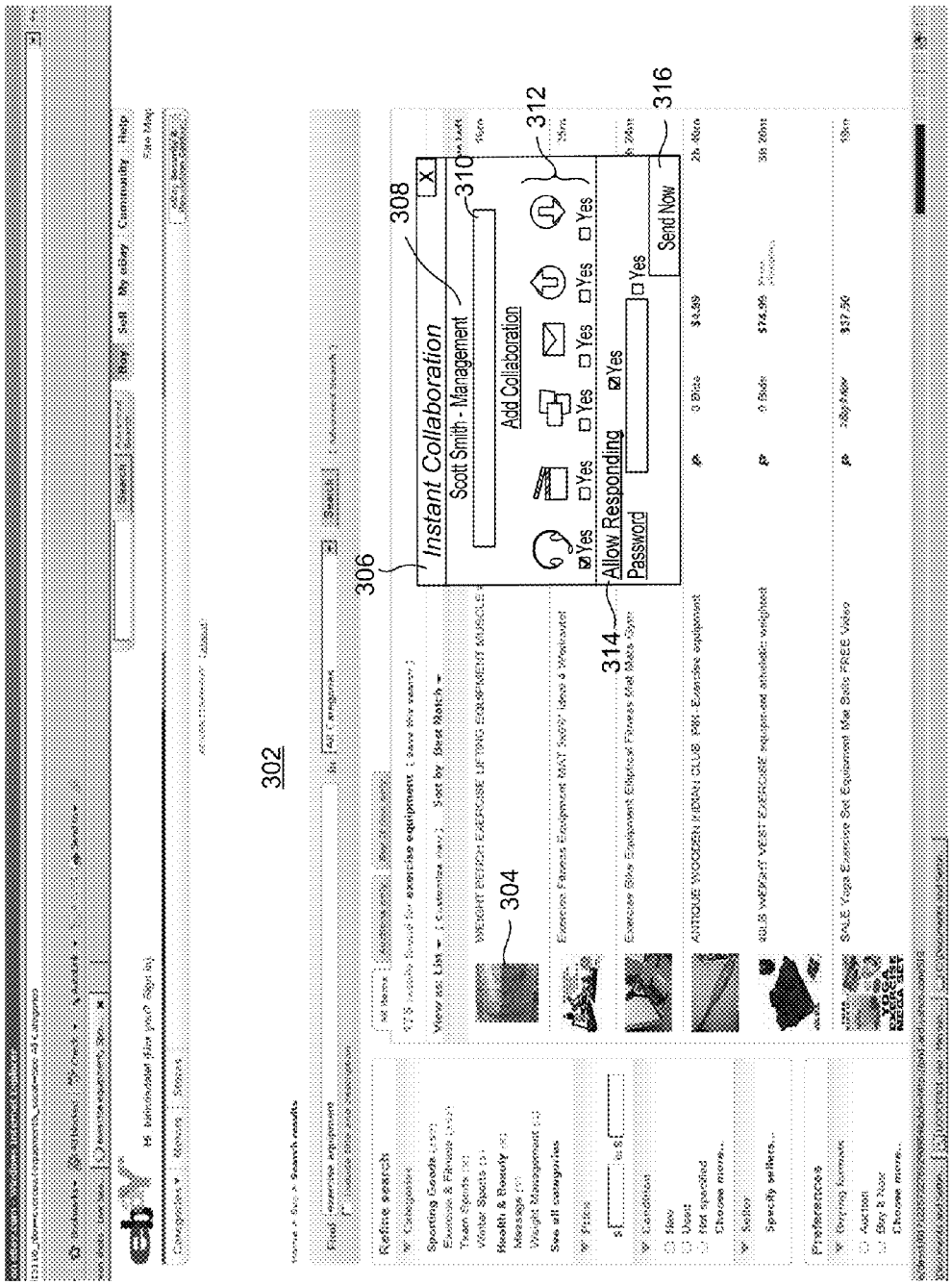
FIG. 14A illustrates an eBay web page listing numerous items including item.

FIG. 14A illustrates an eBay web page 302 listing numerous items including item 304. In this example, eBay has implemented the present collaboration system on its servers so that a user viewing this web page may take advantage of the technology. By selecting item 304 and then selecting the instant collaboration tool on the web page (preferably, the instant collaboration tool is an object on the web page, a link, for example), instant collaboration window 306 is opened so that the user may attach any type of rich media to item 304.

Instant collaboration window 306 appears as a floating window, for example, over the web page 302. In this example, the user Scott Smith has selected to collaborate on this web page—on the digital object. The user who is receiving the alert or collaboration is selected because the digital object has an owner of "owner of object" attached to it or the instant collaboration has been predefined by the user. In this example, Scott Smith is the person who opens the instant collaboration window.

As shown, the collaboration window includes the name of the user 308, a box for the recipient's name 310, the type of rich media to be attached 312, whether to allow a response 314, a password, and a send button 316. The user may select any of the rich media types in order to attach that type of digital object to item 304. The download button allows the collaboration invitee or object owner to be able to download associated objects to his or her desktop. Upon sending this collaboration request, a corresponding alert will be generated for user Mark Smith and the calendar icon in his navigation bar of his client application will indicate that an alert is pending.

Figure 14B:
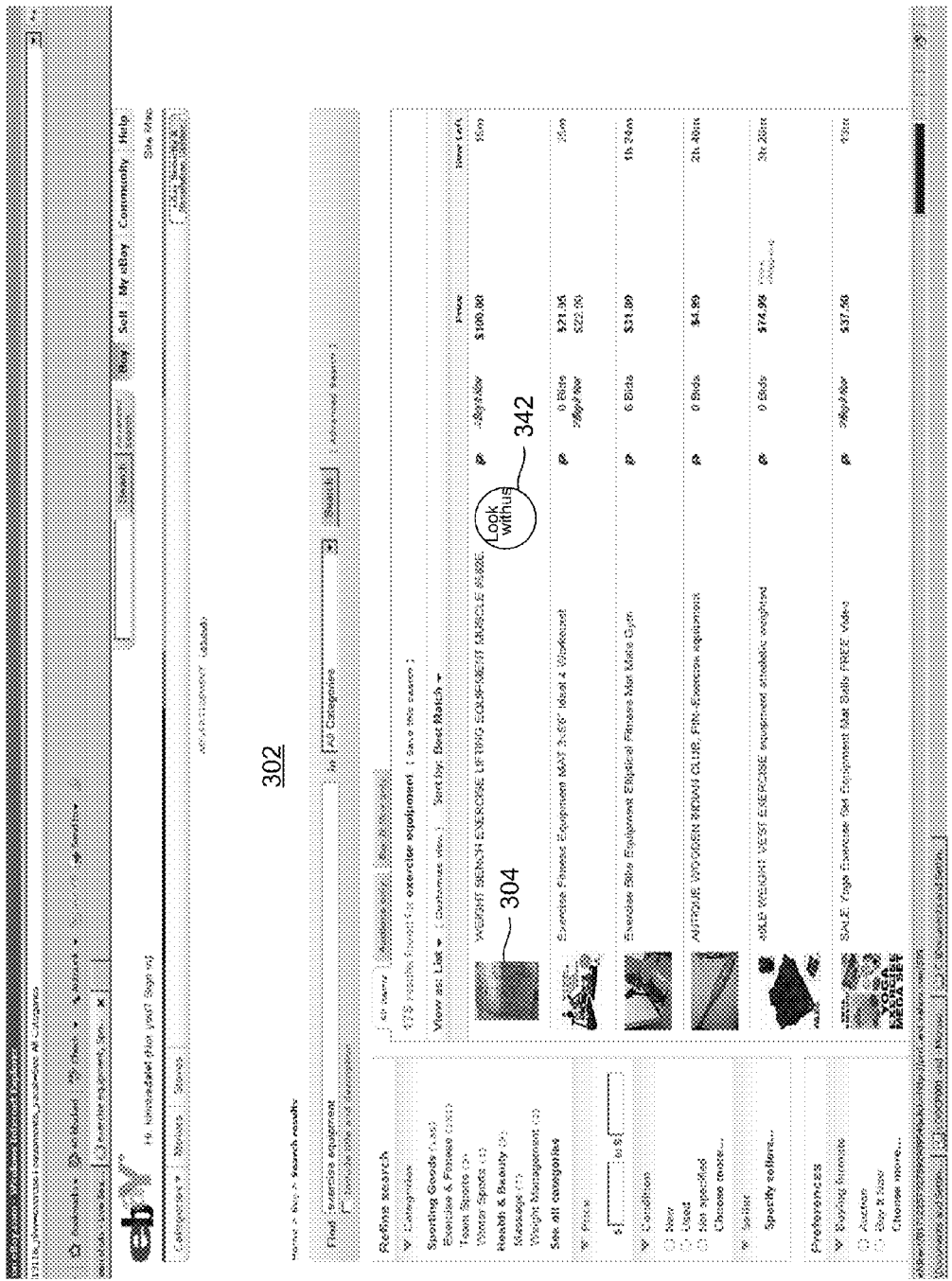
FIG. 14B illustrates the same web page having item but with a symbol indicating that a digital object has been attached in association with item.

FIG. 14B illustrates the same web page 302 having item 304 but with a symbol 342 indicating that a digital object has been attached in association with item 304. Once item 304 has been annotated as described in the previous figure, the eBay web page 302 displays symbol 342 so that any viewer of the page will realize that rich media has been attached and will receive an alert from their LWU client. The proximity of symbol 342 to item 304 indicates that this attachment is associated with the item. By clicking on the symbol the user is able to hear or see the attached information.

Figure 14C:
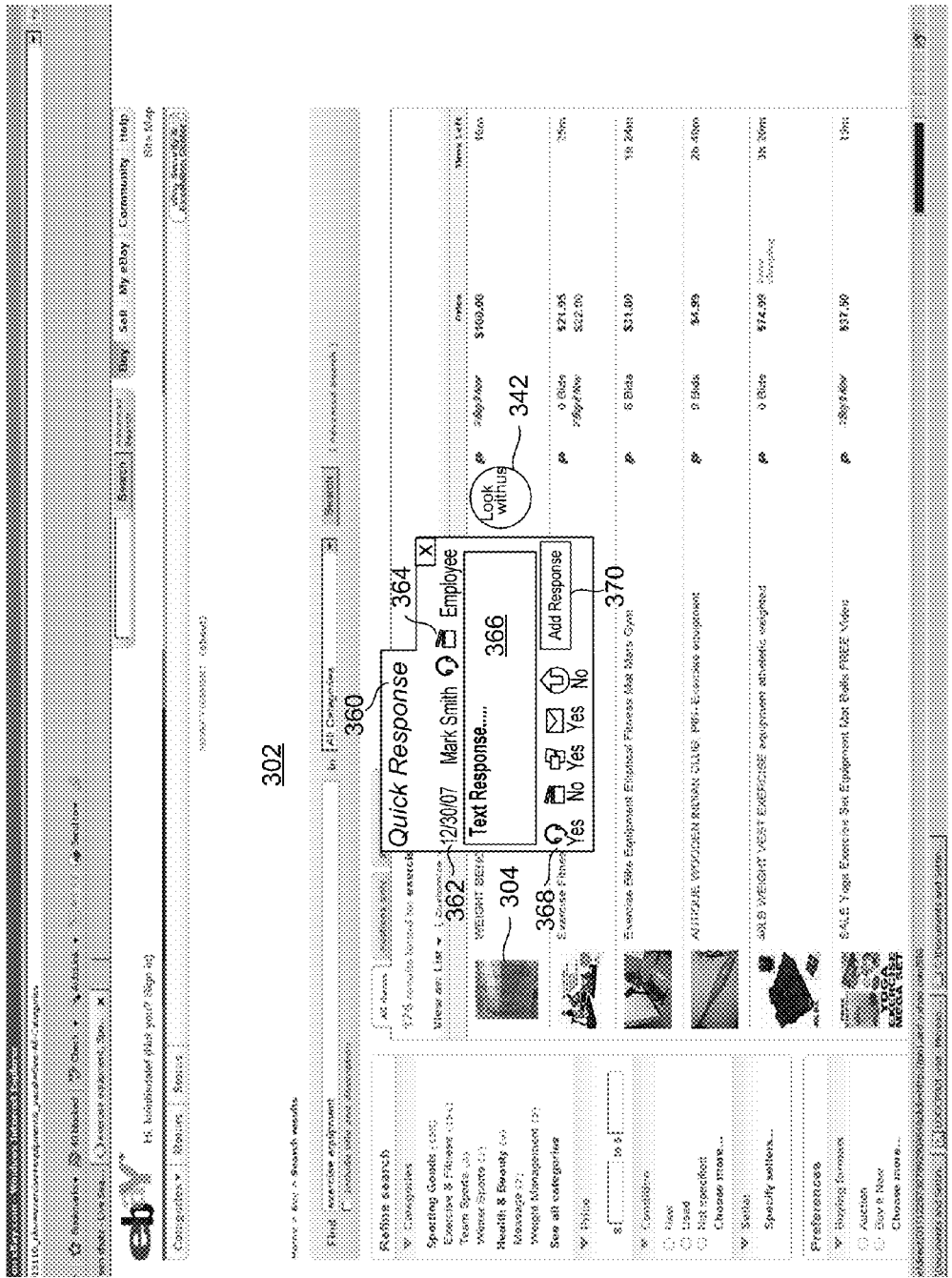
FIG. 14C illustrates a quick response window.

FIG. 14C illustrates a quick response window 360. Quick response window 360 appears when any viewer of the eBay web page 302 notices that symbol 342 is present in association with item 304 and selects symbol 342 in order to view any attachments and respond. In this example, the user Mark Smith has responded to an alert regarding this web page and has selected the quick response option. The quick response will appear when the user right clicks the mouse for a pop-down menu or selects quick settings on a mobile telephone. The quick response window allows a user to type a quick text response 366 to the alert, and includes a date 362. The user may optionally listen to the sound clip or the video clip 364 that have been attached to item 304 by the original user. Optionally, user Mark Smith may also add a rich media response by clicking on one of the symbols 368 next to the "add response" button 370. Once a quick response reply has been composed, the user closes the quick response window and the quick response is automatically sent back to the original user. The quick response may be sent back via an e-mail message or as an alert.

In this fashion, third parties may integrate the present collaboration system into their own software systems (such as web sites on servers) so that any user having access to a browser may utilize the benefits of the present collaboration system.

Figure 15A:
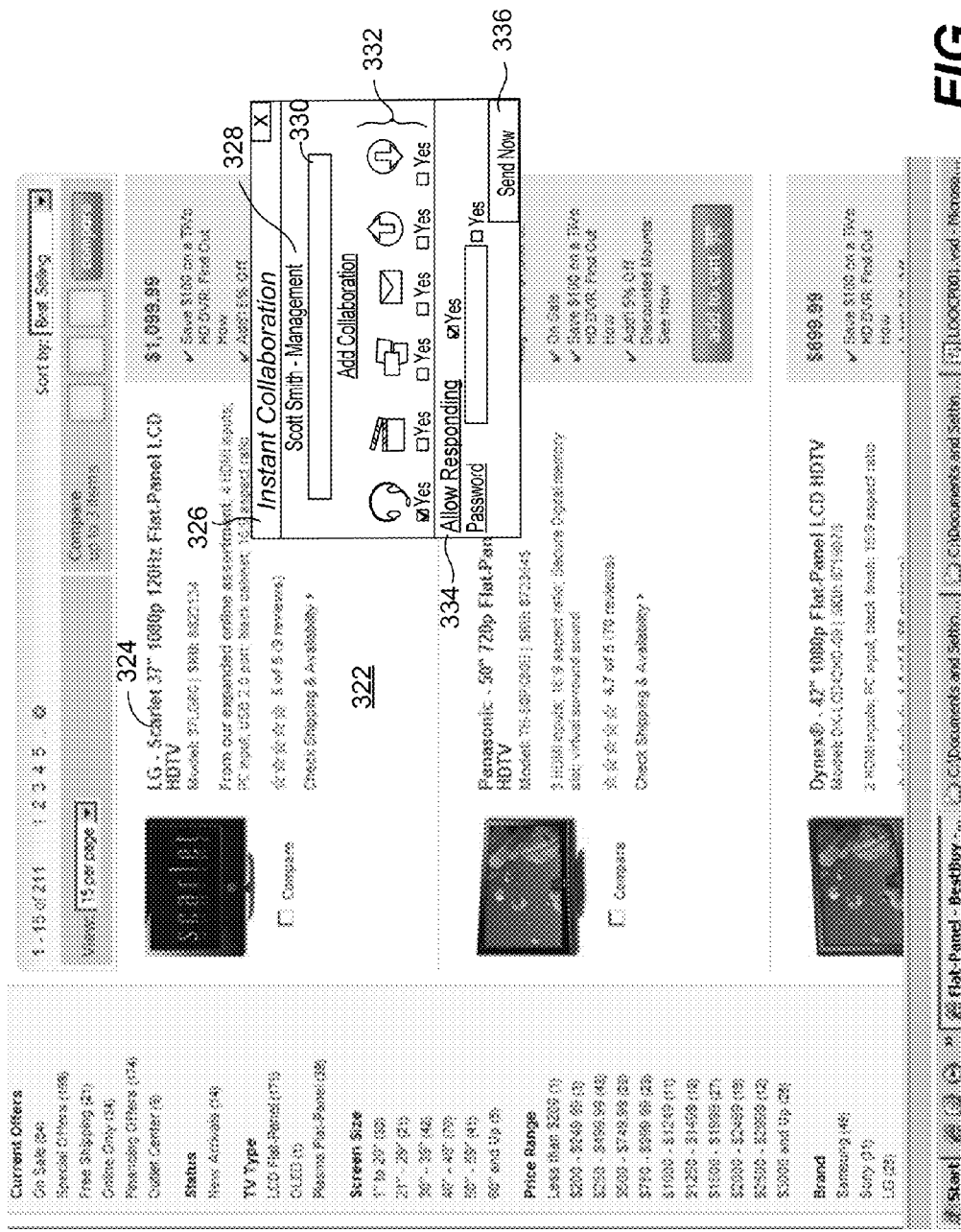
FIG. 15A illustrates a Yahoo! web page listing numerous items including item and an instant collaboration window.
Figure 15B:
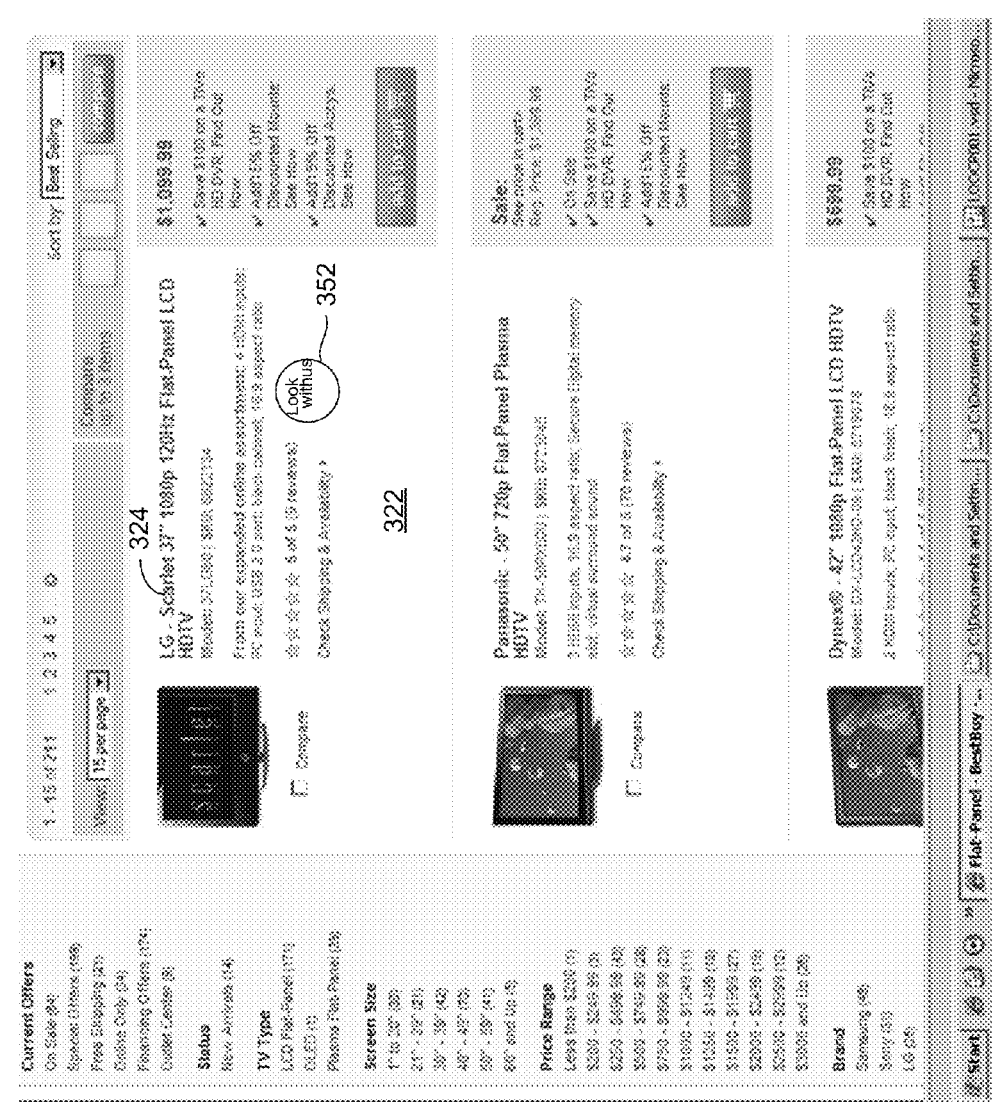
Figure 15C:
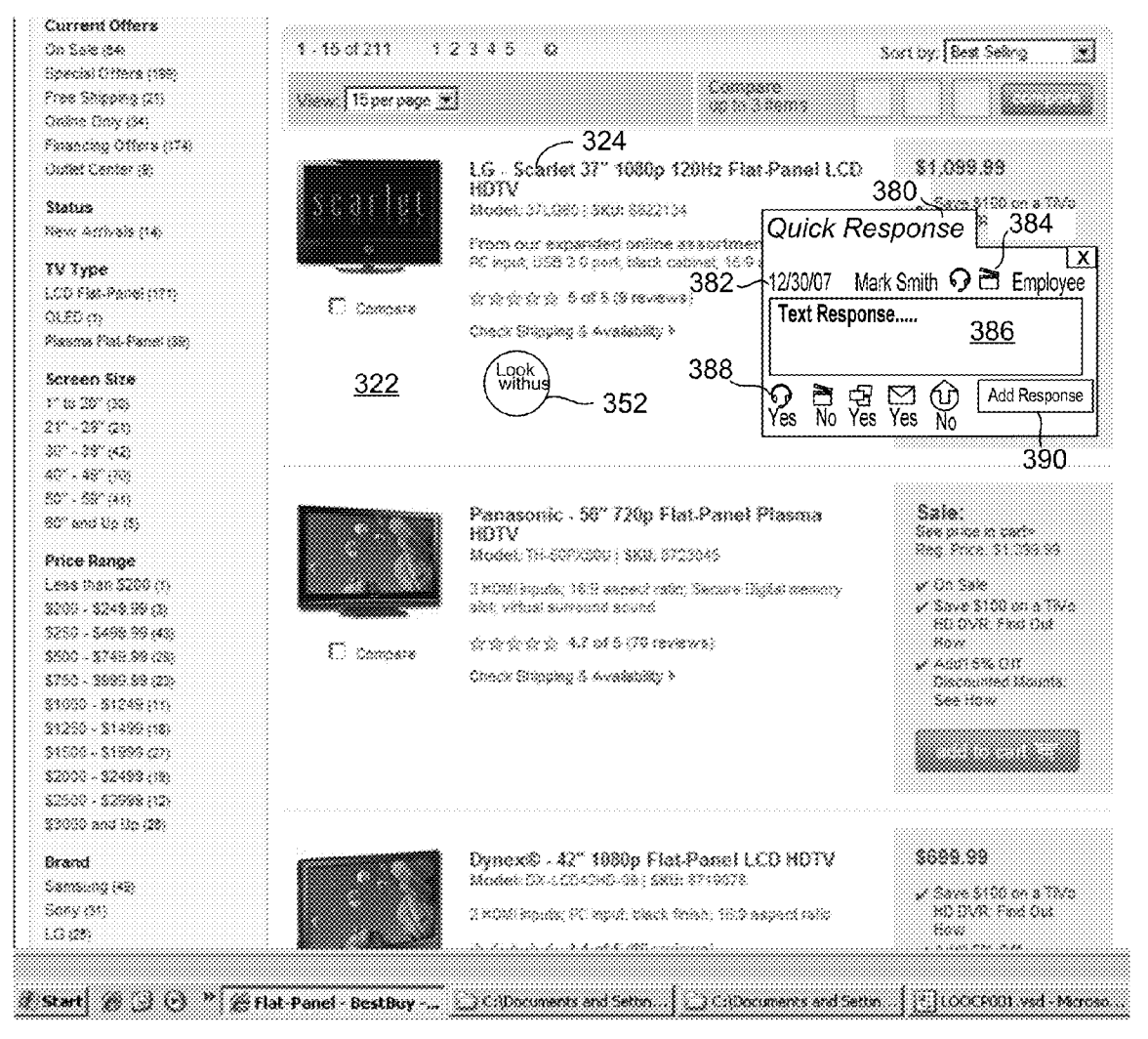

A similar scenario may involve any other suitable web site such as a Yahoo! web page 322. FIG. 15A illustrates a Yahoo! web page 322 listing numerous items including item 324 and an instant collaboration window 326. FIG. 15B illustrates the same web page 322 having item 324 but with a symbol 352 indicating that a digital object has been attached in association with item 324. FIG. 15C illustrates a quick response window 380.

User Interface—User Experience

In operation, use of the online collaboration system may be performed as in the following simple example. A first user opens up the client application software and any suitable word processing document (or other application for viewing a digital object) on his or her local computer (or mobile computing device), and a navigation bar 14 appears allowing the user to add annotations or perform other actions. The user may start with a blank document or with a document already including text, graphics, etc. Assuming the document already has text, the user is allowed to annotate certain portions of the document with further text using icon 32, to add a video clip using icon 30 (using a camera attached to the computer, for example), to add a sound file using icon 28 (using an integrated computer microphone, an external microphone, a headset, SKYPE telephone service equipment, any VOIP equipment, etc.), or to add a snapshot from a web site or a portion of the computer screen (using the screen shot capabilities of his or her computer).

Once these attachments have been added to the document and the location for each attachment is specified within the document, the user uploads the document and its attachments to a digital object repository using upload icon 26. As described above, digital objects are related to one another. The objects and their relationship are stored in the repository. Where an annotation or interaction has been made to a specific section of an object, for example, a document, a reference is stored along with the object relationship information to allow the client application interface to show "where" in the document a specific annotation, snapshot, audio file, etc., applies.

Next, the first user invites other users to view this document, make changes or add further annotations by selecting coworkers icon 22 or quick start icon 38. The user identifies the document, identifies a second user to view the document, selects the permissions for the document and then executes the invitation. The invitation is then transmitted via online collaboration system 400 to the repository. When the second user opens the client application on his or her computer (or mobile computing device), chooses the repository and selects Query Actions, navigation bar 14 appears and calendar icon 20 indicates to the user that an alert has been received due to the invitation. The icon may flash, change in size, color or content, animate, etc., to indicate that an invitation has been received. Or, icon 20 does not change and the second user must select it in order to view a calendar window 50 that shows any invitations received.

Alternatively, an alert is generated for the second user based upon an addition of a digital object to a repository, a modification to a digital object, an invitation to view a digital object, etc. When the user selects Query Actions, the calendar icon will similarly indicate that an alert has been received. Choosing the option Query Actions allows a user to see both alerts that have been generated automatically due to the changes in a repository as well as invitations to collaborate upon a document from another user. Preferably, alerts are stored in the corresponding LWU repository.

Next, the second user may directly select a particular document using alert window 50, for example by clicking on one of the listed invitations or alerts. In this example, the second user selects the invitation listing the document that the first user has annotated and uploaded. Once selected, the document is opened for the second user on his or her local computer (or mobile computing device) but not necessarily downloaded to that computer. Downloading may occur only when the permission to download has been granted. If not downloaded, the actual document file and its associated annotations remain stored and is accessed in the digital object repository.

Once opened, the document and its annotations are available for viewing (or listening) by the second user. For example, FIG. 13A illustrates a document having attachments 221-234 that may be opened by the second user. When opened, the text, video or snapshot is displayed to the second user on his or her computer screen, or the sound file is played for the user on the computer speakers or the user's headset. Preferably, attachments are downloaded along with the document only when the attachments are selected by the user.

The second user also has the option of adding annotations of his own to the original document assuming he or she has been given permission to modify the original document (also referred to as "annotation" or "collaboration" privileges). Annotations are added by opening navigation window 14 and then adding information as discussed above with respect to the first user. The second user may then upload the document (if it had been downloaded) or invite others to view the document which would then generate an invitation for those other users. One does not need the download privilege to annotate a document. That privilege is applicable to one's local storage, for example, a personal library or for company distribution. A record of all changes to the document, annotations to the document and version control is also available. This "digital object history" is maintained in the repository. It is effectively the sum total of all the interactions, versions, annotations, changes, etc., that have occurred against this digital object.

Once a document has been viewed by all reviewers, the document contents and its annotations are locked so no further changes may be made and the document is returned to the object repository and backed up. An object may be locked by an entry made to the Object Table, and may be implemented to guarantee maximum performance of the locking mechanism. Depending on compliance issues, all versions may be saved in the object repository and then backed up. In this fashion, a document may be viewed and annotated by multiple users (perhaps residing in different parts of the world) without the need for sending documents via electronic mail. Further, a single document contains all annotations by the contributing users including rich media such as text, video, images and voice.

Many other examples of usage are possible. For example, a contract uploaded to a repository by a law firm may be viewed by a client but not be changed by the client. In other words, the client has viewing privileges, and may be allowed to attach voice files or video, but will not be able to modify the contract, but additional annotations are allowed. In another example, a real estate web site has a photograph of a house. The first user opens up the client application of the collaboration system and annotates the photograph with a voice file describing the photograph. A second user of the collaboration system is then able to view that web site and see an annotation icon or symbol indicating that the photograph has an annotation. The second user may then click on the icon or symbol to see or hear the annotation. The second user (or multiple other users) may then click on the icon and collaborate by leaving questions or requests attached to the photograph that would then alert the originator of the photograph that there has been collaboration that needs to be attended to.

High-Level Block Diagram

FIG. 16 is a high-level block diagram of a collaboration system 400. A user 404 uses a host computer 900 on which is resident client application 408 in order to interact with the collaboration system 400. Computer 900 may be any type of computing device including a mobile telephone (such as a smart phone, a 3G handset, an iPhone, etc.), a personal digital assistant, etc. User 404 in the traditional sense is a person or group of people. In addition, users may be software applications, processes, or devices. For example, user 404 may be the TRIM Context 6 or the Objective enterprise content management software. Within the system, users have attributes, constraints and rules associated with them that govern how they interact and what they can do with documents. In a particular community of users, a user is granted rights by those that own the community or repository.

A community is a grouping construct that allows an administrator to manage a repository or a container within a repository. Of course, a repository may also be owned by a company, organization or other entity that dictates who has access to the repository. A community may also be defined by a particular user and who invites other users to join that community. As will be described below, an owner of a repository may define the community for that repository and which users may participate and what they can see and do within the repository. For example, a first user may invite a second user to join his community but only with the ability to view digital objects marked as a final draft. A user has full rights to create and modify documents within his own repository but may have different permissions in a different repository.

For example, communities of users may correspond directly to departments within a corporation or to specific groups within a corporation such as "all engineers," "sales force" or "secretaries." Groups may overlap, for example, when communities are also defined geographically, such as "North America personnel," "South America personnel" and "Europe personnel." A community may be assigned to, and have common rights to, an entire digital object repository, or a subdivided container within that repository.

Communities and containers are defined in the authentication and repository metadata structures respectively. High level definitions about communities and containers are defined in the LWU authentication gateway. Granular definitions are stored in the LWU repository. Default rights and permissions are created by the system or repository administrator. Rights and permissions can also be inherited from community membership, container access, etc.

Client application 408 is a client-side software host application that may be implemented using any programming language. The client application described below is essentially the front end (one of many possible interfaces) of the overall system. Preferably, C/C++ and JAVA combinations may be used. The client application utilizes the most appropriate operating system libraries and interfaces available for a specific platform, i.e., Macintosh, Microsoft, Linux, etc. In one embodiment, the client application is a collection of software modules. In a specific implementation by Lookwithus.com, Inc., this collection includes the modules named "collaboration wizard," "quick response" and "instant collaboration" that have been described earlier. Other modules may include an e-mail module and others. Alternatively, a user may access system 400 using a client application integrated with a web browser (instead of having a host client application loaded on his or her computer) on any suitable computing device. The metadata package would then be stored in the browser's cache for the duration of the session.

A third technique for a user to access the collaboration system involves a third party 410 and external services integration 412. In this embodiment a third-party (such as Facebook, Yahoo!, Amazon, etc.) desires to allow its users to utilize the functionality of the collaboration system but does not require that those users have a client application loaded on their computer or have a client application integrated with a browser. A user 406 uses any suitable computer or computing device to access the web site of the third party 410. External services integration 412 provides a hosted client application that allows any user of a web site of a third party to interact and collaborate on documents, snapshots, web sites, etc. The third-party database 426 may then be any suitable repository used by that third party, for example, it may be storage leased from another company such as the Amazon S3 service. In this third technique the external services integration provides the metadata infrastructure needed. The fact that a user is using the collaboration system software while on a third-party web site may be transparent to the user. In this situation, the third party site's users are transparent to the LWU system. In a sense, this implementation renders an entire repository for single use by a third-party system.

Figure 23:
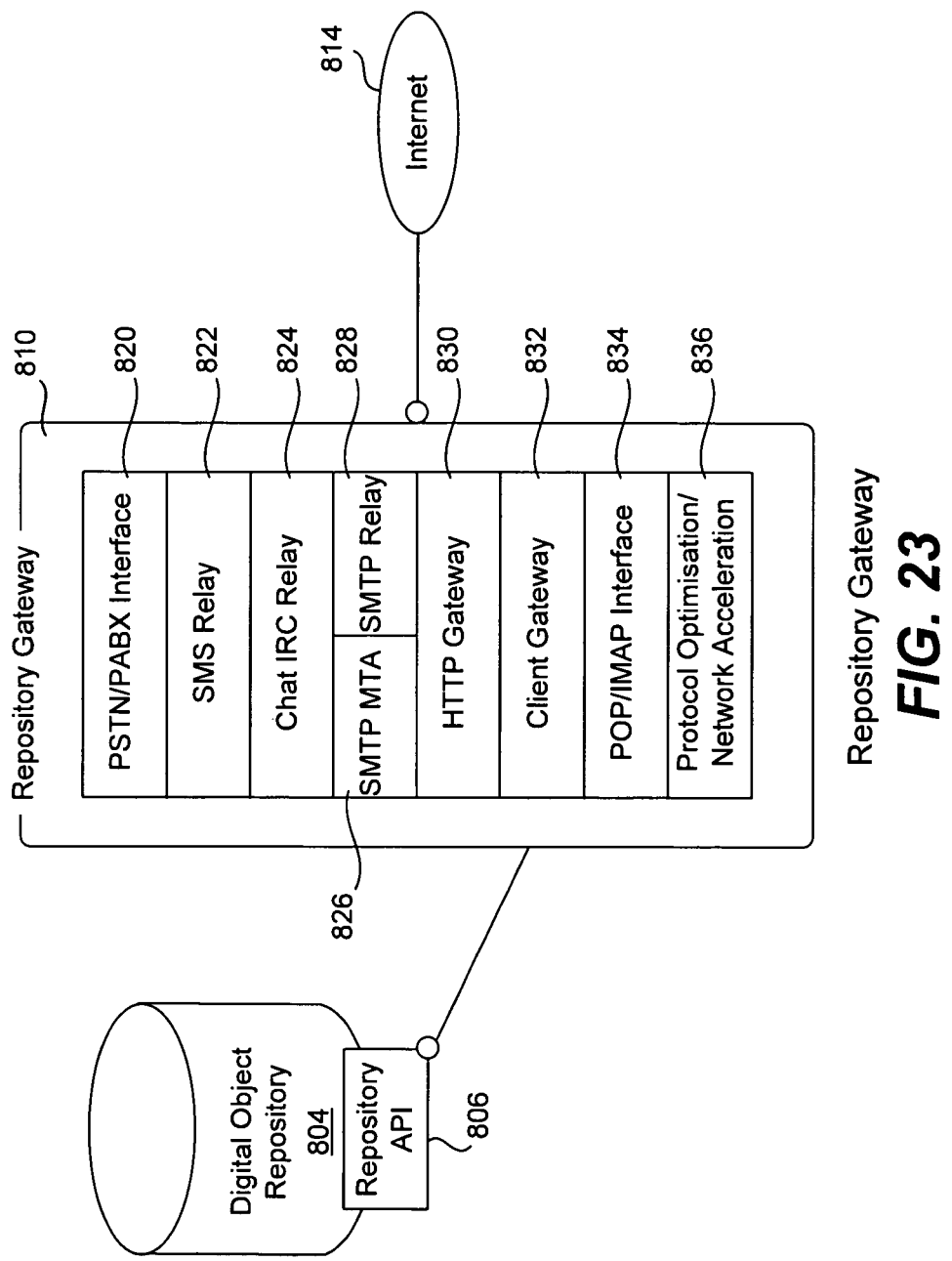
FIG. 23 illustrates one embodiment of a digital object repository within system.

Digital object repositories 422-426 are object stores that serve to store documents and their annotations (digital attachments). A repository stores the digital objects or "artifacts" managed by the system. For example, digital objects include computer files, documents (contracts, scripts, memoranda, etc.), spreadsheets, images, photographs, hyperlinks, a web site or portion of a web site, etc. Each repository includes the repository itself and a repository gateway as shown in FIG. 23. The repository is the physical storage location for digital objects. The repository gateway is the implementation of repository-specific interfaces as well as the repository gateway API and plug-in architecture. The plug-in architecture allows any external repository to interface with any system or application supported by an available plug-in.

As discussed below, the access and usage metadata concerning these digital objects is not stored in a repository but is stored elsewhere. Any number of repositories may exist and implementation of these repositories may be done in different manners. The repositories shown represent a level of abstraction above the physical computer hardware. For example, a repository may be implemented on the user's own laptop or desktop computer and used for personal purposes. Alternatively, Lookwithus.com Inc. (the assignee of the present invention) owns physical computer servers and leases space on these servers for use as a digital object repository to a company (or individual) that implements the herein described collaboration software. Or, repository 424 may be implemented on a computer server or servers at a company that is using internally the herein described collaboration system. In this fashion the company exercises complete control over use and maintenance of the object repositories. The purpose may be for review of legal documents, proposals, product releases, pharmaceutical development, etc.

Or, the company (or individual) that uses the collaboration system leases space on an online server from a third party and uses that space to implement digital object repository 426. In this fashion the company does not own the physical computer server and is not responsible for its maintenance; the company merely has access to this server and its storage space over the Internet. For example, repository 426 may be provided under a lease arrangement by company that exists solely to lease computer servers, or may be provided by a company that performs other business as well.

External services integration 412 is the means by which third-party systems gain access to the collaboration system functionality without requiring users to implement a client application. For example, Amazon could use the collaboration system to provide rich media interaction for their customers—without their customers being registered users of the collaboration system nor being required to have special, installed software.

The collaboration system 400 may be used using a single one of these types of repositories or may be used with all types. Regardless of the ownership model of the repository used, storage of the information on a particular repository may be implemented in many ways. By way of example, storage may be implemented using a traditional file server running the Microsoft operating system, a database, a relational database, an LDAP directory, a content-addressable storage (CAS) system such as CASTOR available from Caringo, Inc., or a tape library, optical storage, solid state, RAM disk, NAS, SAN, Direct Attached, etc.

Further, each repository or community of users using a particular repository may implement different ownership and permission protocols as well as use the repository in different ways. And, user 404 may access different repositories (if they exist). For example, the user may access a repository on his desktop computer, in addition to accessing repositories located on his own company server or located on a leased server. Also, each digital object repository may have varying security requirements. A repository may be used for general purposes, for anonymous Internet interactions (such as web logs and journals, threads and chats, etc.). Other repositories may require digital certificate authentication and full encryption for all interaction within the repository.

FIG. 23 illustrates one embodiment of a digital object repository within system 400. Preferably, each repository 804 includes a repository API 806 that allows system 400 to be integrated with any physical storage system. Repository gateway 810 is a protocol gateway and facilitates communication between the API and an Internet connection 814. The API allows system 400 to interface with any number of physical storage systems without the need for protocol modification or rewriting of applications. All APIs and interfaces are provided by the collaboration system framework. They are software interfaces created by the collaboration system to provide programmatic access to the collaboration system features. Each repository uses a simplified data model that represents the object and ownership specific to a particular repository. Object requests from the repository are verified against a user metadata package 444. The client application provides the user metadata package 444 (its credentials) when interacting with the repository.

Repository gateway 810 is the interface between the open network (such as the Internet) and repository API 806 and manages all communication between the network and the repository. The repository gateway implements a number of protocols to support message interaction and third-party system integration. The repository gateway can support any number of protocols or third-party systems provided that a software plug-in can be developed that supports both systems. Utilizing this plug-in architecture, a number of default plug-ins are provided to support popular interactions between system 400 and existing technology. The following plug-ins are provided by default: a PSTN/PABX interface 820, an SMS relay 822, a chat IRC relay 824, an SMTP MTA 826, an SMTP relay 828, an HTTP gateway 830, a client gateway 832, a POP/IMAP interface 834, and a protocol optimization/network acceleration interface 836. The transmission of all digital objects to and from repository gateway 810 is optimized for the particular implementation of the client application and the bandwidth available. In one embodiment, the repository gateway makes data model object calls via the repository API 806. No metadata persists within the repository gateway. Client Gateway 832 and protocol optimization/network acceleration interface 836 are gateway plug-in options to extend the integration options for the LWU System. Existing technology may be used for these plug-ins or custom plug-ins may be designed and developed.

E-mail can be routed via existing SMTP MTA technologies to a particular repository gateway. From the repository gateway, the message is routed to the appropriate user. The metadata repository attached to the authentication gateway contains the mapping information that relates a user within the collaboration system to the user identifiers and addresses of other messaging systems. It is these mappings that allow the correct routing of other messaging technologies within the collaboration system. The following represents an example of mapping from a user to another user in a different messaging system. Specific mappings are managed by the particular repository Gateway plug-in. For example, an e-mail message to a LWU user mapping is represented by:

LWU User: mharvey1234 (LWU User ID)
PLUGIN: 12341234 (PLUGIN ID)
PLUGIN User: mharvey@lookwithus.com Such a relationship allows the collaboration system to look-up all the external messaging system relationships owned by a particular LWU User. This relationship also allows in-bound messages to be routed appropriately.

Returning now to FIG. 16, authentication gateway 432 is a server computer linked with a metadata repository 436 that accepts security credentials 440 from user 404, returns a user metadata package 444, and is responsible for session management. Gateway 432 is any suitable server computer and is preferably located remotely from client application 408. Authentication gateway 432 implements its processes using a programming language such as C/C++, JAVA or a combination. The gateway is the network interface to the collaboration system 400 and accepts and governs client application interactions. User data and security information is stored within metadata repository 436. The gateway may be on the same computer as a digital object repository or may be separate and interface with any number of digital object repositories. In one specific embodiment, the client application communicates with the authentication gateway and with a repository using SSL over Internet Protocol. Preferably, all communication between system components is encrypted using signed keys.

User metadata repository 436 preferably stores its metadata in a data store or database such as LDAP, SQL Database, RAM Disk, etc. The metadata repository includes the access and usage information and permissions for a particular user, as well as a unique identifier for each document within the system.

Preferably, each identifier for a document within an implementation of the collaboration system is unique to that system. A fully qualified identifier for a document may include: a system identifier, a repository identifier, a container identifier, and the document identifier itself. Thus, because each system identifier will be different for different implementations, a fully qualified identifier for a document will be unique in that system. A system may be implemented by different corporations, for example.

Permissions for operations upon digital objects are stored in each digital object repository. Preferably, permissions are container specific (or repository specific if the repository is not subdivided into containers); in other words, they are not specific rights for each user on each document. A user having access to a container of digital objects will have the same permissions to operate upon those documents as other users having the same access. A permission metadata structure in each digital object repository holds the permissions relating to each container in the documents within it. Preferably, each container has defaults for the permissions a user has to interact with a document. Repository access information is stored in the metadata repository, as shown by tables 760, 770, 780 and 790.

The authentication gateway provides the highest level of hierarchical qualification. Each repository within the system has its own identifier. When combined, the authentication gateway and repository identifiers uniquely identify a repository within a system. Any containers within the repository are also identified, so too are the digital objects within. A fully qualified digital object identifier is the combination of:

Authentication Gateway.Repository.Container.Digital Object.

In other words, while a particular contract under review (for example) might be stored in repository 422, the metadata concerning who has access to that document and which permissions they have, and how that document may be used, will be stored in metadata repository 436. This separation of document data from metadata ("disintermediation") improves the scalability of the system and makes it more flexible. By only keeping metadata in repository 436 the system can scale to potentially millions of users; such scaling would likely not be possible if all the associated data (all the digital objects) were stored together with the metadata. For example, storing the metadata concerning a particular contract in repository 422 along with that contract would limit scalability because the system would need to access each repository in order to handle each document. Further, storing metadata in repository 422 decreases user privacy. Object-level access information is stored in each repository, for example, as shown in tables 704 and 724. This access information is "joined" to the user's metadata package, 744—thus completing the entire permissions picture.

Figure 21:
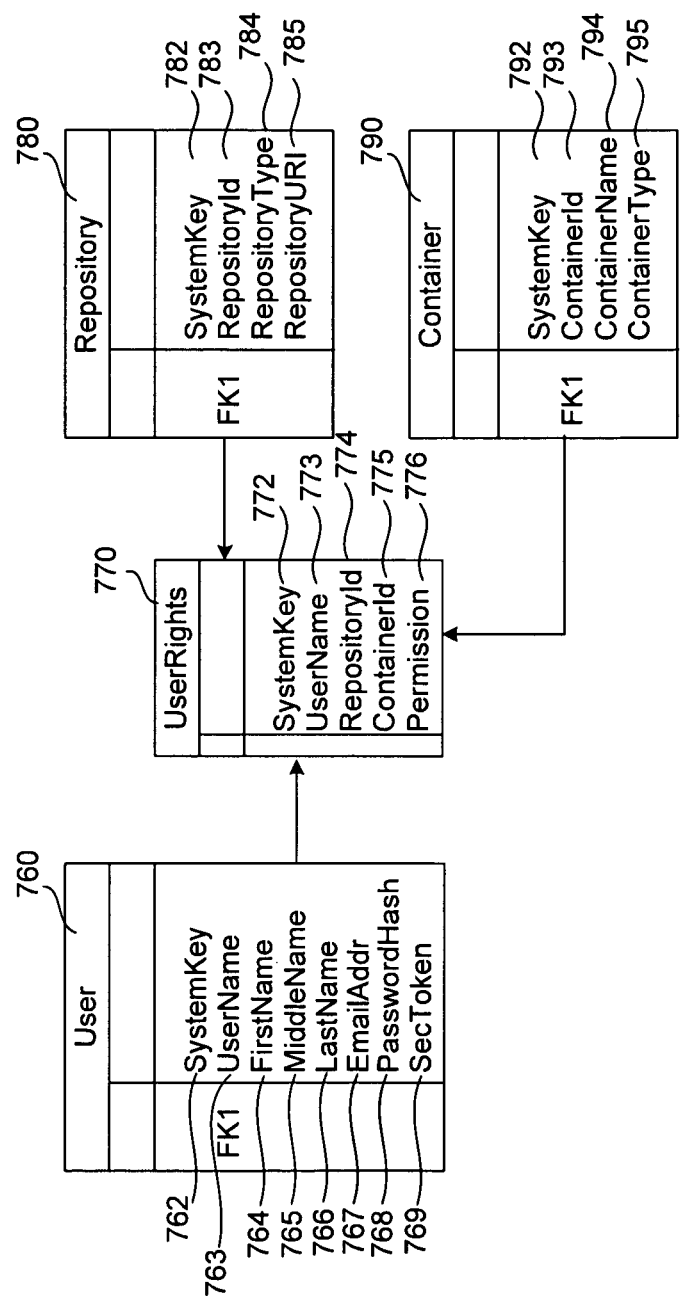
FIG. 21 illustrates the data models that may be used to support the authentication gateway in one specific implementation of system.

Once a user logs in successfully using client application 408 the user's security credentials 440 are presented to gateway 432 and, upon success, a user metadata package 444 is returned to the client application. The metadata package describes to which repositories the user has access, where each repository may be found on a network, and how the user is permitted to interact with those repositories. Preferably, the metadata package is instantiated at the client application and is stored there in volatile memory. This metadata package will allow the user to make an appropriate request of a digital object repository and this metadata package lists which repositories the user can access. Table 770 of FIG. 21 illustrates the contents of the metadata package. An example of the dataset within the package is:

LWU Security SystemKey: 123456
UserName: MichaelHarvey
RepositoryID: 1001
ContainerID: 5544
SecToken: PublicKeyInfo
PasswordHash: !#$%@$#%$#@%$#@

The client application interprets this metadata package and then will allow (or not allow) the user to access a particular digital object repository. Should a user's access information change, a flag is set causing the user's metadata package to spoil. This requires an automatic re-authentication so that updated or deleted user rights can be instantiated. Preferably, the spoil flag is set against the user's login data in the authentication gateway. A spoil flag may also be set on a metadata package should the user lose privileges, leave employment, or should a characteristic of the digital object repository change. Once a spoil flag is set, the client application must authenticate again and receive a new metadata package for the user from the metadata repository.

The collaboration system security model is based on digital certificates which are used for both authentication and encryption. All digital objects are created and signed by a natural person (or by an application registered to a natural person). A private and public key is used by all system users for authentication, digital signatures, encryption and decryption.

Rights and permissions relating to documents are stored within the repository on which they reside. In other words, object level rights are stored in table 724 UserObject. This table resides at the repository. Lines of communication 446 and 448 indicate accesses to a digital object repository and delivery of digital objects to a client application, respectively.

Conceptual Data Structures

Figure 20:
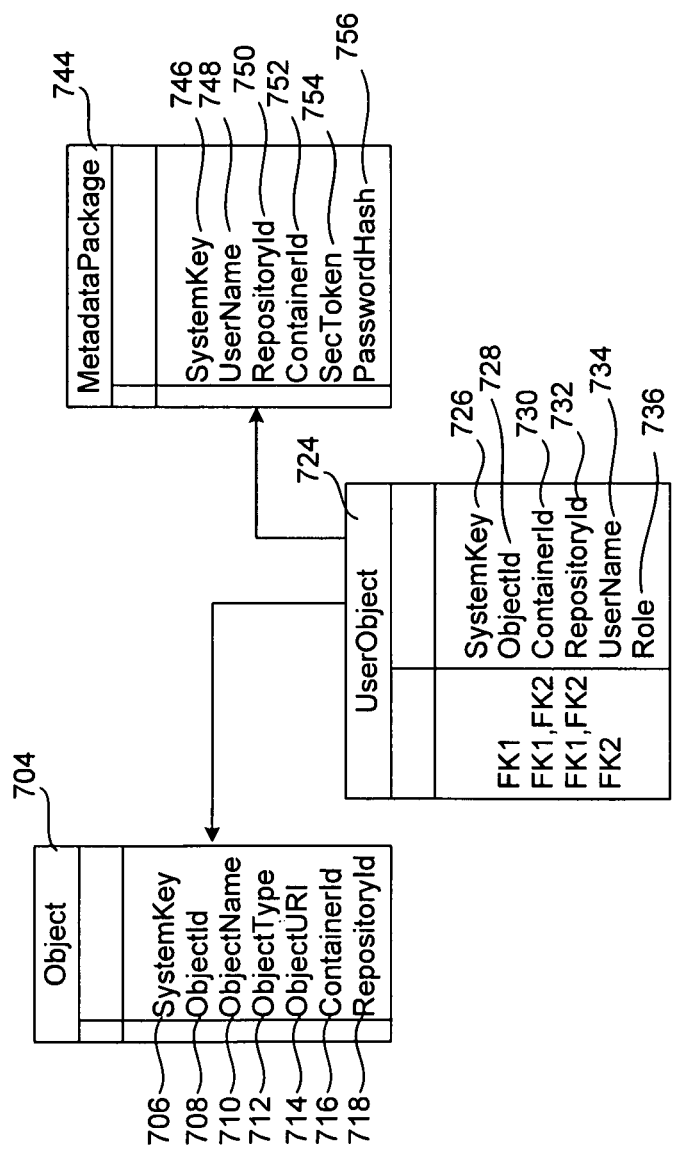
FIG. 20 illustrates various data models that may be used for one specific implementation of system.
Figure 22:
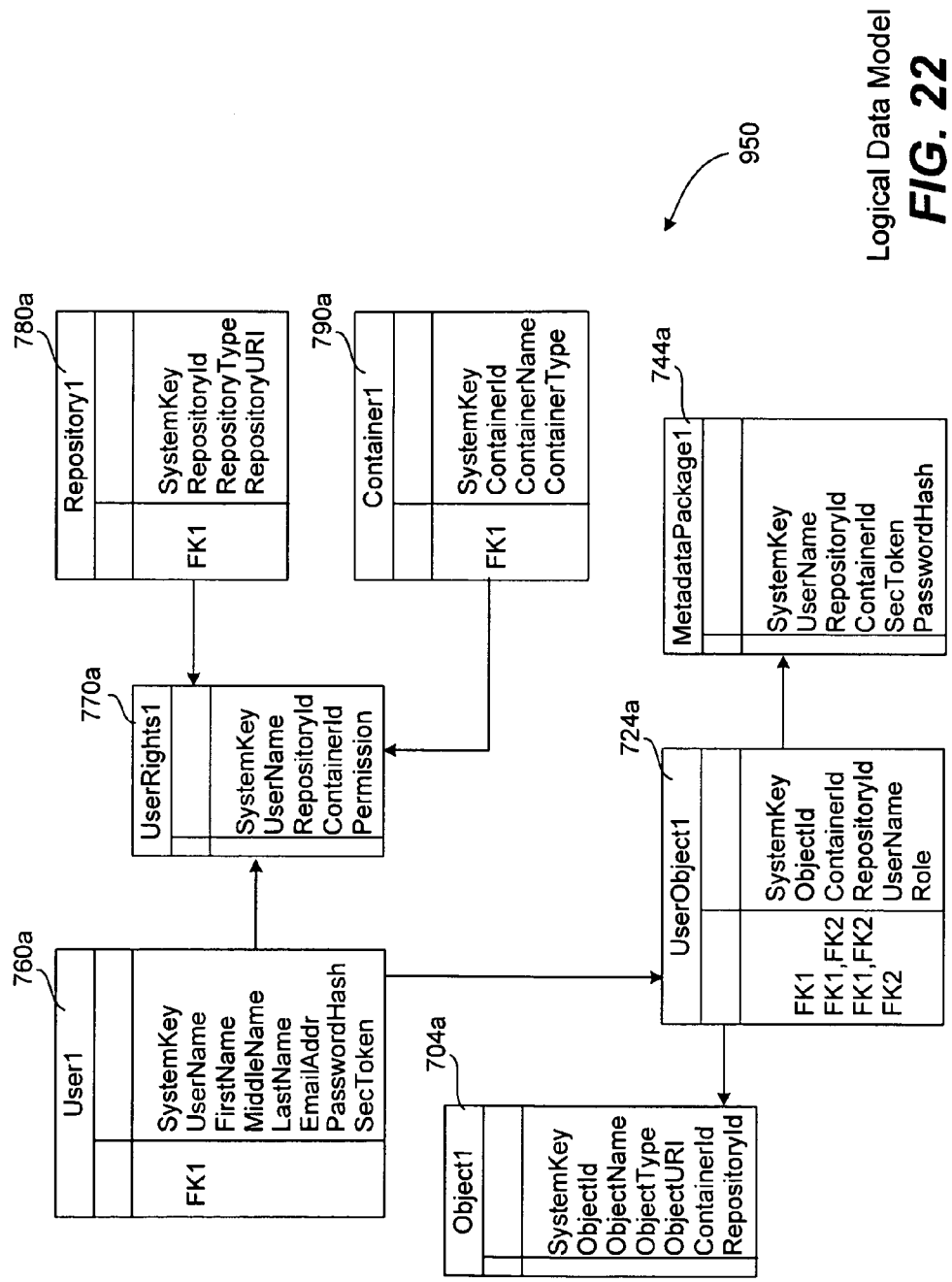
FIG. 22 illustrates an example logical data model using the data model objects explained earlier with reference to FIGS. 20 and 21.

FIGS. 17A, 17B and 17C illustrate examples of metadata information stored in user metadata repository 436. Although this information is presented as a series of tables, it is contemplated that this information may be stored in other types of data stores and may be organized and implemented in different ways. For example, FIGS. 20-22 present a different embodiment for storing this information.

FIG. 17A is a user table 460 that includes information about each user in system 400. Each user authorized to access system 400 will have an entry in this table. Column 462 holds a user identifier, user name, e-mail address, SKYPE address, or other unique identifier for each user of the system. Column 464 holds the actual user's name. Column 466 includes rules governing a default computing device used by the user such as whether computer files (or any digital object) of a certain type or size should always be downloaded to the device or whether only a link usable by a browser should be used instead. In this fashion, a user on a handheld device may specify that large files should not be downloaded, while a user of a powerful desktop computer may specify that all files of any size should be downloaded. These default preferences would prevent large objects from being sent to a mobile device. One alternative is that only text annotations are sent. Column 468 includes other information for further scalability options. Table 770 sets user permissions at a container level. Table 724 sets user permission (roles) at the digital object level.

FIG. 17B is a repository table 470 that includes information about each repository in system 400. Column 472 is a unique name for each repository and column 474 indicates the specific location within system 400 where client application 408 may find each repository such as a network address, an IP address, a domain name, etc. Any identifier may be used for an address; preferably a DNS entry will suffice.

Column 476 indicates the type of access method that should be used to access each repository based upon the type of each repository. Access methods such as LDAP, ODBC, HTTP, Center SDK, technology from Caringo, etc., are listed and reflect the type of access that should be used or the particular type of object store used for each repository. Column 478 indicates the owner of each repository such as AT&T, Amazon, Verizon, Skype, USPS, etc.

Column 479 includes alert rules for each repository. Each repository includes rules governing which users are alerted when a document is uploaded, when a document is changed, when a document is annotated, when a document is deleted, when a document is downloaded, etc. Preferably, the administrator (or owner) of each repository set up the rules for each repository and each repository may have default rules. For example, one rule may be that all users of a particular repository are sent an alert when any document in the repository is annotated with information or if any new document is created and uploaded to the repository.

The alert function is provided by rules 479 and the client application. When the client application authenticates to the authentication gateway, all alert information is provided to the client application. Alerts are then displayed in the client application software interface. Rules are represented and stored in table format. Administration users will be able to configure rules for repositories, containers, users, etc.

Column 473 includes default device rules for the computing devices of the users who have access to a given repository. As with the device rules in column 466 above, device rules 473 dictate whether files of a certain type or size should be downloaded to a user's computing device or whether only a link for a browser should be used. Preferably, device rules 466 specified by a user will override device rules 473. Column 475 holds other information such as that needed for device interoperability. The information required for device interoperability may change from time to time as newer devices become available and new communication protocols are adopted.

FIG. 17C is a user rights table 480 that includes information regarding the rights each user has to particular repositories. Each repository able to be accessed by a particular user will be represented by a row in the table. Column 481 is the user identifier. Column 482 indicates a single repository to which the user has access; columns 483-485 indicate particular rights the user has to that repository such as owner, participant or administrator.

User rights (or permissions) can be set at multiple levels: repository, container, object. Permissions include—READ (View), WRITE (Create, Update, Delete) and ANNOTATE (Interact) 486-488. An administration user has super user privileges and can remove objects created by other users, unless the repository has a retention period for compliance purposes.

Implementation Using Data Model Objects

FIG. 20 illustrates various data models that may be used for one specific implementation of system 400. These data models (in the form of tables) object 704, user object 724 and metadata package 744 support the client application and are stored within the authentication gateway and in the repository gateway. The data model is distributed throughout the system. Tables may be stored in the authentication gateway as well as being stored in the repository. The metadata package is an instance of the user's relevant data and is stored in the authentication gateway. The metadata package is used to link to entries in tables within the repository. Metadata package 744 is provided to the client application upon a successful login. Table 770 sets user permissions at a container level. Table 724 sets user permissions (roles) at the digital object level.

Object 704 represents the object data set for a particular digital object and is stored in the LWU repository; it includes system key 706, object identifier 708, object name 710, object type 712, object URI 714, container identifier 716 and repository identifier 718. Each of these attributes is used as shown in the table below.

| Object Table | |
|---|---|
| SystemKey | System Identifier |
| ObjectID | Unique Object Identifier |
| ObjectName | Object "text" name |
| ObjectType | Type of Object |
| ObjectURI | Address of object within the repository |
| ContainerID | Unique Container Identifier |
| RepositoryID | Unique Repository Identifier |

User object 724 represents the relationship between digital objects and users and is stored in the LWU Repository; it includes system key 726, object identifier 728, container identifier 730, repository identifier 732, user name 734 and role 736. Each of these attributes is used as shown in the table below.

| User Object Table | |
|---|---|
| SystemKey | System Identifier |
| ObjectId | Unique Object Identifier |
| ContainerId | Unique Container Identifier |
| RepositoryId | Unique Repository Identifier |
| UserName | User Identifier |
| Role | The Role of the user on the object |

Metadata package 744 represents the contents of the metadata package stored in user metadata repository 436 and includes system key 746, user name 748, repository identifier 750, container identifier 752, security token 754 and password hash 756. Each of these attributes is used as shown in the table below.

| Metadata Package | |
|---|---|
| SystemKey | System Identifier |
| UserName | User Identifier |
| RepositoryId | Unique Repository Identifier |
| ContainerId | Unique Container Identifier |
| SecToken | Digital Certificate or Security Token |
| Password Hash | Hash of the user's password |

The arrows connecting each box represent parent-child or one-to-many relationships. Tables at the arrow point represent the "one" or "child" side of the relationship FIG. 21 illustrates the data models that may be used to support the authentication gateway in one specific implementation of system 400. These objects are stored within the user metadata repository 436. As mentioned above, the user metadata repository contains information specific to users and their rights and permissions regarding the digital object repositories. This figure illustrates the relationship between users, repositories and containers. Containers are the lowest level storage location for digital objects within a repository.

User object 760 represents the collaboration system users and includes system key 762, user name 763, first name 764, middle name 765, last name 766, e-mail address 767, password hash 768 and security token 769.

User rights object 770 represents user's rights/permissions and includes system key 772, user name 773, repository identifier 774, container identifier 775, and permission 776.

Repository object 780 represents repository information and includes system key 782, repository identifier 783, repository type 784 and repository URI 785.

Container object 790 represents container information and includes system key 792, container identifier 793, container name 794, and container type 795.

Items 760, 780 and 790 are reference datasets, or tables, and are used to register the particulars of the subject areas they represent. Thus, user information is stored in the user table 760. Repository information will be stored in the repository table 780. Container information is stored in the container table 790.

Item 770 relates all these tables so that the relationship between users, repositories, objects and the rights/permissions therein can be made available to the system.

FIG. 22 illustrates an example logical data model 950 using the data model objects explained earlier with reference to FIGS. 20 and 21. This figure illustrates how all system datasets/tables are related. This figure is the data model supporting the collaboration system. It includes the datasets/tables located in both the authentication gateway and the repository gateways. This is the reference model for metadata and relationship information.

In general, at a system level, objects are attached or annotated (related) to other objects using the Object_Object_Table shown below:

| Object Object Table | |
|---|---|
| SystemKey | System Identifier |
| RelatedObjectID | First Object in Relationship |
| RelatesObjectID | Second Object in Relationship |

High-Level Flow Diagram

Figures 18, 19:
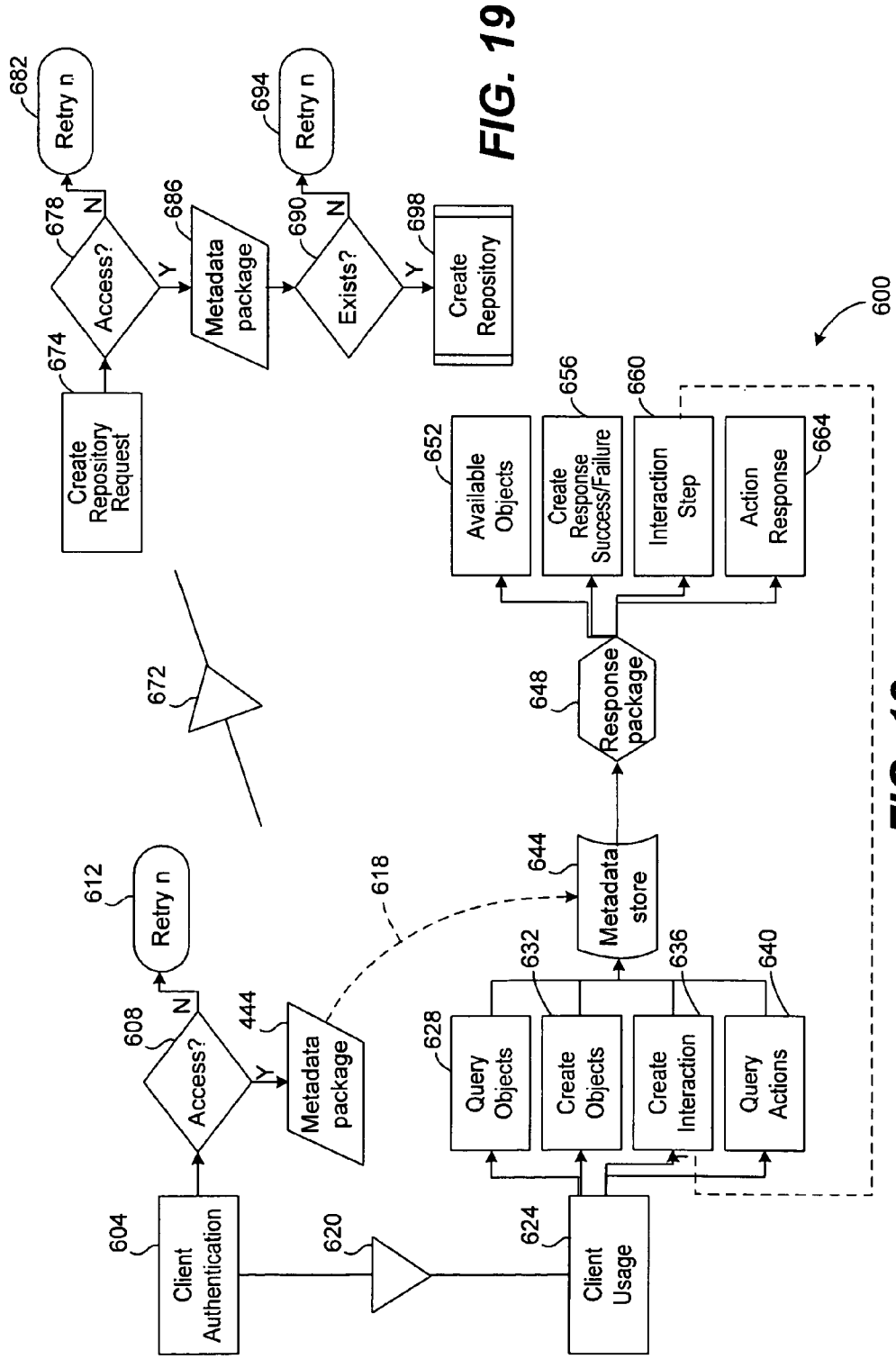
FIG. 18 is a high-level flow diagram illustrating processes within system.
FIG. 19 illustrates a high-level flow diagram for creating a repository within the collaboration system.

FIG. 18 is a high-level flow diagram illustrating processes within system 400. Various of the steps and processes described below occur on client application 408, on authentication gateway 432 or upon a computer server that implements one of the repositories 422-426; the context will make clear where each step is implemented. In the following simple example it will be assumed that only a single repository 424 is being used and that this repository is implemented internally; for example, the repository is under the control of a corporation where the users are the employees of the corporation.

In step 604 the user executes client application 408 upon any suitable computing platform and submits security credentials 440 to authentication gateway 432 during a login procedure. Credentials 440 may be as simple as a user name and password, or may also include a digital certificate. Access to a gateway may be limited to only certain machines or devices. In these cases, the IP or hardware address of the authorized device is also provided for access.

In step 608 gateway 432 determines if the user has access, and if not, a retry procedure 612 may be implemented. Upon success, in step 616 a metadata package 444 is instantiated, returned to the client application 618 and is stored in user metadata storage 644 (such as a cache of the client application) on the user's computing device for the duration of the session. Package 444 is used to manage session behavior and is destroyed at the end of the session.

As user metadata repository 436 includes access data on all potential users of the system, the returned metadata package 444 is only a subset of that data that pertains to the single user who has logged in. For example, the returned package includes any relevant rows from table 480 identifying to which repositories the user has access and his or her particular user rights in that repository. Once the user has been authenticated by the gateway, and the metadata package returned, a control transfer 620 is executed.

In step 624 the client application processes the received metadata package and determines to which repositories in the system the user has access. The user is then presented with a list, menu, graphics or other symbols indicating which repositories are available for access. For example, FIG. 2A illustrates such a list that is presented to the user. The user may also select a particular digital object repository to access, or may select a particular container within a repository (or a container within a container).

The user then chooses a repository (by clicking, selecting, entering its name, etc.) and that repository with its digital objects is now available for use. Once selected, information and digital objects in the selected repository are made available for viewing at the client application. Objects are transferred over a TCP connection using SSL encryption. They are effectively downloaded into the memory of the client machine or device. Once downloaded, the object is opened by the appropriate viewer or application.

Flow Diagram—Create Objects

The user may then decide to perform particular steps 628-640, depending upon whether the user wishes to respond to an alert or invitation, collaborate upon a document, annotate one of his own original documents, generate invitations or alerts, etc. Assuming that the user wishes to create and upload a new digital object for use in the system, the user selects Create Objects 632 and is presented with an administration panel such as the "instant collaboration" window shown in FIG. 3B, the screenshot of FIG. 12H "collaboration wizard," or the screen shot of FIG. 14C "quick response."

Such an administration panel allows the user to upload a particular digital object from his or her computing device to the selected repository, as well as set security policies, permissions and rules concerning use of that digital object. For example, the user may upload a particular contract, document, digital object, etc., that he wishes other users to view and comment upon.

Each repository has a set of default properties and permissions that are applied to each digital object (e.g., a document) that is uploaded by a user, and these default properties and permissions may vary by repository. These properties and permissions include: the owner (by default the user); whether changes are allowed; whether annotations are allowed; if other users may view, download or upload a document; storage space allowed per digital object; retention period per digital object; security; as well as multiple storage locations for compliance and archiving.

Only users have permissions. Repositories, containers and objects have properties that may vary depending on the type of object or the type of repository. Users have permissions on repositories and containers that affect objects. For example, a user with READ/WRITE permission on a container is able to create an object and modify that object—even delete—unless overruled by a retention period setting. If another user has permission to annotate on a container, then they are able to annotate objects within that same container, but without the WRITE permission, they cannot create objects of their own (i.e., they cannot start a thread).

At this step, the user uploading the document has the ability to change any of these default properties or permissions for all other users. For example, the user might indicate that a different user should be the owner, that changes are allowed by any user, that all users may download and view the document but may not upload it, or that the storage space or retention period should be changed for the document. The user also has the capability to set permissions on the document for particular users. For example, the user may specify that one certain user may view and annotate the document, that another user can view and change the document, that a different user may download and view the document only, etc. For example, a suitable administration screenshot is shown in FIG. 3B window 64 representing an instant collaboration. Also, FIG. 12A shows a Quickstart collaboration. The logical data model 704 through 795 contains the tables used to configure users, permissions, repositories, containers and objects.

Once the document to be uploaded has been selected and any overriding properties or permissions are selected by the user, a request is generated by the client application in 632 to create a new object in the current repository. The client application first combines the request with metadata package 444 stored in metadata store 644 to determine whether the request is valid. A response package 648 is generated by the client application to provide an initial response to the user. For example, the metadata package may have a spoil flag indicating that the metadata is invalid after a particular time or date. If that time or date has passed then the client application returns to gateway 432 to retrieve an updated metadata package 444 and the response package indicates this occurrence. Further, the user's metadata package may indicate that the user does not have permission to access the desired repository, to create objects, upload objects etc.; in this situation the response package indicates this result to the user. Or, a network problem prevents the client application from uploading the document to the repository and the response package indicates this occurrence. Other responses indicated by the response package to the user include: success, fail, list of objects, list of repositories, list of containers, list of alerts, etc.

The metadata package persists in memory of the user computing device for the duration of the session. It is used to access repositories and will be transmitted to the repository for authentication, but it typically is not stored at the repository. Assuming that all conditions are favorable, the response package indicates "upload approved" (or some other indication or simply no indication) to the user and the document along with any overriding permissions are transferred to the current repository. The document is typically uploaded using SSL over TCP. If the user does not have the necessary permissions at the repository, the request will fail and the notification will take the form of the response package.

In step 656 the uploaded document and any overriding properties or permissions are received at the digital object repository. If no new properties or permissions are received then the default properties and permissions of the repository take effect for the uploaded document. Assuming that the uploaded document is successfully uploaded and stored within the repository, the repository generates a success response and returns that response to the client application for presentation to the user. But, if the document cannot be stored (perhaps due to incorrect user rights, incorrect permissions, packets lost, space limitations, a change in the repository policy, etc.), then the repository generates a failure response and returns that response to the client application. If the user desires no further activities then he or she logs out of the client application.

Creation of a digital object and uploading it to a repository may also trigger an alert for other users associated with that repository assuming that the rules indicate that an alert should be generated. Thus, interaction step 660 also triggers an alert for other users who are associated with this document. For example, an alert will signal to all other associated users that the document has been recently uploaded and that they should review the document. A user who uploads a document may select who is to be alerted. Further, policies for these alerts may be set to indicate whether alerts should be generated immediately, after a period of time or periodically.

A document may be uploaded and an alert may be sent using the "instant collaboration" interface and technique as shown, for example, in FIG. 3B.

Flow Diagram—Create Interaction

Assuming that the user wishes to annotate a digital object in the system, the user may select Query Objects 628 (discussed below) in order to download a particular digital object for interaction. An administration panel allows the user to download a particular digital object to his or her computing device from the selected repository for annotation. For example, the user may download a particular contract that he or she wishes to comment upon. Or, the user is the original author of that document and has chosen to create interaction 636 immediately after creating a new digital object in 632 in order to annotate before uploading that document. Or, the user has been alerted to a collaboration and has downloaded a document via the Query Actions steps described below. A screen shot of the process for create interaction 636 is shown in FIG. 12A at 301 "collaboration wizard." In any case, when the user has selected a suitable document and is ready to create an interaction (i.e., annotate a document), he or she selects create interaction 636. This selection is shown in FIG. 12B at 302 "collaborate tab."

Once a document has been selected and downloaded (using any of the above techniques) the user sees a screen such as shown in FIG. 1A where a navigation panel 14 floats over the selected document. (This figure shows a blank document, but any suitable text document, spreadsheet, image or any digital object may be present on the screen.) The appropriate word processing, spreadsheet, image rendering or other software application is used on the client computing device to present the document or other digital object to the user. The navigation bar is typically separate from any software application. Next, the user uses a cursor, mouse or other suitable selection tool to highlight the portion of the document to which the user wishes to annotate information. The user then selects one of the media icons in panel 14 depending upon whether the user wishes to annotate sound, text, a movie, etc. The client application 408 then presents onscreen to the user another window (90, 100, 110 or 120) that allows the user to either capture new data at this time (such as recording video or sound, capturing a new image, etc.) or choose an existing file on his or her computer that already contains the video, sound, text or image with which to annotate the document. If new data is to be captured, any suitable software application and hardware connected to the client computing device may be used to create the new file.

Once the file is either created or selected, the client application presents an image to the user such as shown in FIG. 13A that shows a selected portion of the document and the annotations associated with that selection. For example, yellow arrow 216 indicates that annotations 232-234 (which are highlighted in yellow as well) are associated with paragraph 208 of the document 200. Other annotations may be added to different portions of the document. Once the annotations have been added, the user selects upload icon 26 and the client application performs steps 644 and 648 as described above.

Symbols such as arrows or icons are stored with the object-to-object relationship information. If an annotation or snapshot is applied at for example, line 25 of a document, that reference is stored with the object information and is interpreted by the client application when the object is viewed.

Assuming that the document is uploaded successfully, interaction step 660 stores the document in the current repository along with any of its annotations. Annotations are digital objects as well. They are stored in the repository and referenced using table 704. Item 712 identifies the ObjectType as "Annotation" and 714 identifies the reference, i.e., line number, word number, etc. The annotation is related to the original object (document) using the following table:

| Object Annotation Table | |
| --- | --- |
| SystemKey | System Identifier |
| RelatedObjectID | First Object in Relationship |
| RelatesObjectID | Second Object in Relationship (Annotation) |

Once stored, interaction step 660 also triggers an alert for other users who are associated with this document. For example, an alert will signal to all other associated users that the document has been recently annotated and that they should review the document. A user who annotates a document may select who is alerted when annotations are made. Further, policies for these alerts may be set to indicate whether alerts should be generated immediately, after a period of time or periodically. Preferably, these alerts are sent via servers to the user's alerts box. One may indicate who should be alerted by using the application interface that allows for selection of alerts. FIG. 12H at 303 "invite tab" shows choosing who should be alerted when a document is annotated.

Flow Diagram—Query Objects

If the user wishes to view all of his or her existing digital objects already in the system, the user invokes Query Objects 628 by selecting folder icon 24 such as that shown in FIG. 5, or by selecting the snapshot icon 34 such as that shown in FIG. 9. The user is presented with a list (or symbols or menu, or graphics) of the digital objects that he or she owns (such as documents) that the user is then able to view or collaborate upon. The user may select a contract, an image, a snapshot, etc.

The repository uses table 724 to determine who owns which objects. A query of that table can provide a list of all objects owned by a particular user. A listing of available objects is not technically a download. The user will fetch or "open" the object for it to actually be downloaded to his or her computer or device.

More specifically, once Query Objects 628 is selected the client application formulates a request for the current repository that includes the user name (or other unique identifier) and Object Type (optional). The client application then execute steps 644 and 648 as described above and, assuming there is access to the repository, the repository then performs step 652. In 652 the repository compares the received user identifier with an ownership field of all digital objects in the repository to determine which objects are owned by the user. Those digital objects (or a list of those objects) are then returned to the client application on the user computing device for display.

FIG. 13B at 220 illustrates how that list of digital objects are displayed to the user for selection. The user may then select a digital object for viewing on his or her computer or may initiate step 636 (for example, by invoking the "instant collaboration" window) in order to further annotate that document.

Flow Diagram—Query Actions

Assuming that the user wishes to view any alerts or invitations to collaborate on a document within the repository to which he or she has access, the user selects Query Actions 640 for the selected repository and is presented with a screen such as shown in FIG. 1A and is then able to choose calendar icon 20 (show alerts and invitations). Alternatively, the user has set up his or her client application to automatically initiate Query Actions 640 upon login so that immediately upon login steps 640, 644, 648 and 664 execute in order to present the user with the above screen.

In either case, execution of Query Actions 640 (whether manually or automatically) causes the client application to formulate a request of the current repository; steps 644 and 648 are then performed as described above. Included is a request to view all alerts along with the user's unique identifier and metadata package. Upon successful access to the repository, step 664 executes and responds to the client application by providing a list of all alerts and invitations. Assuming that the user wishes to view all of his alerts and invitations, the user selects calendar icon 20 and is presented with a list in window 50 as shown in FIG. 2A. Each item in this window represents a particular digital object (such as a document) and includes a name, a hosting entity and the author of the document. An alert is associated with a particular document through metadata packages pointing to certain predefined targets for migration to the user and back to the repository, a symbiotic relationship.

Upon selection of one of the documents in window 50, the set of steps associated with Query Objects 628 (644, 648 and 652) then executes in order to retrieve that digital object from the repository and return it to the user's computer. Unlike the above description of Query Objects that returns all digital objects in the repository owned by the current user, this implementation of Query Objects is only supplied with a single argument, namely, the name of the desired document, and only that document is then returned to the client application. Once step 652 executes and the document is returned to the user, the user may be presented with a screen such as shown in FIG. 13A that shows the annotated document that has generated the alert for the user.

The request is made against the repository using the user's user name (and object type—optional). The repository queries table 724 to obtain the list of objects. The list is returned to the user's computer as a response package.

When a user views a document he or she has the option of viewing any annotations that have been added to that document. When a particular annotation is selected (such as annotation 222) the client application 408 executes a Query Object (steps 628, 644 and 648) and provides a single argument, namely an identifier for the invitation, such that the repository responds 652 and returns the annotation (the digital attachment) for viewing or listening by the user. The metadata package is also provided to the repository for access or authentication purposes.

Create Repository

FIG. 19 illustrates a high-level flow diagram for creating a repository (such as repository 424) within collaboration system 400. One of the advantages of the present invention is that any hardware storage technology may be used (such as traditional file systems or content-addressable storage) to implement a digital object repository. This figure discusses steps taken to implement a repository as a layer on top of any physical storage so that use of the repository is transparent to users and software applications.

Typically, once physical storage has been obtained (whether within a corporation or by leasing storage from a storage technology vendor) a system administrator utilizes these steps to create the repository using that physical storage. For example, even though physical storage such as a traditional file system, a CENTERA computer, a CASTOR storage system, an AMAZON S3 system, etc., is capable of storing information, it needs to be configured to operate as a digital repository within system 400.

Once the administrator has gained access to the system via steps 604 and 608 a control transfer 672 is executed and the administrator makes a request of a particular physical storage device to create a repository 674. The administrator supplies his or her user name, password or other security credentials to the physical storage device and its authentication software. In step 678 the storage device determines whether the administrator has access to the storage or not. If access is granted, then in step 686 the storage device returns a metadata package to the administrator including the following information: the name of the storage device, its unique address on the network, its preferred access method, the owner of the repository, the maximum storage allowed, the rights that the repository grants, etc. Other information that the storage device returns to the administrator and the system depends upon the actual storage device and the file system. Each of these storage mechanisms has their own properties such as retention period, maximum object count, etc.

In step 690 the storage device returns to the administrator an indication as to whether the specific storage requested exists at that time. This check is performed to ensure that the repository gateway actually exists at the address the administrator is attempting to create the repository. If there is no repository gateway, then the repository create request will fail.

In step 698 the administrator creates the repository by providing the following information to configure the repository: a repository name, the desired size of the repository, the number of users allowed, the unique identifiers of users who will be using the repository, the rights of each user (such as those rights and permissions illustrated in FIG. 17C), the default workflow, etc. The default workflow refers to the manner in which alerts are processed, and whom should be alerted. Additional information may be required to create the repository, depending on the underlying hardware, although the repository gateway and API will minimize this need.

The repository API is built as part of the collaboration system and allows various storage devices to be presented in an identical manner to the repository gateway. This technique allows the system to build only one gateway that can connect to any storage device via the API. This is a novel technique providing maximum scalability and flexibility and preserves customer choice to select storage vendors without being locked in. For example, the high level design for the API is shown at 806. The implementation for this component depends upon initial platform selection and priority of interface, i.e., POP, SMTP, HTTP, etc.

One of skill in the art will appreciate that as each physical storage device is different, the process of creating a repository for a particular physical storage device using the above information provided by the administrator will take place in different fashions. Nevertheless, using the above information one of skill in the art will be able to configure a physical storage device to operate as a repository within the context of system 400. Administration of the underlying storage hardware is device specific and is a task carried out by storage administrators, technical support, etc.

Figure 24:
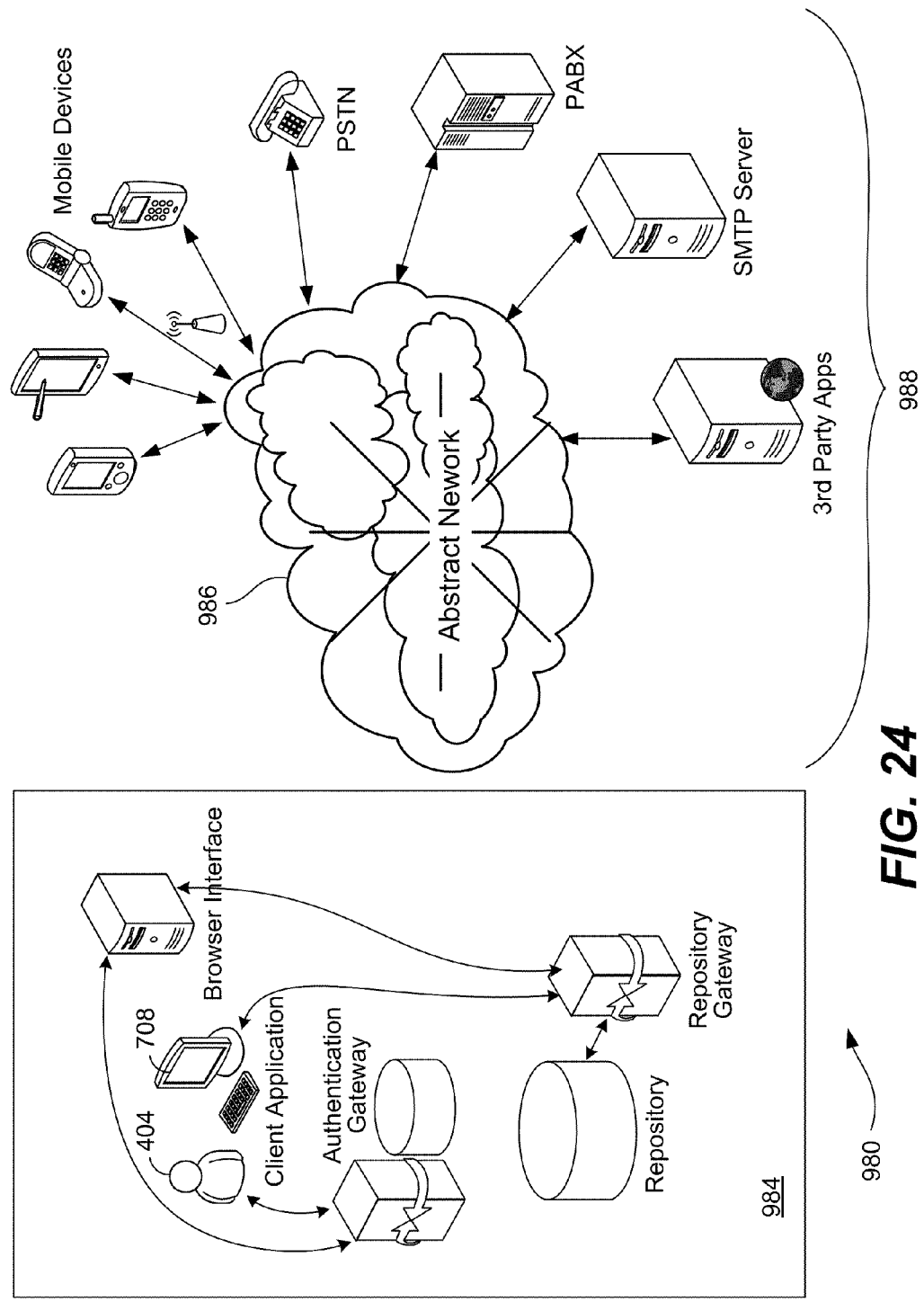
FIG. 24 illustrates one implementation of a collaboration system within an environment.

FIG. 24 illustrates one implementation of a collaboration system within an environment 980. Shown on the left-hand side is a high-level view of collaboration system 984; the center shows any suitable network 986 (such as the Internet), and the right-hand side shows computing devices and applications 988 that may be used to communicate with the system 984. Devices 988 are not necessarily in lieu of the user using computer 408, but are in addition to. For example, one may use a PDA when one is of the office, but when one is in the office, one uses his or her computer instead. Advantageously, virtually any device may connect to the LWU system.

Computing Device Embodiment

Figure 25A:
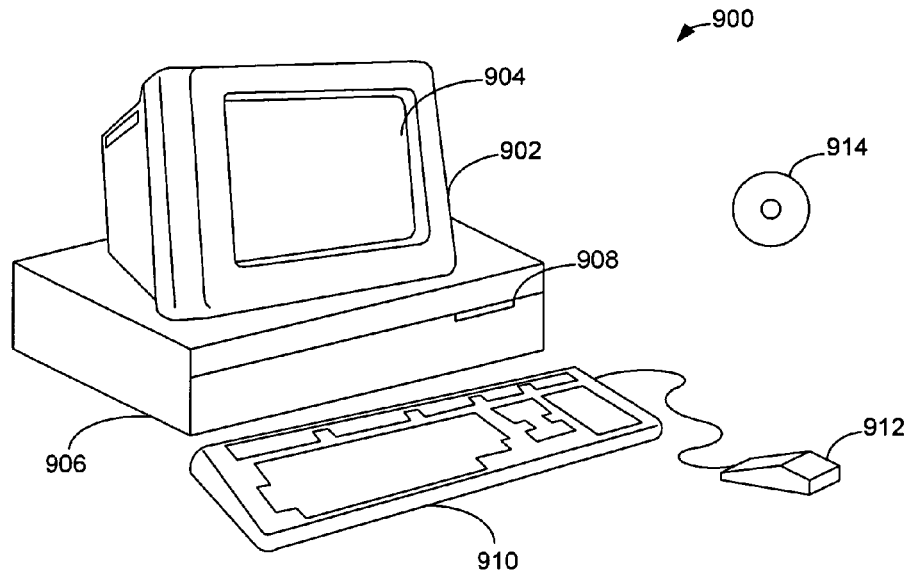
FIGS. 25A and 25B illustrate a computer system 900 suitable for implementing embodiments of the present invention.
Figure 25B:
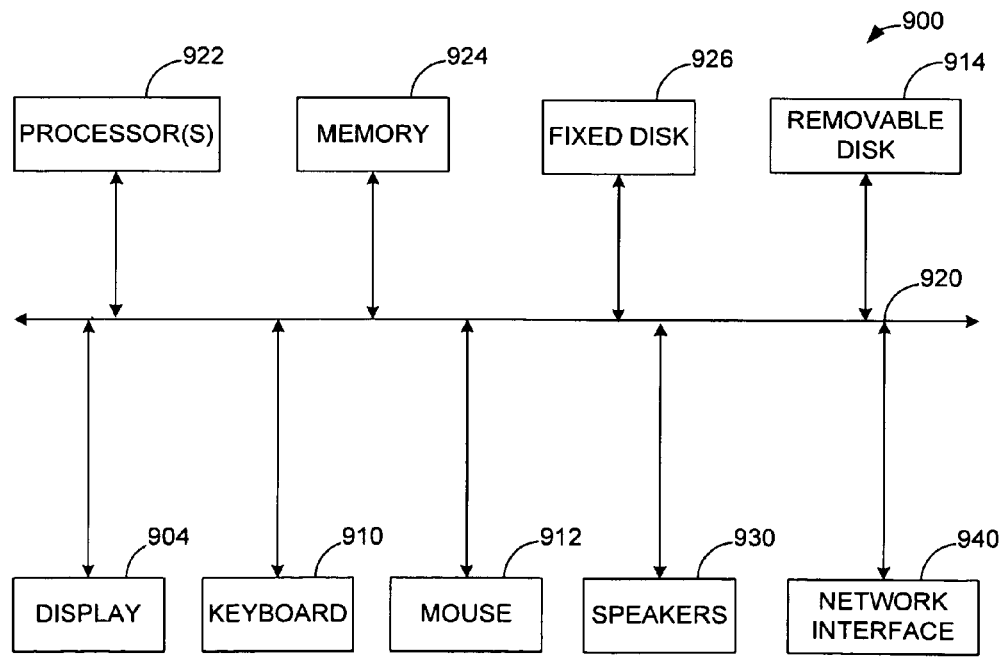

FIGS. 25A and 25B illustrate a computing device 900 suitable for implementing embodiments of the present invention. FIG. 25A shows one possible physical form of the computing device. Of course, the computing device may have many physical forms including an integrated circuit, a printed circuit board, a small handheld device (such as a mobile telephone or PDA), a personal computer or a super computer. Computing device 900 includes a monitor 902, a display 904, a housing 906, a disk drive 908, a keyboard 910 and a mouse 912. Disk 914 is a computer-readable medium used to transfer data to and from computer system 900.

FIG. 25B is an example of a block diagram for computing device 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of collaborating upon a web site feature, said method comprising: a first user accessing a web site over the Internet using a web browser of a first computer, said Web site being displayed on said first computer;

said first user identifying a web site feature displayed on said web site for collaboration;

utilizing a software feature of said web site, attaching a digital object having a first type in association with said web site feature;

uploading said digital object from said first computer over the Internet to a server computer associated with said web site;

displaying a symbol on said web site in association with said web site feature indicating that said digital object has been attached to said web site feature;

said second user accessing said Web site over the Internet using a Web browser of a second computer, wherein said second computer is not required to have a client application for said collaborating and wherein said second user not being required to receive an e-mail message concerning said symbol;

selecting said symbol on said Web site;

rendering said digital object on said second computer;

said second user composing a response to said digital object on said second computer using a user interface window of said Web site, said user interface window being a floating window over said Web site and being in close proximity to said Web site feature; and sending said response back to said first user using said user interface window.

2. A method as recited in claim 1 wherein said web browser of said first computer is a standard web browser without extra functionality for attaching said digital object.

3. A method as recited in claim 1 wherein said first type of said digital object is one of an audio file, a video file, an image file or a text file.

4. A method as recited in claim 1 further comprising:

attaching said digital object to said Web site feature by opening a user interface window separate from a Web site interface window and generating said digital object in said user interface window.

5. A method as recited in claim 1 wherein said first computer is not required to have a client application for said collaborating.

6. A method as recited in claim 1 wherein said software feature is a window opened in response to said first user identifying said web site feature, said method further comprising:

sending said message via said window.

7. A method as recited in claim 1 further comprising:

performing said sending and said displaying by said server computer associated with said web site.

8. A method of facilitating collaboration on a Web site, said method comprising:

implementing a Web site on a server computer having at least one item for display;

receiving, at said server computer, a selection identifying said item from a first user viewing said Web site;

receiving, at said server computer, a selection from said first user identifying a collaboration tool of said Web site;

opening a collaboration window for said first user;

receiving, at said server computer, a digital object that has been attached to said item by said first user using said collaboration window;

displaying a symbol on said Web site in association with said item indicating that said digital object has been attached to said item on said Web site;

receiving, at said server computer, a selection from a second user identifying said symbol;

rendering said digital object on a computer of said second user;

receiving, at said server computer, a request from said second user to respond to said first user;

opening a response window for said second user on said Web site in conjunction with said item, said response window being a floating window over said Web site and being in close proximity to said item displayed on said Web site;

receiving a response from said second user at said server computer; and sending said response back to said first user via said server computer.

9. A method as recited in claim 8, further comprising:

receiving, at said server computer, a selection from a second user identifying said symbol; and rendering said digital object on a computer of said second user.

10. A method as recited in claim 8, further comprising:

receiving, at said server computer, a request from said first user via said collaboration window to send a message to a second user regarding said item on said Web site; and sending said message from said server computer to said second user.

11. A method as recited in claim 8 wherein a computer of said first user is not required to have a client application for said collaborating.

12. A method as recited in claim 8 wherein said computer of said second user is not required to have a client application for said collaborating.

* * * * *